United States Patent [19]
Whitney

[11] Patent Number: 6,141,701
[45] Date of Patent: Oct. 31, 2000

[54] SYSTEM FOR, AND METHOD OF, OFF-LOADING NETWORK TRANSACTIONS FROM A MAINFRAME TO AN INTELLIGENT INPUT/OUTPUT DEVICE, INCLUDING OFF-LOADING MESSAGE QUEUING FACILITIES

[76] Inventor: Mark M. Whitney, 3874 Wintergreen Ct., Marietta, Ga. 30062-6825

[21] Appl. No.: 09/038,603

[22] Filed: Mar. 11, 1998

Related U.S. Application Data

[60] Provisional application No. 60/040,555, Mar. 13, 1997.

[51] Int. Cl.[7] ............................ G06F 13/14; G06F 13/12; G06F 13/10; G06F 3/06; G06F 12/10
[52] U.S. Cl. ................................. 710/5; 710/6; 710/52; 710/54; 710/36; 710/39; 709/215; 709/250; 709/300
[58] Field of Search .............................. 710/6, 36, 1, 5, 710/54; 709/204, 300, 250, 215; 711/152, 148; 714/38

[56] References Cited

U.S. PATENT DOCUMENTS

| | | | |
|---|---|---|---|
| 4,534,013 | 8/1985 | Sheth | 710/5 |
| 4,901,232 | 2/1990 | Harrington et al. | 710/6 |
| 5,263,161 | 11/1993 | Barth et al. | 711/152 |
| 5,293,385 | 3/1994 | Hary | 714/38 |
| 5,333,269 | 7/1994 | Calvignac et al. | 709/215 |
| 5,388,219 | 2/1995 | Chan et al. | 710/5 |
| 5,452,430 | 9/1995 | Dievendorff et al. | 395/183.13 |
| 5,463,772 | 10/1995 | Thompson et al. | 395/600 |
| 5,465,328 | 11/1995 | Dievendorff et al. | 395/182.13 |
| 5,499,384 | 3/1996 | Lentz et al. | 710/1 |
| 5,577,211 | 11/1996 | Annapareddy et al. | 395/200.13 |
| 5,603,059 | 2/1997 | Churchill et al. | 710/36 |
| 5,659,794 | 8/1997 | Caldarale | 710/1 |
| 5,742,761 | 4/1998 | Olnowich et al. | 709/250 |
| 5,764,922 | 6/1998 | Peacock et al. | 710/6 |
| 5,822,766 | 10/1998 | Purdham et al. | 711/148 |
| 5,828,881 | 10/1998 | Wang | 709/300 |
| 5,925,099 | 7/1999 | Futral et al. | 709/204 |
| 5,931,918 | 8/1999 | Row et al. | 709/300 |
| 5,931,920 | 8/1999 | Ghaffari et al. | 710/5 |
| 5,983,292 | 11/1999 | Nordstrom et al. | 710/54 |

*Primary Examiner*—Thomas C. Lee
*Assistant Examiner*—Katharina Schuster
*Attorney, Agent, or Firm*—Hale and Dorr LLP

[57] ABSTRACT

A system for, and method of, off-loading network transactions from a mainframe to an intelligent input/output device, including off-loading message queuing facilities. A storage controller has a processor and a memory, in which the controller receives I/O commands having corresponding addresses. In the controller memory, a communication stack is provided for receiving and transmitting information on a network. In addition, a message queue facilities (MQF) is provided that cooperates with the communication stack and that is responsive to a message queue verb. The MQF causes the communication stack to provide information to a queue in the MQF or causes a queue in the MQF to provide information to the communication stack. Moreover, interface logic is provided in the controller memory and is responsive to the I/O commands, to determine whether an I/O command is within a first set of predetermined I/O commands. If so, the interface logic maps the I/O command to a corresponding message queue verb and queue to invoke the MQF. In this fashion, the MQF may cooperate with the communication stack to send and receive information corresponding to the verb, while off-loading the processing from a computer client (e.g., a mainframe) of the storage controller.

22 Claims, 25 Drawing Sheets

Figure 10-A
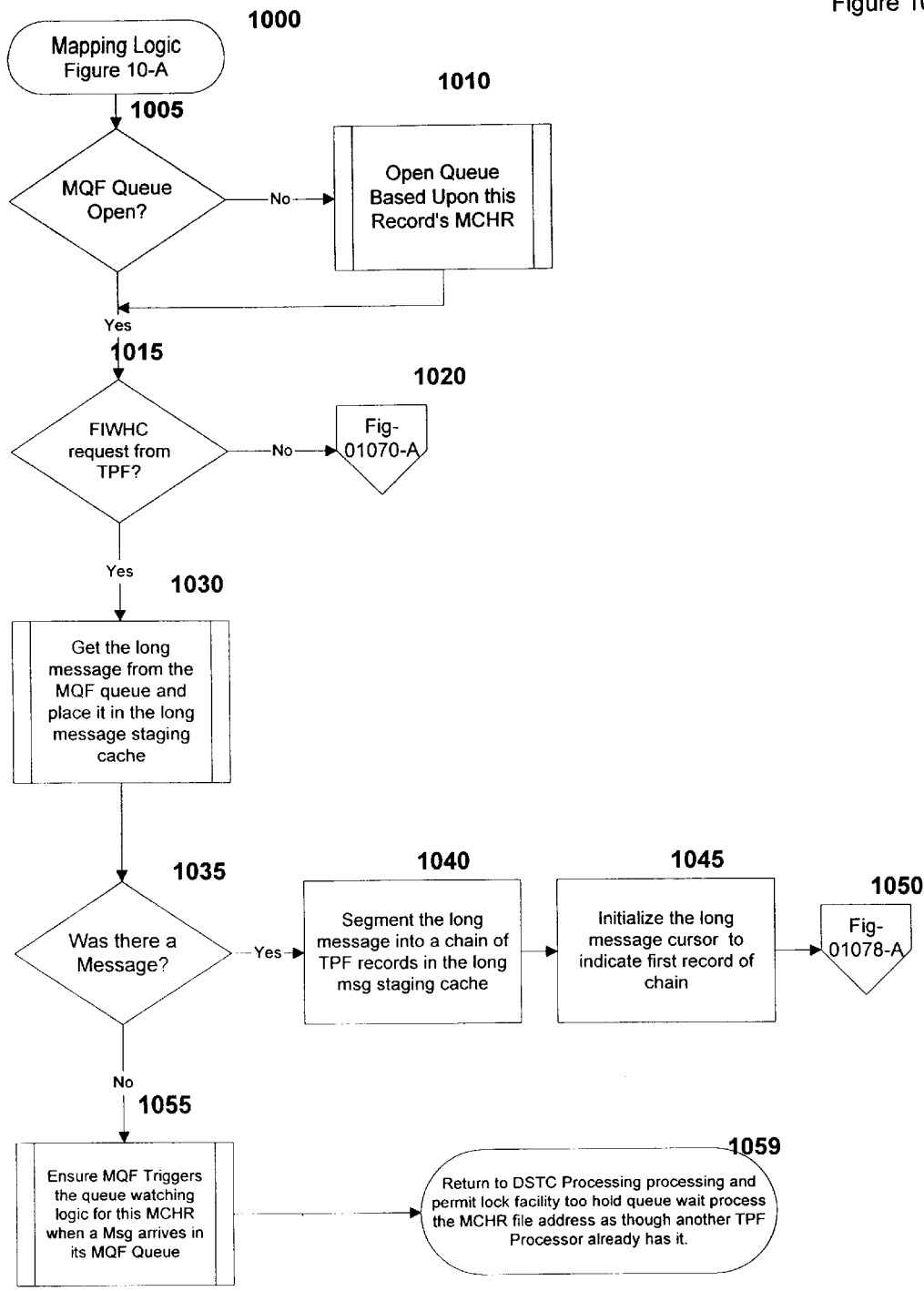

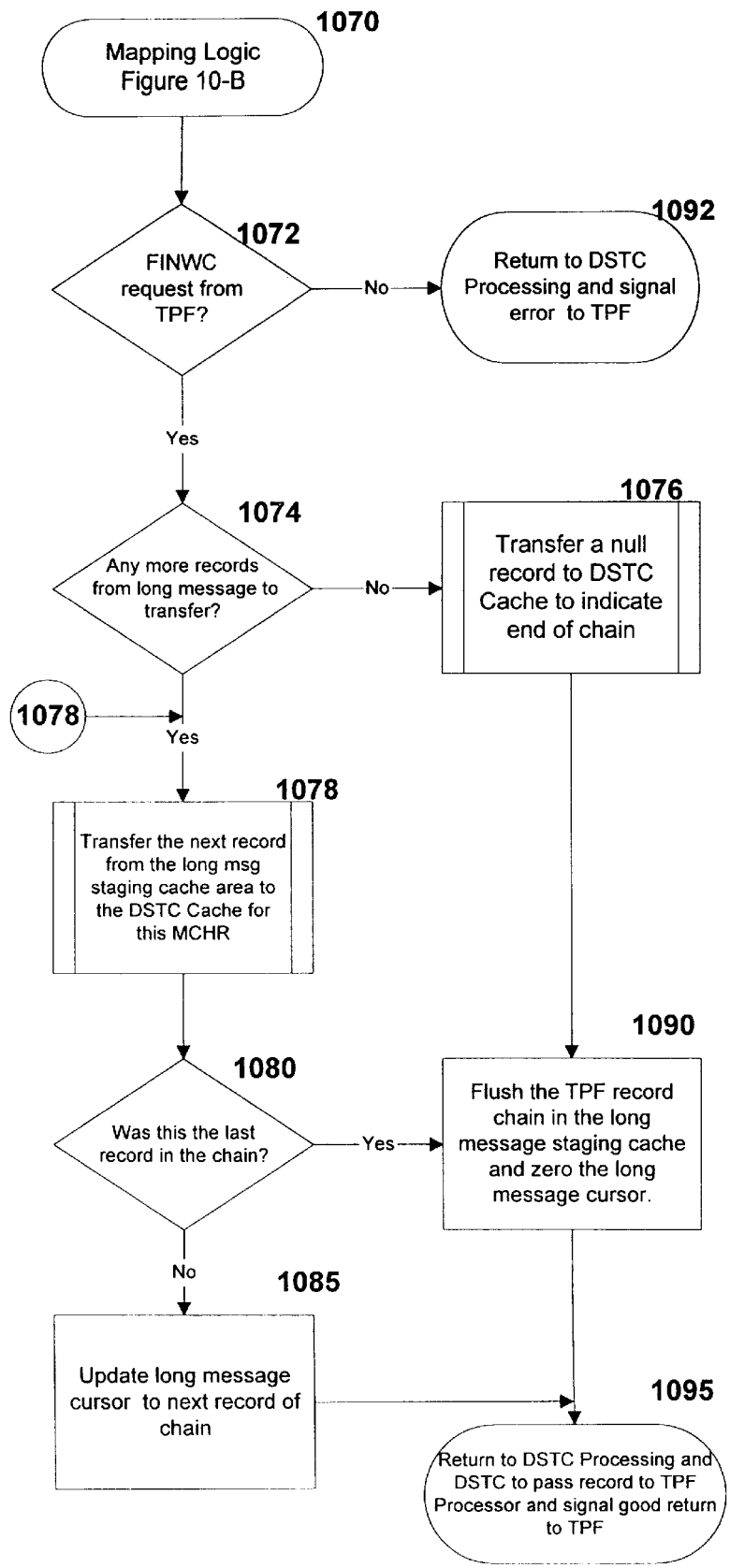
Figure 10-B

Figure 11-A
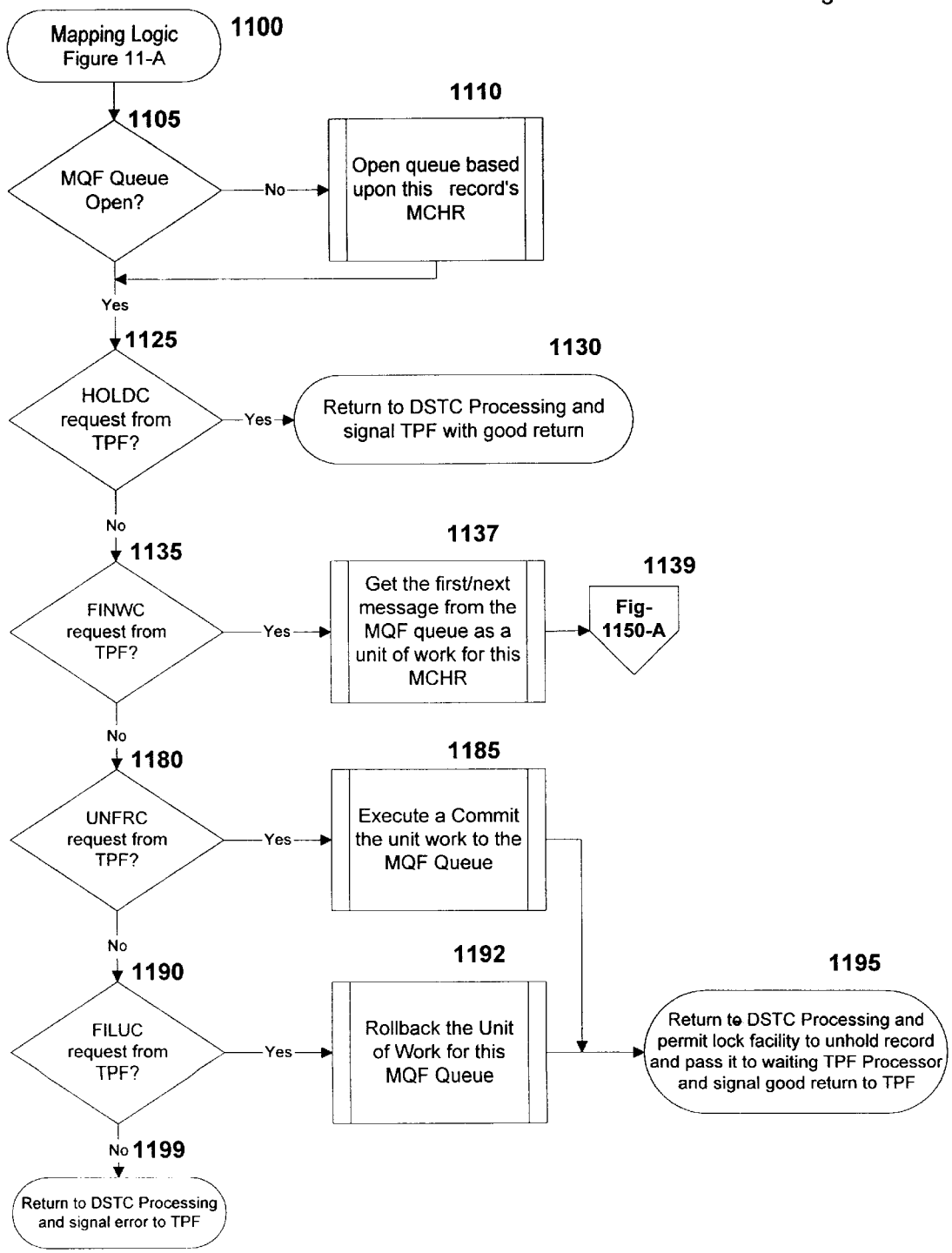

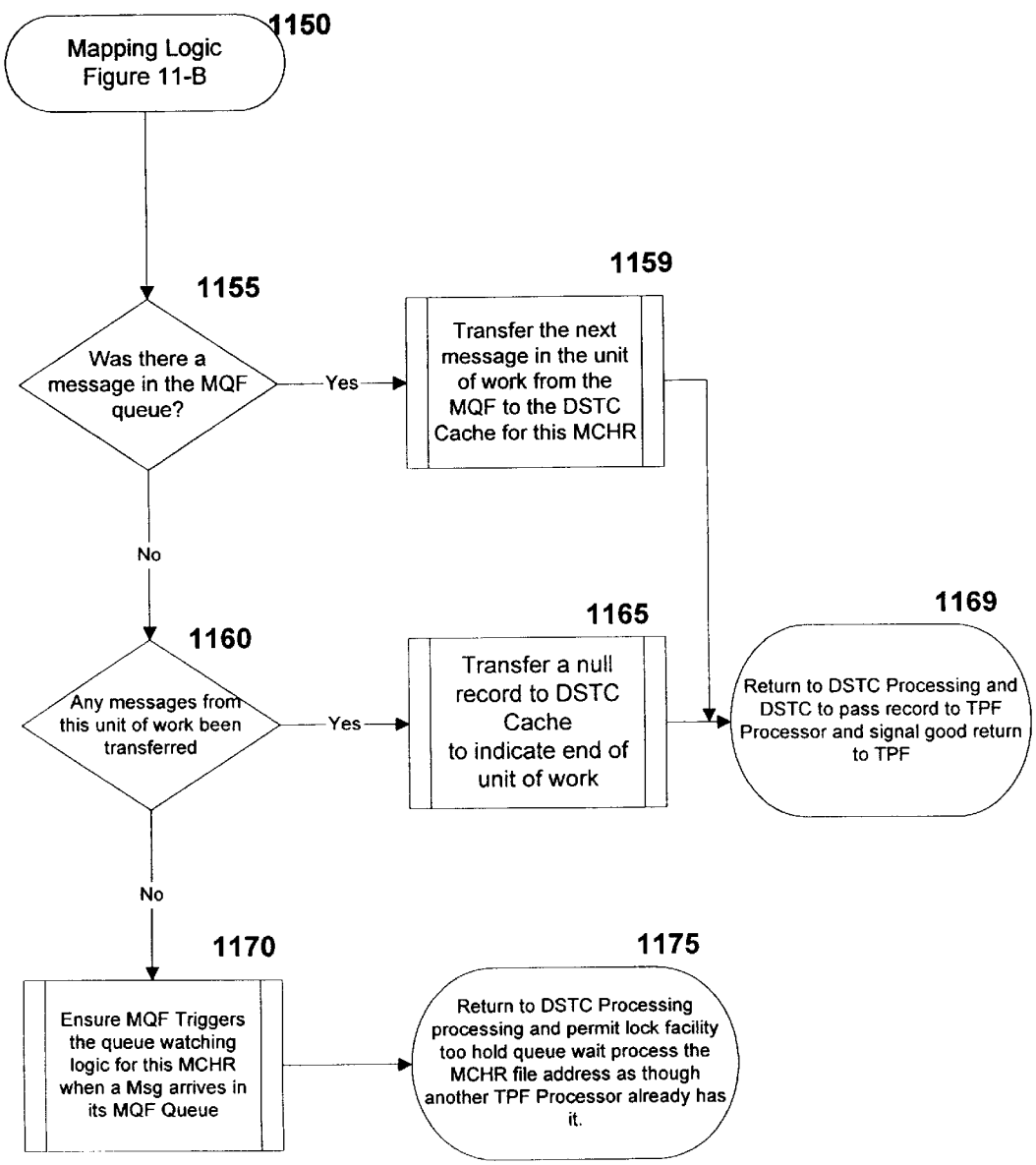
Figure 11-B

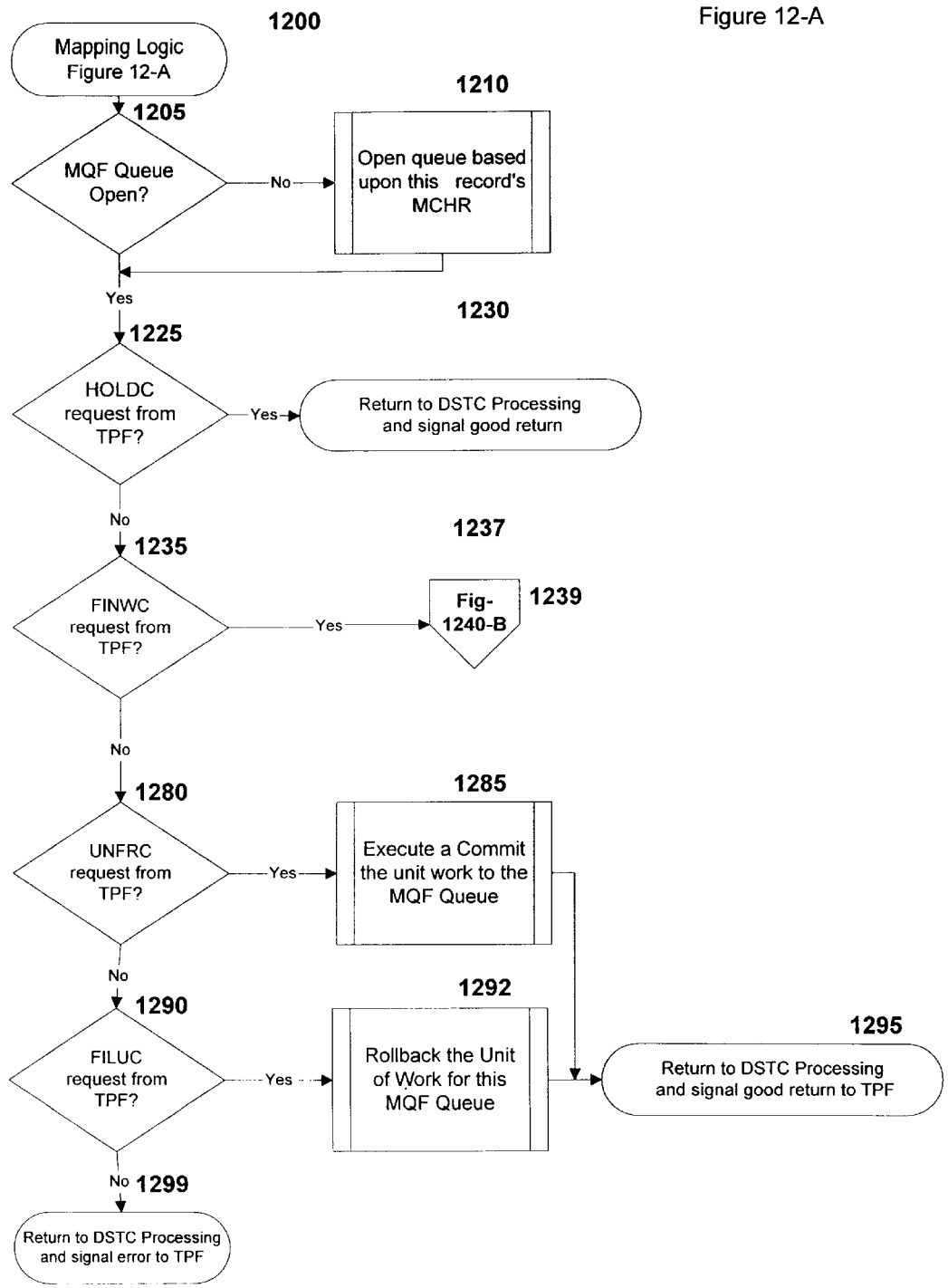
Figure 12-A

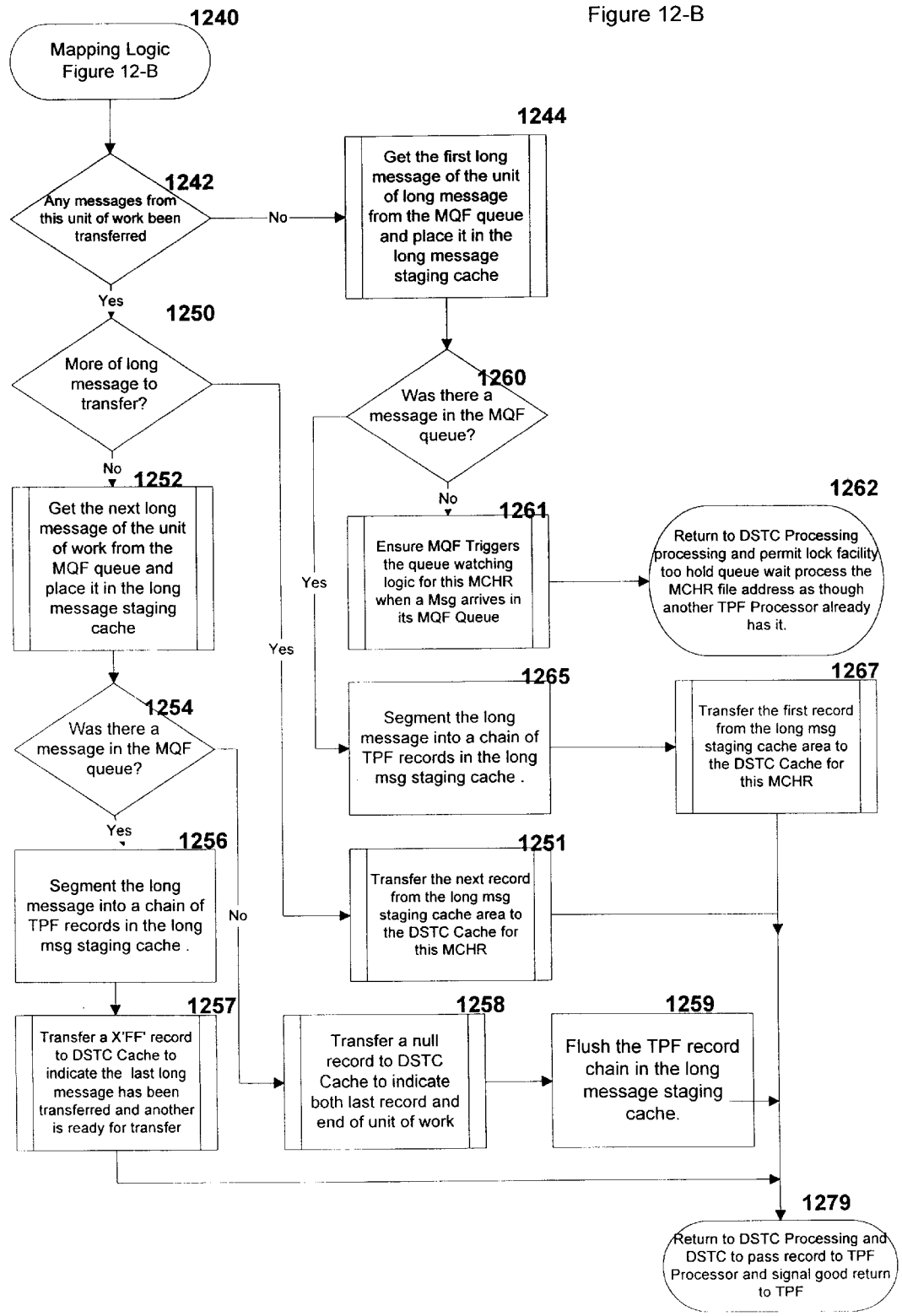
Figure 12-B

SYSTEM FOR, AND METHOD OF, OFF-LOADING NETWORK TRANSACTIONS FROM A MAINFRAME TO AN INTELLIGENT INPUT/OUTPUT DEVICE, INCLUDING OFF-LOADING MESSAGE QUEUING FACILITIES

This patent application claims priority to U.S. Provisional Application Ser. No. 60/040,555 filed Mar. 13, 1997, under 35 U.S.C. §119(e).

BACKGROUND OF THE INVENTION

1. Field of the Invention

This invention relates to improvements in mainframe processing and, more particularly, to operational efficiencies that may be obtained by off-loading network transactions, including message queuing facilities (MQF), to an intelligent I/O device.

2. Discussion of Related Art

In the last several years, message oriented middleware products have been playing an essential role in integrating heterogeneous computing environments. In short, message oriented middleware systems facilitate the exchange of information between computing systems with different processing characteristic, such as different operating systems, processing architectures, data storage formats, file subsystems, communication stacks, and the like. Of particular relevance to the instant context are the family of products known as "message queuing facilities" (MQF). Many such systems are commercially available including the MQSeries from IBM, DEC Message Queue from Digital Equipment Corp., Momentum from XIPC, and Falcon from Microsoft Corp.

Message queuing facilities help applications in one computing system communicate with applications in another computing system by using queues to insulate or abstract each other's differences. With these systems, an application places or Puts a message on a queue, and the queue transmits its contents to another application's queue over a communications network. The other application removes or Gets the information from its queue and processes it.

More specifically, the sending application "connects" to a queue manager (a component of the MQF) and "opens" the local queue using the queue manager's queue definition. (Both the "connect" and "open" are executable "verbs" in MQseries application programming interface (API).) The application can then "put" the message on the queue.

Before sending a message, a MQF typically commits the message to persistent storage, typically to a direct access storage device (DASD). Once the message is committed to persistent storage, the MQF sends the message, via the communications stack, to the recipient's complementary and remote MQF. The remote MQF commits the message to persistent storage and sends an acknowledgment to the sending MQF. The acknowledgment back to the sending queue manager permits it to delete the message from the sender's persistent storage. The message stays on the remote MQF's persistent storage until the receiving application indicates it has completed its processing of it. The queue definition indicates whether the remote MQF must trigger the receiving application or if the receiver will poll the queue on its own. The use of persistent storage facilitates recoverability. This is known as a "persistent queue".)

Eventually, the receiving application is informed of the message in its local queue (i.e., the remote queue with respect to the sending application), and it like the sending application "connects" to its local queue manager and "opens" the queue the message is now on. The receiving application can then execute the "get" or "browse" verbs to either read the message from the queue or just look at it.

When either application is done processing its queue, it is free to issue the "close" verb and "disconnect" from the queue manager.

The persistent queue storage used by the MQF is logically an indexed sequential data set file. The messages are typically placed in the queue on a first in first out (FIFO) basis, but the queue model also allows indexed access for browsing and the direct access of the messages in the queue. The MQF executes file macros against the data set that contains the persistent message queue. For example, in the MVS/OS390 environment, an application executes a macro to open a named data set. The operating system initializes a set of control blocks that are used to map application requests for logical records into specific physical locations on a specific disk module. The physical location is identified with an MCHR address. (MCHR format is known).

In storing the message to the persistent storage, the mainframe-resident MQF communicates with the persistent storage device. Specifically, the MQF causes the operating system software to create and initiate a series of channel command words (CCWs), which contain information to identify the desired data and the desired action, e.g., read data. The series of CCWs is a "channel program." The CCWs contain the MCHR location of the record on the disk, the length of data to be read or written, and the mainframe memory address of where a record is to be read from or written to. The CCW format and the corresponding channel interface are known.)

Typical mainframe systems use DASD as the persistent storage device. The DASD has a DASD-specific arrangement of non-volatile storage devices, used to store the data, and a DASD storage control unit (DSTC). The DSTC executes various algorithms for retrieving data from CCW-specified locations, writing data to these locations, and the like. Physically, the DSTC includes a processor and ram. The ram is used to both hold control programs and to be used as cache. The defacto standard for DSTC functionality is the 3390 interface.

DSTCs implement a "lock facility" which is typically used to facilitate the sharing of DASD in a looselycoupled computing cluster. The lock facility helps manage the serialization and coordination of shared DASD as multiple computers in the cluster attempt to concurrently access it. The granularity of locks varies across implementations, but is typically at a record, data set, or DASD volume level. Physically, the DSTC has multiple electrical interfaces permitting multiple computers to attach to it.

Though MQF is helpful for many application, current MQF and related software utilize considerable mainframe resources. Given that the relevant systems are highly expensive (for example, to maintain transaction response time requirements), the computing resources expended on MQF and related software may translate into considerable sums.

Moreover, modern MQF have limited, if any, functionality allowing shared queues to be supported.

Also, mainframes are difficult to integrate into Open Systems.

SUMMARY

It is an object of the invention to solve the above and other problems.

It is also an object to provide MQF functionality in a cost-effective manner.

It is another object to extend MQF functionality, for example, by providing shareability of queues.

It is another object to off-load the MQF from a computer.

It is another object to off-load the communication stack, or at least certain requests thereof, from a computer.

It is another object to facilitate the integration of open systems to certain types of I/O devices.

Under exemplary embodiments of this invention, the MQF and related processing are moved from the mainframe processor to an improved I/O device. The improved I/O device performs the conventional I/O functions but also includes MQF software, a communication stack, and other novel logic. The MQF software and the communication stack on the improved I/O device are conventional.

The novel logic effectively serves as an interface to the MQF software. In particular, the improved I/O device includes a storage controller that has a processor and a memory. The controller receives I/O commands having corresponding addresses. The novel logic is responsive to the I/O commands and determines whether an I/O command is within a first set of predetermined I/O commands. If so, the logic maps the I/O command to a corresponding message queue verb and queue to invoke the MQF. From this, the MQF may cooperate with the communication stack to send and receive information corresponding to the verb.

The logic also includes an ability to provide shared queues such that the queue may be shared among multiple client computers interacting with the storage controller.

Certain embodiments operate in an I/O environment that receives limited-size payloads of I/O commands, yet support MQF that has larger size payloads. In one embodiment this is accomplished with record pooling.

In this fashion, a client, such as a mainframe computer, can send and receive messages according to a MQF protocol by sending an I/O command having an address to an I/O controller that has residing thereon a communication stack; a MQF, cooperating with the communication stack; and interface logic, cooperating with the MQF. The interface logic maps the I/O command to an MQF verb and issues the verb to the I/O controller-resident MQF. The I/O controller-resident MQF causes the communication stack to send a message, according to the MQF protocol and corresponding to the MQF verb.

BRIEF DESCRIPTION OF THE DRAWINGS

In the Drawing,

FIGS. 10A–B are a flowchart illustrating preferred logic for handling multiple "Gets" as a unit of work;

FIGS. 11A–B are a flowchart illustrating preferred logic for handling multiple "Gets" as a unit of work;

FIGS. 12A–B are a flowchart illustrating preferred logic for handling multiple "Gets" as a unit of work;

DETAILED DESCRIPTION

The invention provides a system for, and method of, off-loading network transactions to an intelligent I/O device. Preferred embodiments are particularly directed to off-loading MQF operations from a mainframe system. In addition to saving expensive mainframe computing cycles, the novel arrangement allows for novel uses of MQF in a mainframe context, such as shared queues among multiple mainframes in a cluster. Additionally, certain embodiments of the invention bridge mainframes and open systems, permitting the vast operational information that previously was tightly-housed in the mainframes to be selectively replicated into the more flexible open systems. The tight integration permits operational systems and the decision support systems to operate with real-time event based feedback loops rather than daily, weekly, or monthly batch based feedback loops. It also permits the migration of applications from the mainframe environment to the opens systems when the business dictates.

Under preferred embodiments, mainframe software translates MQF calls to particular file I/O commands to particular file locations of the improved I/O device. The improved I/O device detects the operations to the particular locations and performs corresponding operations. These corresponding operations include mapping the particular I/O operation to a corresponding MQF operation and invoking the corresponding MQF logic, residing on the improved I/O device. The MQF logic, in turn, invokes a communications stack, residing on the improved I/O device. Analogous operations are performed in the reverse direction, i.e., when MQF operations arrive from a remote machine. Thus, MQF operations, and their corresponding network processing, are moved from the mainframe, where computing cycles are expensive, to the improved I/O device, where in relative terms computing cycles are substantially cheaper. Moreover, the arrangement does not add significant overhead as the MQF operations already require access to an I/O device to cause the message to be stored on persistent storage.

Figure 1:
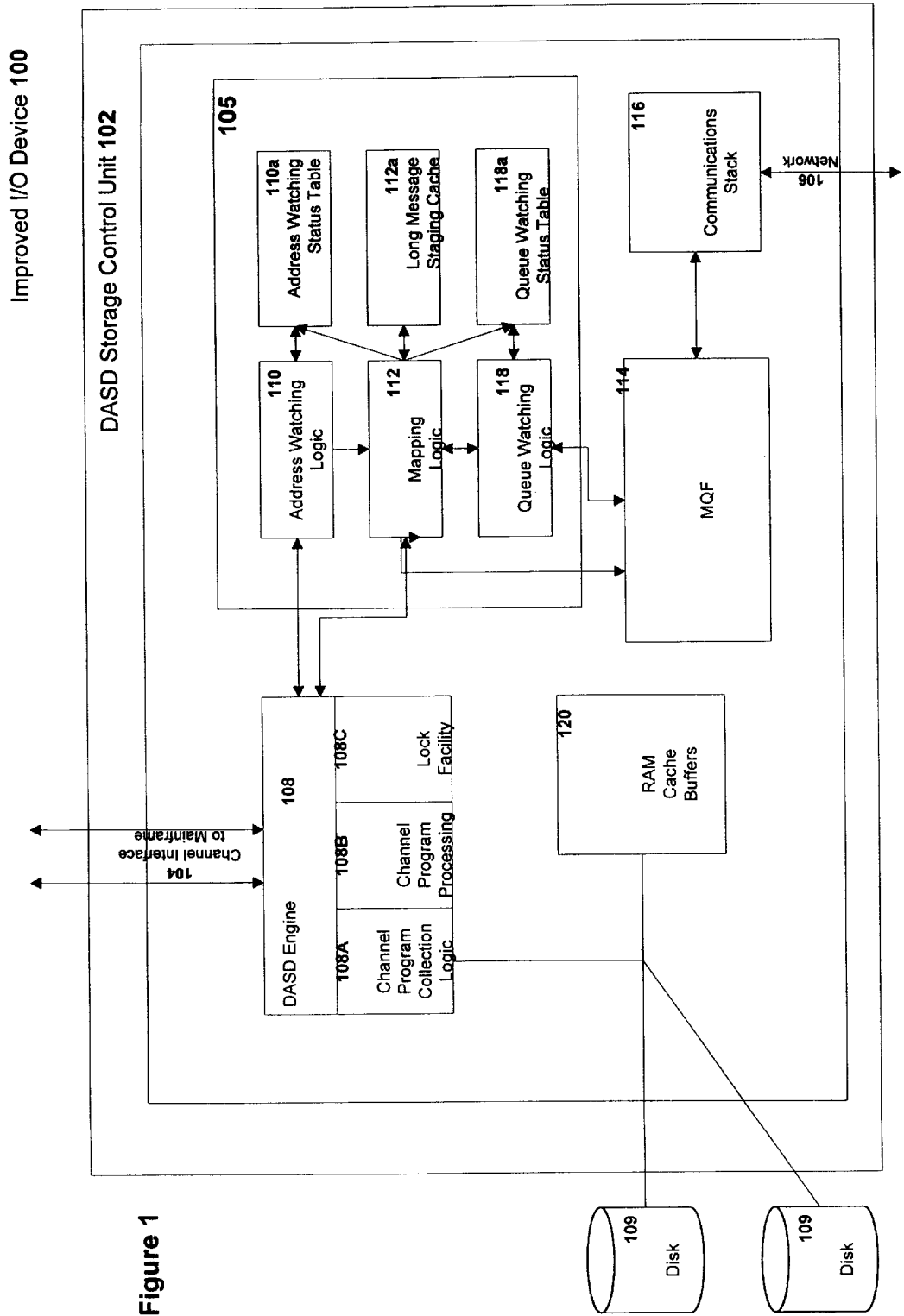
FIG. 1 is an architectural diagram of a preferred embodiment of the invention.

FIG. 1 shows a high-level architectural diagram of an improved I/O device 100 according to a preferred embodiment of the invention. This embodiment is with particular reference to an IBM TPF mainframe system.

The I/O device 100 is preferably a DASD including DSTC 102. The DSTC 102 includes a processor and ram (not shown) and executes various routines described below. The ram is used to store the various executable logic, and it is used as a cache to hold data. The various executable logic includes DASD engine 108, interface logic 105, MQF 144, and communications stack 116. A preferred embodiment of the interface logic 105 includes address watching logic 110, mapping logic 112, and queue watching logic 118, as well as associated tables 110a, 112a, and 118a.

The DSTC 102 communicates with the mainframe using channel interface 104 which carries CCWs. The DSTC is in communication with a network (not shown) using network connection 106. The network connection may be packet- or cell-based.

The DASD engine 108, in material part, includes channel program collection logic 108a, channel program processing logic 108b, and lock facility 108c. The channel program collection logic 108a is responsible for communicating with the mainframe and gathering a sequence of CCWs from the mainframe in one direction and sending a sequence of CCWs in the other direction. These sequences of CCWs correspond to "channel programs," which in turn correspond to SVC calls at the mainframe. The SVC calls include reads (FINDC); blocked reads with locks (FIWHC); blocked reads (FINWC); writes (FILEC); write and unlock (FILUC); unlocks (UNFRC); and the like. (The TPF environment locks, or "holds," on a record basis; the reference to "blocked" reads, for example, indicates the state that the mainframe application may take on the action; thus, with a blocked read, the mainframe application may enter a blocked, or wait, state until the data is returned The various SVC calls and corresponding channel programs are known and are summarized above for convenience.) The channel program processing logic 108b implements the functions corresponding to the collected channel program. This is the entity that performs the various form of reads and writes, for example, according to IBM 3090 functionality. The lock facility 108c is the entity that implements locks corresponding to the channel program. The channel program collection logic 108a cooperates with the lock facility 108c to determine whether a collected channel program is valid. If, for example, a channel program attempted to act on a locked record, the channel program collection logic would inform the mainframe that the request was invalid. Other DASD engine logic would not be invoked. Likewise, the channel program collection logic would determine whether any actions were valid given the lock state; for example, only the mainframe that requested the lock on a record is permitted to unlock the record. The eventual unlocking may occur at another time, for example, after data has been written to the record, but the lock facility 108c will be accessed initially to test the propriety or validity of the command. Likewise, the channel program processing logic 108b cooperates with the lock facility 108c so that the appropriate locks are held and unheld in accordance with the channel program being processed.

Under a preferred embodiment, the transfer of control between the channel program collection logic 108a and the channel program processing logic 108b is well-defined. For example, each may be implemented as a separately schedulable thread in a DSTC runtime environment. Alternatively, they may be implemented in the same thread, but with a well-specified "call" between the two, which may be patched to redirect the control flow to other logic. The transfer of control mechanism depends on the specific DSTC implementation.

The channel program collection logic 108a maintains a buffered copy of the collected channel program. This buffered copy, for example, may reside in cache 120, but in any event it is uniquely locatable with a handle or pointer. The buffered copy, among other things, can supply information indicating the corresponding channel program command (e.g., a FIWHC operation), the MCHR address, the length of any data, and the data payload.

Under a preferred embodiment, address watching logic 110 passively monitors the MCHR addresses of channel programs received by DSTC 102. This is done by redirecting the control flow so that the address watching logic 110 is invoked once the channel program is collected and preferably before channel program processing logic 108b is invoked. This redirection may be achieved through setting appropriate scheduling priorities in some environments or by patching call addresses in others.

In any event, the address watching logic 110 is invoked with a handle or other information for locating the channel program just collected from the mainframe. Once invoked, the address watching logic 110 determines whether the MCHR address involved in the present channel program is of interest, that is, whether it is within a set of addresses of known interest. Under a preferred embodiment, the set of addresses is implemented as a range of MCHR addresses specifically reserved for the off-loaded MQF queues. The address watching logic 110 has an internal address watching logic status table 110a for maintaining the state of MCHR addresses that are of interest. The address watching logic status table 110a saves a mapping configuration and state of the MCHR addresses to properly direct processing into mapping logic 112. Other details of table 110a are described below in context.

If the address is not of interest, the address watching logic 110 immediately returns control to the DASD engine 108 without any further processing. The DASD engine 108 is thus free to perform whatever actions correspond to the collected channel program. In this case, these actions will likely correspond to conventional reads, writes, etc. to the physical persistent storage elements 109.

If the address is of interest, the address watching logic 110 invokes mapping logic 112. The mapping logic 112 will perform various actions and interact with the MQF 114, as will be described below. Eventually the processing completes, and the mapping logic 112 returns control to the address watching logic 110, which will then return control to the DASD engine 108, or the mapping logic 112 returns control directly to the DASD engine 108. The addresses of interest are reserved for use by the logic of the preferred embodiment and thus when control is returned to the DASD engine 108 only innocuous activity results with respect to the physical storage elements 109. However, the conventional processing algorithms will be invoked. Thus, if the channel program that was collected and acted upon by the address watching logic 110 and by mapping logic 112 contained lock (hold) or unlock (unhold) operations, the lock facility 108c would still perform the corresponding actions, i.e., lock or unlock a given MCHR record. This invocation of the lock facility 108c is a consequence of the "normal" control flow and processing of DASD engine 108.

The mapping logic 112, when triggered by address watcher 110, analyzes the buffered channel program just collected, and from this, maps the information to a corresponding MQF action, such as a "Put" to or a "Get" from a named queue. Under a preferred embodiment, the specific named queue and the specific MQF verb are mapped based on a combination of the channel program command (e.g., FILEC) and the MCHR address. More specifically, under a preferred embodiment, a named queue corresponds to several MCHR addresses. This is done because the number of available channel program commands is less than the number of MQF verbs supported.

Under a preferred embodiment, as queues are opened or created, the mapping logic 112 maintains a table data structure 112a mapping the MCHR addresses to the queue name (and/or a handle to the queue). The MCHR address is used to identify the queue in operations between the improved I/O device 100 and the mainframe, but the textual queue name is used when interacting with the MQF 114. A given named queue, e.g., "Example_q," may have several corresponding MCHR addresses. For example, one MCHR address may be used for Puts of less than 4KB, another for Puts larger than 4KB, another for Unit of Work Puts, and others for analogous Gets.

These status tables include open queue names, their known state, their corresponding MCHR address(es), their MQF 114 queue handle, as well as a queue address map vector. Other information stored in the tables is discussed in context. Each MCHR of interest has an address map vector that both the address watching logic 110 and the queue watching logic 118 use to direct the mapping logic 112 on how to process the MCHRlqueue combination. The queue address map vector is part of the MCHR address. The vector defines the MCHR address as corresponding to a Get queue or a Put queue, or Get unit of work queue, etc.

After identifying the MQF operation involved and the corresponding named queue, the mapping logic 112 invokes a corresponding mapping routine. These routines perform intermediate actions in interacting with the MQF 114. In some instances, the intermediate actions essentially format the information in the channel program into corresponding MQF actions; in other instances, the intermediate actions extend the functionality of the MQF 114.

The mapping logic 112 cooperates with the MQF 114. Under a preferred embodiment, the MQF is the commercially-available and known IBM MQSeries. The mapping logic communicates with the MQF 114 using a corresponding, known API. Likewise, the MQF communicates with the logic of the preferred embodiment using known techniques.

The MQF 114, in turn, cooperates with the communication stack 116. A preferred embodiment uses the communication stack available on the Microsoft NT or Hewlett Packard Unix 11 operating system. In a preferred embodiment, the communications stack is responsible for performing services lower than the application layer. The amount of services actually needed depends upon the choice of MQF and upon ancillary needs of the DSTC 102.

The MQF 114 also cooperates with queue watching logic 118. The queue watching logic 118, like the address watching logic 110, has an internal table 118a that corresponds to all of the queues being processed by the MQF 114 and the mapping logic 112. Whereas the address watching logic status table 110a maps MCHR addresses to named queues, the queue watching logic status table 118a maps named queues to MCHR addresses. In the preferred embodiment the queue watching logic 118 is triggered by the MQF 114 when a message arrives on a named queue. This "triggering" uses known MQF techniques based upon configuration and state saved in the queue watching logic status table 118a. The queue watching logic 118 either triggers the mapping logic 112 to transfer the message to a corresponding MCHR (e.g., where a pending FIWHC command from the mainframe is "hold waiting" on it) or it simply puts a notification inquiry message into a master control response queue (which, as will be explained later, may be used for communication with the mainframe).

As outlined above, the mapping logic 112, among other things, performs intermediate actions. These actions are described in flow charts 3–20. In some instances, the mainframe needs to perform a series of operations, that is, send and respond to a series of channel programs, to implement a given MQF action. In this sense, the mainframe will require several interactions with the I/O device 100, whereas a conventional arrangement may have required as little as one operation with the I/O device 100, e.g., to store the message to persistent storage. Nonetheless, though the number of mainframe-to-I/O device interactions is increased, the benefits of off-loading the processing of MQF and the communications stack outweighs the cost. When the address watching logic 100 detects DSTC 108 activity for a MCHR address of interest, it finds the MCHR address in its address watching logic status table 110a. The address watching logic status table 110a contains an entry for every MCHR address watched. Each entry includes an address map vector field, which contains an index pointer to a routine in the mapping logic 112 that processes activity for the MCHR address. Table A summarizes the most typical scenarios for engaging a commercial MQF. The scenarios should not be considered to be a complete set, but rather a working model of the most widely used scenarios.

TABLE A

| Description Vectoring to Mapping Logic 112 | SQL | UOW | >4K | Table | Branch Vector |
|---|---|---|---|---|---|
| Address Watching Logic - Diagram 1-110 | | | | | |
| Put Single Message | N | N | N | Tbl.-1 | 3 |
| Put Single Message | Y | N | N | Tbl.-2 | 4 |

TABLE A-continued

| Description Vectoring to Mapping Logic 112 | SQL | UOW | >4K | Table | Branch Vector |
|---|---|---|---|---|---|
| Put Single Message | Y | N | Y | Tbl.-3 | 5 |
| Put Multiple Messages | Y | Y | N | Tbl.-4 | 6 |
| Put Multiple Messages | Y | Y | Y | Tbl.-5 | 7 |
| Get Single Message | N | N | N | Tbl.-6 | 8 |
| Get Single Message | Y | N | N | Tbl.-7 | 9 |
| Get Single Message | Y | N | Y | Tbl.-8 | 10 |
| Get Multiple Messages | Y | Y | N | Tbl.-9 | 11 |
| Get Multiple Messages | Y | Y | Y | Tbl.-10 | 12 |
| Browse First Message | N | N | N | Tbl.-11 | 13 |
| Browse Next Message Loop | N | N | N | Tbl.-12 | 14 |
| Browse Message using Cursor | Y | N | N | Tbl.-13 | 15 |
| Get Single Message using Message Identifier | Y | N | N | Tbl.-14 | 16 |
| Get Single Message with options | Y | N | N | Tbl.-15 | 17 |
| Put Single Message with options | Y | N | N | Tbl.-16 | 18 |
| Queue Watching Logic | N/A | N/A | N/A | N/A | 19 |
| Put Single MQF Control Message to Master Control Queue to examine or alter specified queue's state | Y | N | N | Tbl.-17 & 18 | 20 |

Figure 2:
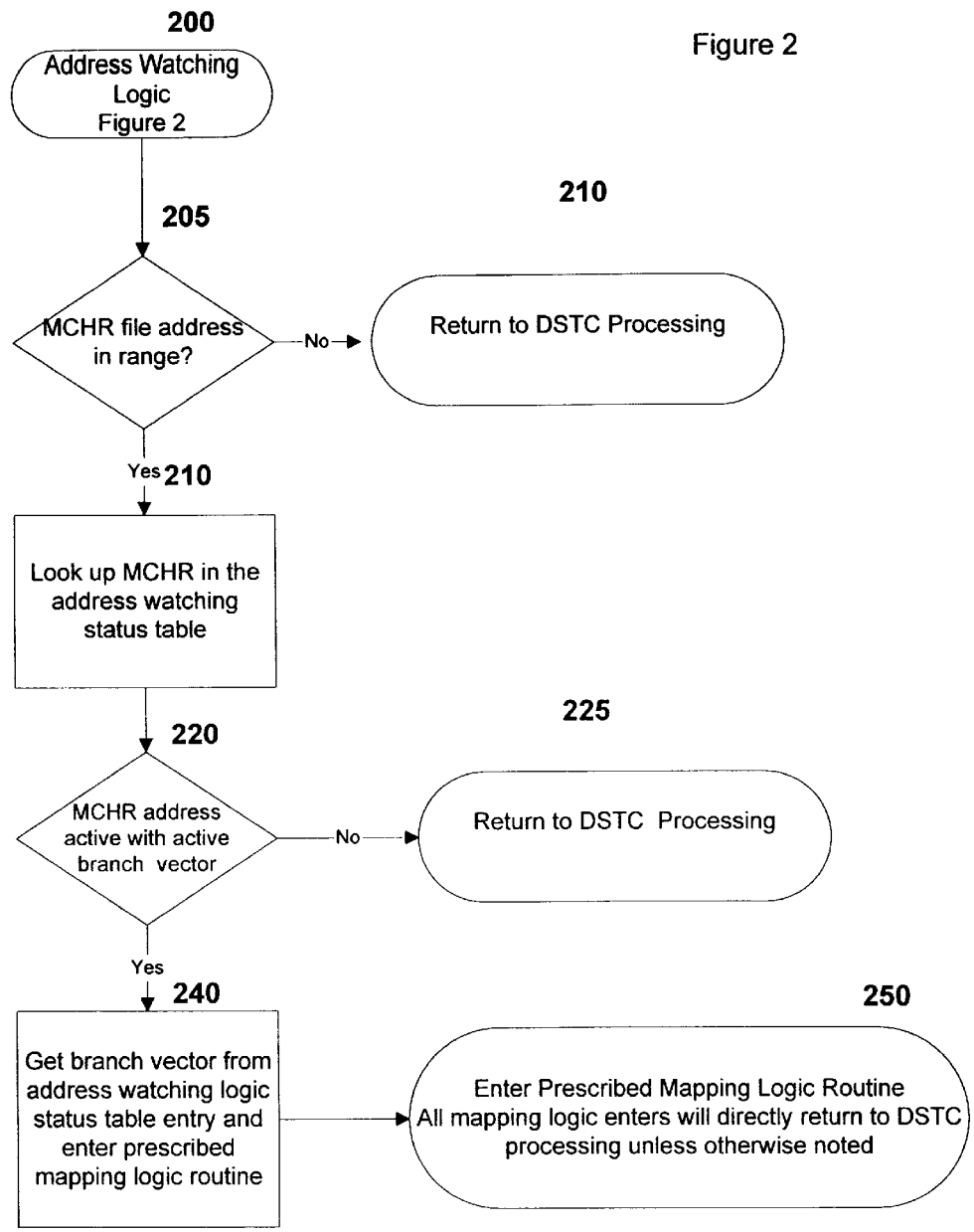
FIG. 2 is a flowchart illustrating the address-watching logic of the preferred embodiment.

Legend:
SQL = Shared Queue Locking
UOW = Unit of Work
>4K = Message is greater than 4K Bytes
Vector = Address Watching Status Table Branch Vector FIG. 2 shows the address watching logic 110 that is activated by the DSTC 108A channel program collection logic. The address watching logic 110 is activated at step 200 once the channel program collection logic 108a has analyzed the channel program from the channel interface 104 and determined what I/O command is being executed on the accompanying MCHR address.

Processing proceeds to step 205 where the MCHR address is rang checked against values stored in the address watching logic table 110a. If the MCHR fails the range check the logic then proceeds to step 210 in which the flow of control is caused to return to the DSTC engine 108. If it passes the address range test audit, then processing proceeds with step 210.

Step 210 depending upon embodiment either searches, hashes, or indexes into the address watching logic table 110a to find the proper MCHR addresses entry. In step 220 if there is not an entry for the MCHR address or if there is an entry but it does not have a branch vector in it from Table A, then processing proceeds to step 225. In step 225 the flow of control is caused to return to the DSTC engine 108.

If step 220 found a valid entry and branch vector, then in steps 240 and 250 the address found in the branch vector field of the MCHR's address watching status table 110a entry is branched to. This branch address represents unique logic routines in the mapping logic 112. There is no expected return to this logic, that is the address watching logic 110, from the branch to the mapping logic 112.

Figure 3:
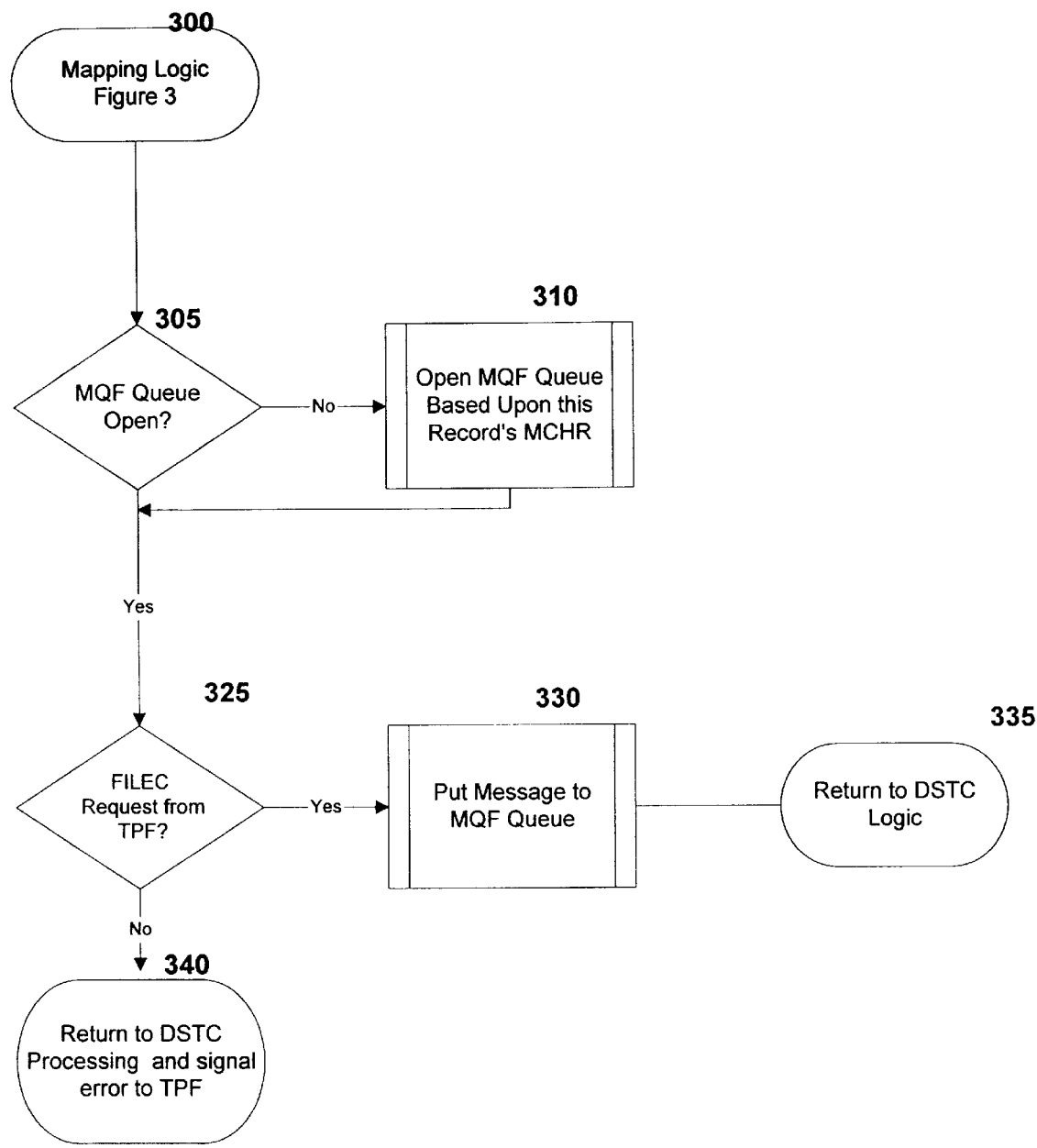
FIG. 3 is a flowchart illustrating preferred logic for handling Puts to a non-shared queue.

FIG. 3 shows the logic for handling single Put commands in which the message is less than 4K bytes. (The largest record size supported by TPF mainframes is 4KB.) This logic is invoked when one of the buffered channel program commands of Table 1 is detected by the mapping logic 112 in conjunction with an MCHR address associated with single Puts, as identified in table 110a.

TABLE 1

| Description | MQSeries Verb | Buffered Channel Program Command |
|---|---|---|
| Sequence of Verbs to lock and Put messages to a Put queue | | |
| | MQOPEN | Any Activity |
| Lock the queue against shared update activity | N/A | N/A |
| Put a message to the queue | MQPUT | FILEC |
| Unlock queue for shared update activity if Put is aborted | N/A | UNFRC |

The logic begins in step 300 and proceeds to step 305. In step 305, the logic determines whether the named queue is open. The name for the queue is retrieved from the entry in address table 110a having the MCHR address in the buffered channel program. This may be determined with known API calls to the MQF 114, but a preferred embodiment maintains status indicators in table 110a. The table logic 110a includes association logic (not shown) so that all MCHR entries for a given named queue are accessed and modified consistently. Thus, if a queue is opened when performing a single Put to "example-q" by using corresponding MCHR address A, the other MCHR entries for "example-q" will be updated to "open," as well; thus, MCHR address B which corresponds to large Puts (i.e., greater than 4KB) will be updated to open status as well, since this address also maps to "example-q."

If the named queue is not open, the logic proceeds to step 310 in which the named queue is opened with known API calls to the MQF 114. The mapping logic 112 cooperatively maintains both the address watching logic status table 110a and the queue watching logic status table 118a respectively with the address watching logic 110 and the queue watching logic 118. Thus, at this point, the mapping logic 112 will cause tables 110a and 118a to be modified for all relevant entries. The logic then proceeds to step 325.

If the named queue is open, the logic proceeds to step 325. In step 325, the logic determines whether the channel program command is a FILEC, that is, a write without locking command.

If the command analyzed in step 325 is a FILEC, the logic proceeds to step 330 in which the data payload of the buffered channel command is Put to the corresponding named queue, using the known API of the MQF. The queue name is provided from table 110*a*. The logic then proceeds to step 335 in which the flow of control is caused to return to the DASD engine 108.

If the command in step 325 is not a FILEC, the logic proceeds to step 340. In step 340, the logic causes the flow of control to return to the DASD engine 108 and an error condition is signaled. In this scenario, a channel program command has been received which is not recognized.

Figure 4:
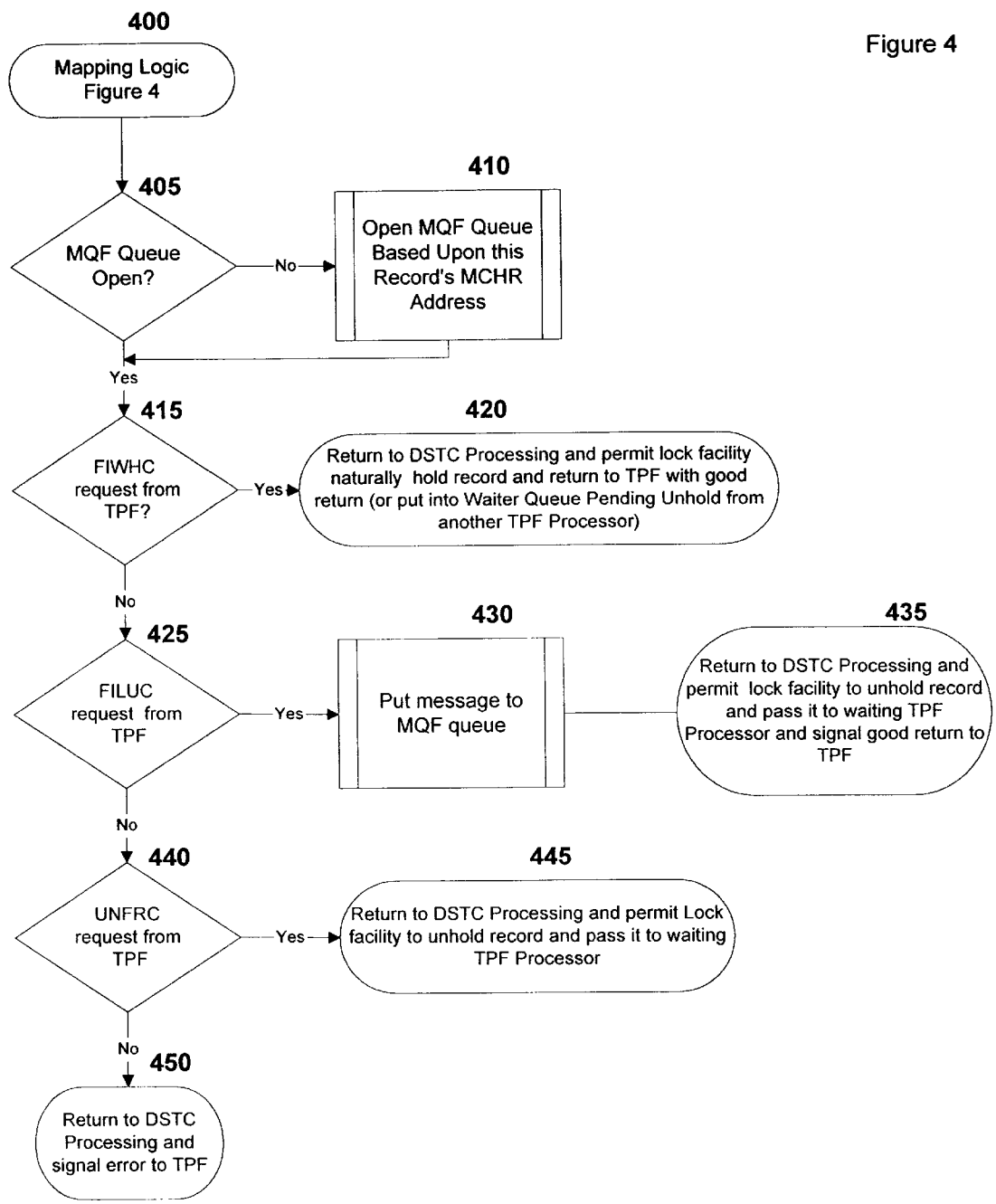
FIG. 4 is a flowchart illustrating preferred logic for handling Puts to a shared queue.

FIG. 4 shows the logic for handling single Put commands to a shared queue in which the message is less than 4K bytes. This logic is invoked when one of the buffered channel program commands of Table 2 is detected by the mapping logic 112 in conjunction with an MCHR address associated with single Puts, as identified in table 110*a*. The logic, as will be explained below, supports single Puts and also Puts to a shared MQF queue. The "shareability" of the queue is a consequence of the functionality extended by the mapping logic 112 shown in FIG. 4 and not inherent in MQF 114.

TABLE 2

| Description | MQSeries Verb | Buffered Channel Program Command |
|---|---|---|
| Sequence of Verbs to lock and Put messages to a Put queue | | |
| | MQOPEN | Any Activity |
| Lock the queue against shared update activity | N/A | FIWHC |
| Put a message to the queue | MQPUT | FILUC |
| Unlock queue for shared update activity if Put is aborted | N/A | UNFRC |

The logic begins in step 400 and proceeds to step 405. In step 405, the logic determines whether the named queue is open. The name for the queue is retrieved from the entry in address table 110*a* having the MCHR address in the buffered channel program. This may be determined with known API calls to the MQF 114, but a preferred embodiment maintains status indicators in table 110*a*.

If the named queue is not open, the logic proceeds to step 410 in which the named queue is opened with known API calls to the MQF 114. The mapping logic 112 cooperatively maintains both the address watching logic status table 110*a* and the queue watching logic status table 118*a* respectively with the address watching logic 110 and the queue watching logic 118 to modify the queue status.

If the named queue is open, the logic proceeds to step 415. In step 415, the logic analyzes the buffered channel program command to determine whether it is FIWHC, that is, a blocked read and lock. (The "blocked" aspect refers to mainframe-side state and involves no blocking aspect on the I/O-side.) This command is used in instances where the queue is shareable among multiple mainframes connected to the I/O device 100. The preferred embodiment uses the FIWHC because it will naturally trigger a lock on the MCHR address record through the ordinary processing of the lock facility 108*c*, as explained below. The lock precludes other mainframes from accessing the corresponding MCHR record until the lock is released (unheld).

If the command analyzed in step 415 is a FIWHC command, the logic proceeds to step 420, in which the flow of control is caused to return to the DASD engine 108 and eventually the lock facility 108*c* which will lock the record and thus prevent other entities from accessing the MCHR address corresponding to the queue.

If the command analyzed in step 415 is not a FIWHC, the logic proceeds to step 425 in which the logic determines whether the channel program command is a FILUC, that is, a write with unlock command.

If the command analyzed in step 425 is a FILUC, the logic proceeds to step 430 in which the data payload of the buffered channel command is Put to the corresponding named queue, using the known API of the MQF. The queue name is provided from table 110*a*. The logic then proceeds to step 435 in which the flow of control is caused to return to the DASD engine 108 and eventually the lock facility 108*c* which will unlock the record and thus allow other entities to access the MCHR address corresponding to the queue.

If the command in step 425 is not a FILUC, the logic proceeds to step 440 in which the logic determines whether the channel program command is an UNFRC, that is, an unlock command. This command would be used by the mainframe if it needed to abort a Put to a shared queue, after it had already locked the queue.

If the command analyzed in step 440 is an UNFRC, the logic proceeds to step 445 in which the flow of control is caused to return to the DASD engine 108 and eventually the lock facility 108*c* which will unlock the record and thus allow other entities to access the MCHR address corresponding to the queue.

If the command analyzed in step 440 is not an UNFRC the logic proceeds to step 450 in which the flow of control is caused to return to the DASD engine 108 and in which an error condition is signaled. In this scenario, a channel program command has been received which is not recognized.

Figure 5:
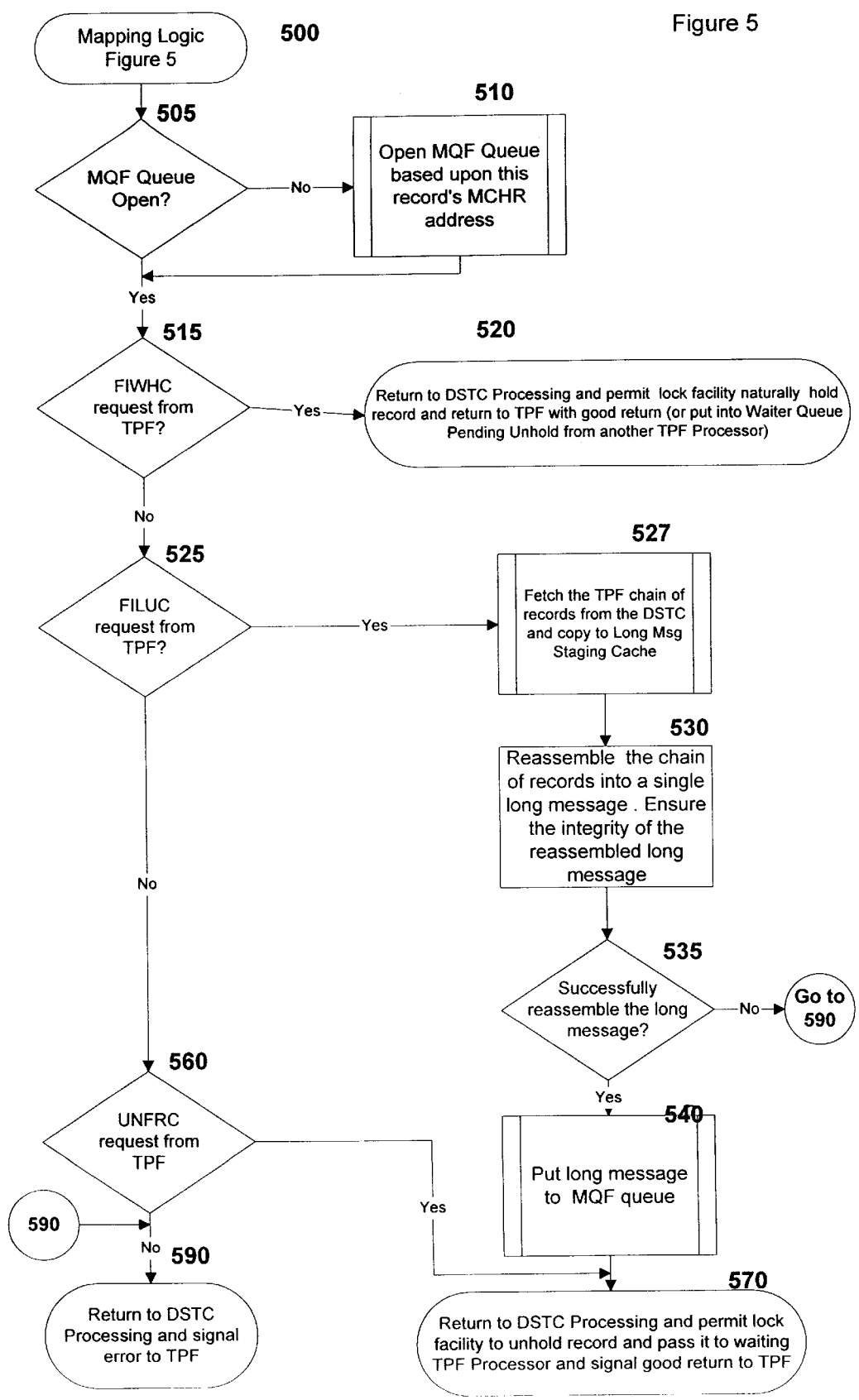
FIG. 5 is a flowchart illustrating preferred logic for handling Puts to a shared queue.

FIG. 5 shows the logic for handling a single "Put" command in which the message may be more than 4K bytes. The logic is invoked when one of the buffered channel program commands of table 3 is detected by mapping logic 112 in conjunction with an MCHR address associated with single Puts, as identified in table 110*a*. The logic, as will be explained below, supports Puts to a shared MQF queue. The "shareability" of the queue is a consequence of the functionality extended by the mapping logic 112.

Mainframe software may segment a message that is greater than 4K Bytes into a chain of 4K record segments. A preferred embodiment uses conventional TPF record processing to implement the segmentation and reassembly of long messages. Individual records in the TPF chain are filed at known file pool addresses resident on the DASD of the modified DSTC 100. This TPF record chaining is known. It employs a standard record header with forward and back chaining fields that contain the MCHR addresses respectively of the next and first previous records in chain. Once the chain is filed into the DSTC's conventional pool storage, the first record in the chain (known as the prime or head of chain) may be Put to queue, as explained below. There are several approaches to embodying the handling of segmented long messages, including using designated MQF queues for long message staging.)

TABLE 3

| Description | MQSeries Verb | Buffered Channel Program Command |
|---|---|---|
| Sequence of Verbs to Lock and Put Long Message to a Put Queue | | This logic assumes the long message's chain of message segments has been filed using pool MCHRs on DSTC 100 |
| Open Queue | MQOPEN | Any Activity |
| Lock the Queue against shared Update Activity | N/A | FIWHC |
| Put the first segment of the long message chain to (the head or prime of chain) to queue as the first message in a unit of work | MQPUT | FILUC |
| Unlock the queue for shared update activity if Put is aborted | | UNFRC |

The logic begins in step 500 and proceeds to step 505. In step 505, the logic determines whether the named queue is open.

If the named queue is not open, the logic proceeds to step 510 in which the named queue is opened with known API calls to the MQF 114. The mapping logic 112 cooperatively maintains both the address watching logic status table 110*a* and the queue watching logic status table 118*a* respectively with the address watching logic 110 and the queue watching logic 118 to modify the queue status.

If the named queue is open, the logic proceeds to step 515. In step 515, the logic analyzes the buffered channel program command to determine whether it is FIWHC, that is, a blocked read and lock.

If the command analyzed in step 515 is a FIWHC command, the logic proceeds to step 520, in which the flow of control is caused to return to the DASD engine 108 and eventually the lock facility 108*c* which will lock the record and thus prevent other entities from accessing the MCHR address corresponding to the queue.

If the command analyzed in step 515 is not a FIWHC, the logic proceeds to step 525 in which the logic determines whether the channel program command is a FILUC, that is, a write with unlock command. The FILUC command is used as the second command in a series of commands issued for Puts to shared queues.

If the command analyzed in step 525 is a FILUC, the logic proceeds to step 527 in which the data payload of the buffered channel command is further analyzed. In step 527, the logic analyzes the known forward and back chaining fields of the record in the data payload. As part of step 527, the current record is sequentially copied into the mapping logic's 112 internal long message staging cache 112*a*. If the mapping logic 112 determines that the known forward chain field in the TPF standard record header is set to binary zeroes the current record is the end of chain. A nonzero forward chain field in the current record is the known MCHR pool address that points to the next record in chain. The mapping logic 112 uses the forward chain MCHR address to set up the DSTC 108 engine to stage an internal FINWC command of the forward chained record. It then triggers the DASD engine 108 to fetch it. The forward chained record fetched by the DASD engine 108 is copied by the mapping logic 112 as the next sequential record into the internal long message staging cache 112*a*. This scanning process of determining if there is a forward chain and then fetching it to the internal long message staging cache 112*a* continues until a forward chain field of binary zeroes is found indicating end of chain. Processing proceeds to step 530.

In step 530, the logic analyzes the record chain by stepping sequentially through each record saved in the internal long message staging cache 112*a*. By using the MCHR addresses in both forward and backward chaining fields of each record, the chain of records can be traversed logically both forward and backwards. This action insures that the physical sequence of the chain as it lies in the internal long message staging cache 112*a* properly matches its logical sequence. In step 530, the logic reassembles the message segments residing in the chain of records into one large message. (The DASD engine 108 and the logic of the preferred embodiment, unlike TPF, are not limited to 4K records). Again by stepping sequentially through each record saved in the internal message staging cache 112*a*, each standard TPF record header is stripped off and the remaining message segment is concatenated into the long message.

The processing proceeds to step 535 in which the logic determines whether the reassembly was successful. If so, the logic proceeds to step 540; otherwise it is a bad chain and processing continues with step 590 in which the flow of control is caused to return to the DASD engine 108 and an error condition is signaled.

In step 540, the logic Puts the long message from the internal long message staging cache 112*a* to the open queue in the MQF 114. The logic then proceeds to step 570 in which the flow of control is caused to return to the DASD engine and eventually the lock facility 108*c* which will unlock the record associated with the MCHR of the FILUC and thus allow other entities to access the MCHR address corresponding to the queue.

(Although not detailed in this embodiment, instead of reassembling the long message in the mapping logic 112, it is possible to sequentially Put each of the records in chain to the MQF 114 as a unit of work and have an off board processor reassemble them into a single long message.)

If the command in step 525 is not a FILUC, the logic proceeds to step 560. In step 560, the logic then analyzes to the buffered channel command.

If the command analyzed in step 560 is an UNFRC the logic proceeds to step 565 in which the flow of control is caused to return to the DASD engine 108 and eventually the lock facility 108*c* which will unlock the record and thus allow other entities to access the MCHR address corresponding to the queue.

If the command analyzed in step 560 is not an UNFRC the logic proceeds to step 590 in which the flow of control is caused to return to the DASD engine 108 and in which an error condition is signaled. In this scenario, a channel program command has been received which is not recognized.

Figure 6:
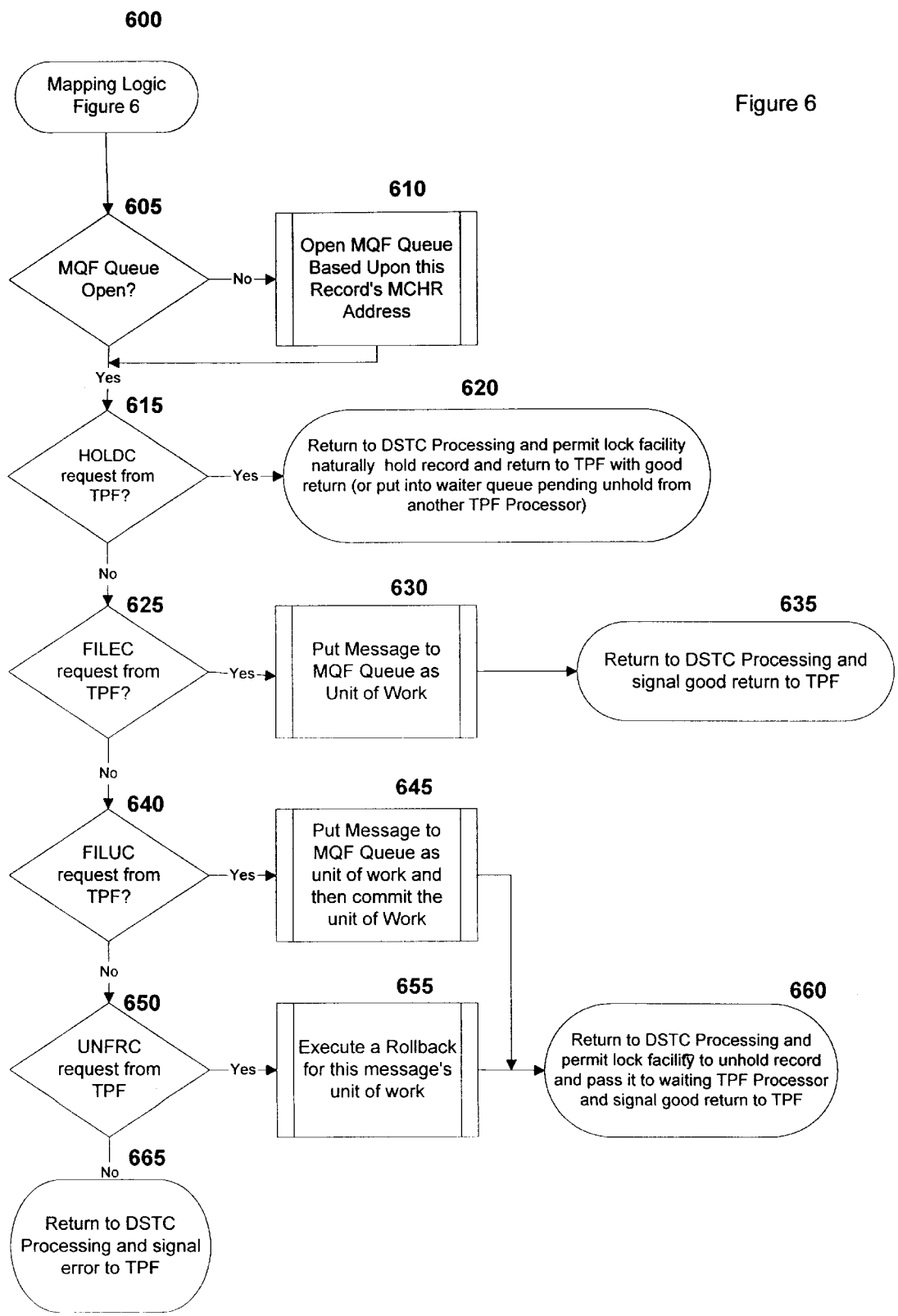
FIG. 6 is a flowchart illustrating preferred logic for handling multiple "Puts" as a unit of work.

FIG. 6 shows the logic for handling multiple Put commands as a transactional unit of work in which the individual messages that make up the unit of work are less than 4K bytes each. This logic is invoked when one of the buffered channel program commands of Table 4 is detected by mapping logic 112 in conjunction with an MCHR address associated with multiple Puts. The logic, as will be explained below, supports Puts and also Puts to a shared MQF queue. The "shareability" of the queue is a consequence of the functionality extended by the mapping logic 112.

TABLE 4

| Description | MQSeries Verb | Buffered Channel Program Command |
|---|---|---|
| Sequence of Verbs to lock and Put messages to a Put queue as unit of work | | |
| Open queue | MQOPEN | Any Activity |
| Lock the queue against shared update activity and indicate unit of work - Indicate Syncpoint | N/A | HOLDC |
| Put a message to the queue (first message with sync-point) | MQPUT (first with sync-point) Put (subsequent without synch-point) | FILEC |
| Put the last message to queue committing the unit of work and unlocking the queue to other shared activity | MQPUT (the last message) MQCMIT | FILUC |
| Rollback the unit of work and unlock the queue for shared update activity if unit of work is aborted | MQBACK | UNFRC |

The logic begins in step 600 and proceeds to step 605. In step 605, the logic determines whether the named queue is open.

If the named queue is not open, the logic proceeds to step 610 in which the named queue is opened with known API calls to the MQF 114. The mapping logic 112, at this point, cooperatively maintains both the address watching logic status table 110a and the queue watching logic status table 118a respectively with the address watching logic 110 and the queue watching logic 118 to modify the queue status. The logic then proceeds to step 615.

If the named queue is open, the logic proceeds to step 615. In step 615, the logic analyzes the buffered channel program command to determine whether it is HOLDC, that is, hold and lock the MCHR address. This command is used to indicate that a SyncPointed unit of work from a specific mainframe is being initiated. Since the operation to the queue is a series of message Puts that are to be seen as a single unit of work, the operations must be "framed" with a SyncPoint to start the frame and either a Commit or Rollback to end the frame. The preferred embodiment uses the HOLDC to map to the SyncPoint because it will naturally trigger a lock on the MCHR address record through the ordinary processing of the lock facility 108c.

If the command analyzed in step 615 is a HOLDC, the logic modifies state tables 110a and 112 to indicate that a SyncPoint has been requested and then the logic proceeds to step 620, in which the flow of control is caused to return to the DASD engine 108 and eventually the lock facility 108c which will lock the record and thus prevent other entities from accessing the MCHR address corresponding to the queue.

If the command analyzed in step 615 is not a HOLDC, the logic proceeds to step 625 in which the logic determines whether the channel program command is a FILEC, that is, a write command.

If the command analyzed in step 625 is a FILEC, the logic proceeds to step 630 in which the data payload of the buffered channel command is Put to the corresponding named queue. If this is the first FILEC in the unit of work, as indicated by the table 110a having the "Syncpoint" indication set, the FILEC maps to a Put with a Syncpoint parameter set. After such action, the table 110a Syncpoint indication is cleared. If this FILEC is not the first in the transaction, as indicated by the table 110a having the "Syncpoint" indication cleared, the FILEC maps to a Put without setting the Syncpoint parameter. The logic then proceeds to step 635 in which the flow of control is caused to return to the DASD engine 108. In this manner, control is eventually returned to the mainframe, which may then send more Puts in this unit of work, or in which it may send the last Put of the unit of work.

If the command in 625 is not a FILEC, the logic proceeds to step 640, which analyze the buffer channel program command.

If the command analyzed in step 640 is a FILUC, the logic proceeds to step 645 in which the data payload of the buffered channel command is Put to the corresponding named queue and in which the unit of work is omitted, using the known API of the MQF. The logic then proceeds to step 660 in which the flow of control is caused to return to the DASD engine 108 and eventually the lock facility 108c which will unlock the record and thus allow other entities to access the MCHR address corresponding to the queue. The FILUC is used to complete the unit of work. The mainframe may send many FILECs preceding a FILUC, depending on the nature of the unit of work.

If the command in step 640 is not a FILUC, the logic proceeds to step 650 in which the logic determines whether the channel program command is UNFRC, that is, an unlock command.

If the command is an UNFRC, the logic proceeds to step 655, in which a Rollback command is issued to the MQF to abort the entire framed unit of work. If the mainframe application had started to perform Puts of a messages as a SyncPointed unit of work, but for some reason determined that it should not finish, the mainframe send the UNFRC to trigger a rollback using the known API of the MQF. The logic then proceeds to step 660 in which the flow of control is caused to return to the DASD engine 108 and eventually the lock facility 108c which will unlock the record and thus allow other entities to access the MCHR address corresponding to the queue.

If the command analyzed in step 650 is not an UNFRC, the logic proceeds to step 665 in which the flow of control is caused to return to the DASD engine 108 and in which an error condition is signaled. In this scenario, a channel program command has been received which is not recognized.

Figure 7:
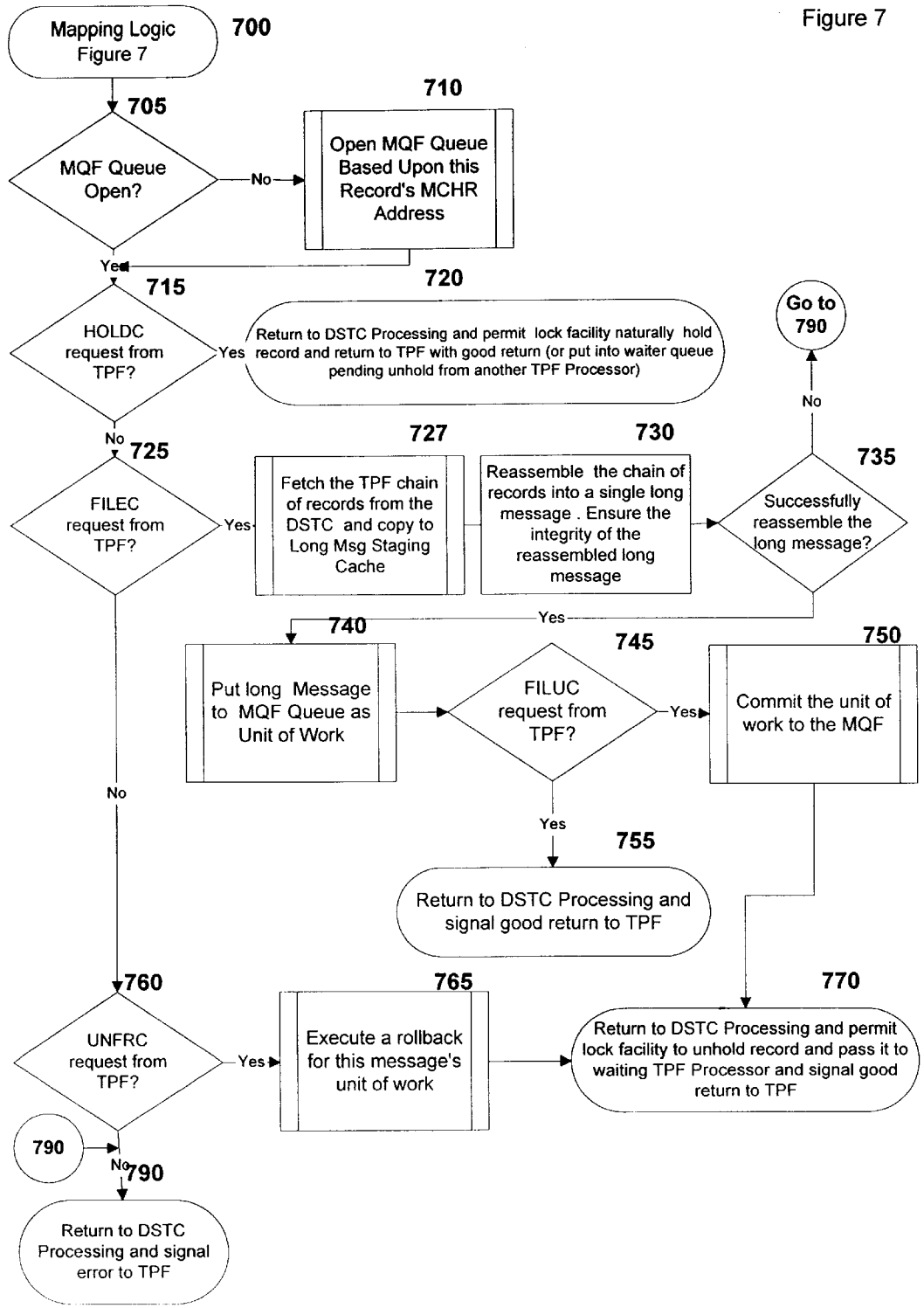
FIG. 7 is a flowchart illustrating preferred logic for handling multiple "Puts" as a unit of work.

FIG. 7 shows the logic for multiple "Put" commands as a transactional "unit of work" in which an individual message in the unit of work may be larger than 4K bytes. The logic is invoked when one of the buffered channel program commands of table 3 is detected by mapping logic 112 in conjunction with an MCHR address associated with large Puts units of work. The logic, as will be explained below, supports Puts to a shared MQF queue. The "shareability" of the queue is a consequence of the functionality extended by the mapping logic 112.

Mainframe software may segment a message that is greater than 4K Bytes into a chain of 4K record segments. Individual records in the TPF chain may then be filed at known file pool addresses resident on the DASD 109 of the modified DSTC 100 as explained above.

TABLE 5

| Description | MQSeries Verb | Buffered Channel Program Command |
|---|---|---|
| Sequence of Verbs to Lock and Put Long Message to a Put Queue as unit of work | | This logic assumes the long message's chain of message segments has been filed using pool MCHRs on DSTC 100 |
| Open Queue | MQOPEN | Any Activity |
| Lock the Queue against shared Update Activity and indicate unit of work - Indicate Syncpoint | N/A | HOLDC |
| Put the first segment of the long message chain to (the head or prime of chain) to queue as the first message in a unit of work | MQPUT (first with sync-point) Put (subsequent without synch-point) | FILUC |
| Internally the mapping logic 112 Puts subsequent message segments of the long message chain to queue as part of the unit of work (not the last message however) | MQPUT without synch-point | The subsequent segments are found internally on the DSTC 100 and put in the long message staging cache 112a |
| Put the last message segment to queue committing the unit of work and unlocking the queue to other shared activity | MQPUT (the last message) MQCMIT | |
| Abort the unit of work and before the Put of the Head of chain. This unlocks the queue for shared update activity | | UNFRC |

The logic begins in step 700 and proceeds to step 705. In step 705, the logic determines whether the named queue is open.

If the named queue is not open, the logic proceeds to step 710 in which the named queue is opened with known API calls to the MQF 114. The mapping logic 112 cooperatively maintains both the address watching logic status table 110a and the queue watching logic status table 118a respectively with the address watching logic 110 and the queue watching logic 118 to modify the queue status.

If the named queue is open, the logic proceeds to step 715. In step 715, the logic analyzes the buffered channel program command to determine whether it is HOLDC, that is, hold and lock the MCHR address. This command is used to indicate a SyncPointed unit of work from a specific mainframe is being initiated. Since the operation to the queue is a series of message puts that are to be seen as a single unit of work, the operations must be "framed" with a known MQF 114 SyncPoint and concluded with either a Commit or Rollback. The preferred embodiment uses the HOLDC command to map to the SyncPoint because it will naturally trigger a lock on the MCHR address record through the ordinary processing of the lock facility 108c. The ordinary locking protects this unit of work from other processors sharing the queue from inserting their messages into this unit of work.

If step 715 determines the command is a HOLDC, the logic proceeds to step 720 in which the table 110a is updated to set the Syncpoint indication, as explained above, and in which the flow of control is returned to DASD engine 108 and in which the lock facility 108a will lock the MCHR address in the ordinary course of processing the HOLDC command.

If the command analyzed in step 715 is not a HOLDC, the logic proceeds to step 725 in which the logic determines whether the channel program command is a FILEC or FILUC type command, that is, a write command or write and unhold/unlock. The FILEC command is used for Puts to a queue being used for unit of works, and it is used as the second command in a series of commands issued for Puts to the queue. The FILUC command is used for the Put to a queue of the last message in a unit of work and then commit the whole unit of work. It can either be the second command in a series of commands issued for a single Put to the queue or after the series of Puts (FILECs) for an multi-message unit of work.

If the command analyzed in step 725 is a either the FILEC or FILUC processing proceeds with step 727. If the command is not a FILEC or a FILUC he logic proceeds to step 760.

In step 727 the logic analyzes the data payload of the buffered channel command. Specifically, the logic analyzes the known forward and back chaining fields of the record in the data payload, and the current record is sequentially copied into the mapping logic's 112 internal long message staging cache 112a. If the mapping logic 112 determines that the known forward chain field in the TPF standard record header is set to binary zeroes, the current record is the end of chain. A nonzero forward chain field in the current record is the known MCHR pool address that points to the next record in chain. The mapping logic 112 uses the forward chain MCHR address to set up the DASD engine 108 to stage an internal FINWC command of the forward chained record. It then triggers the DASD engine 108 to fetch it. The forward chained record fetched by the DASD engine is copied by the mapping logic 112 as the next sequential record into the internal long message staging cache 112a. This scanning process of determining if there is a forward chain and then fetching it to the internal long message staging cache 112a continues until a forward chain field of binary zeroes is found indicating end of chain. Processing proceeds to step 730.

In step 730, the logic analyzes the record chain by stepping sequentially through each record saved in the internal long message staging cache 112a. By using the MCHR addresses in both forward and backward chaining fields of each record, the chain of records can be traversed logically both forward and backwards. This action insures that the physical sequence of the chain as it lies in the internal long message staging cache 112a properly matches its logical sequence. In step 730, the logic reassembles the message segments residing in the chain of records back into one large message. Again by stepping sequentially through each record saved in the internal message staging cache 112a, each standard TPF record header is stripped off from each record and the remaining message segment is concatenated into the long message.

The processing proceeds to step 735 in which the logic determines whether the reassembly was successful. If so, the logic proceeds to step 740; otherwise it is a bad chain and processing continues with step 790. In step 790, if the chain was bad the flow of control is caused to return to the DASD engine 108 and an error condition is signaled.

In step 740, the logic Puts the fully reassembled long message that is in the internal long message staging cache 112a to the open queue in the MQF 114. If the syncpoint indication is set, the long message is put with sync-point including it as part of the unit of work. The logic then proceeds to step 745, where if the I/O file command analyzed in step 725 was a FILUC, processing continues with Step 750. If the command was not a FILUC processing proceeds to Step 755 in which the flow of control is caused to return to the DASD engine 108 signaling a good return to the mainframe.

In step 750, the logic issues a Commit to complete the MQF 114 unit of work. Processing continues with step 770 in which the flow of control is caused to return to the DASD engine 100 and eventually the lock facility 108c which will unlock the record associated with the MCHR of the FILUC and thus allow other entities to access the MCHR address corresponding to the queue.

If the command analyzed in step 725 is not a FILEC or FILUC, the logic proceeds to step 760, in which the buffered channel program command is analyzed. If the command analyzed in step 760 is an UNFRC the logic proceeds to step 765. In step 765, the logic issues a Rollback to the MQF 114 to abort the unit of work. Processing continues with step 770 in which the flow of control is caused to return to the DASD engine 108 and eventually the lock facility 108c which will unlock the record and thus allow other entities to access the MCHR address corresponding to the queue.

If the command analyzed in step 760 is not an UNFRC the logic proceeds to step 790 in which the flow of control is caused to return to the DASD engine 108 and in which an error condition is signaled. In this scenario, a channel program command has been received which is not recognized.

Figure 8:
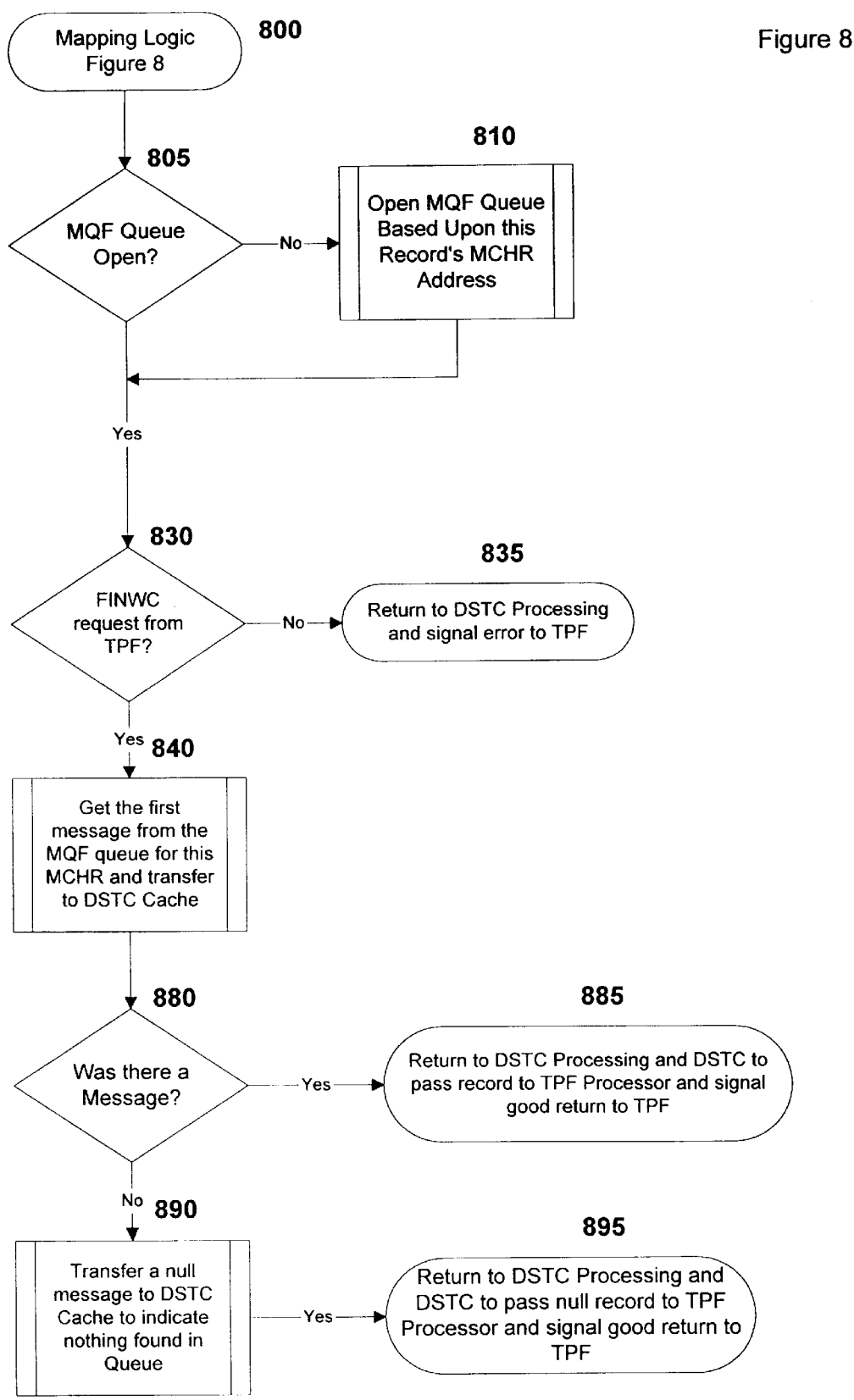
FIG. 8 is a flowchart illustrating preferred logic for handling a "Get" to a non-shared queue.

FIG. 8 shows the logic for a single "Get" command in which the individual message is less than 4K bytes each. This scenario permits the poll of a non-shared queue for a message. If there is a message on queue it will be returned, and if not a null record will be returned. The logic is invoked when one of the buffered channel program commands of table 6 is detected by mapping logic 112 in conjunction with an MCHR address associated with single Gets.

TABLE 6

| Description | MQSeries Verb | Buffered Channel Program Command |
|---|---|---|
| Sequence of Verbs to lock and Get a single message from queue | | |
| Open Queue | MQOPEN | any activity against MCHR |
| Get a message from the Queue. | MQGET | FINWC |

The logic begins in step 800 and proceeds to step 805. In step 805, the logic determines whether the named queue is open.

If the named queue is not open, the logic proceeds to step 810 in which the named queue is opened with known API calls to the MQF 114. The mapping logic 112 cooperatively maintains both the address watching logic status table 110a and the queue watching logic status table 118a respectively with the address watching logic 110 and the queue watching logic 118 to modify the queue state. If the named queue is open, the logic proceeds to step 830.

In step 830, the logic analyzes the buffered channel program command to determine whether it is FINWC, that is, a blocked read.

If the command analyzed in step 830 is not a FIWHC, the logic proceeds to step 835 in which the flow of control is caused to return to the DASD engine 108 and in which an error condition is signaled. In this scenario, a channel program command has been received which is not recognized.

If the command in step 830 is a FINWC, the logic proceeds to step 840. In step 840, the logic issues a Get command to the named queue corresponding to the MCHR address. When MQF 114 returns from processing the Get the logic continues with step 880.

In step 880, the logic determines whether it received a result from the MQF by using the return code from the MQF. If a message was received, the logic proceeds to step 885 in which flow of control is returned to engine 108 and in which processing logic 108b returns the record at the relevant MCHR to the mainframe. If a message was not received, the logic proceeds to step 890.

More specifically, in step 885 the mapping logic 112 places the returned message payload into the DSTC's RAM cache buffer 120 entry that corresponds to the FINWC's MCHR address. Then flow of control is caused to return to the DASD engine and eventually the processing logic 108b which will cause the record to be transferred from the RAM cache buffer 120, across the channel interface 104 into the mainframe.

If the Get to the MQF finds nothing in the named queue (e.g., empty queue), the logic proceeds to step 890 in which the mapping logic 112 places a null record indicating no message into the DSTC's RAM cache buffer 120 entry that corresponds to the FINWC's MCHR address. The logic proceeds to step 895 in which the flow of control is caused to return to the DASD engine 108 and eventually the processing logic 108b which will cause the null record to be transferred from the RAM cache buffer 120, across the channel interface 104 into the mainframe.

Step 895 causes flow of control to return to the DASD engine and the null record is returned to the mainframe.

Figure 9:
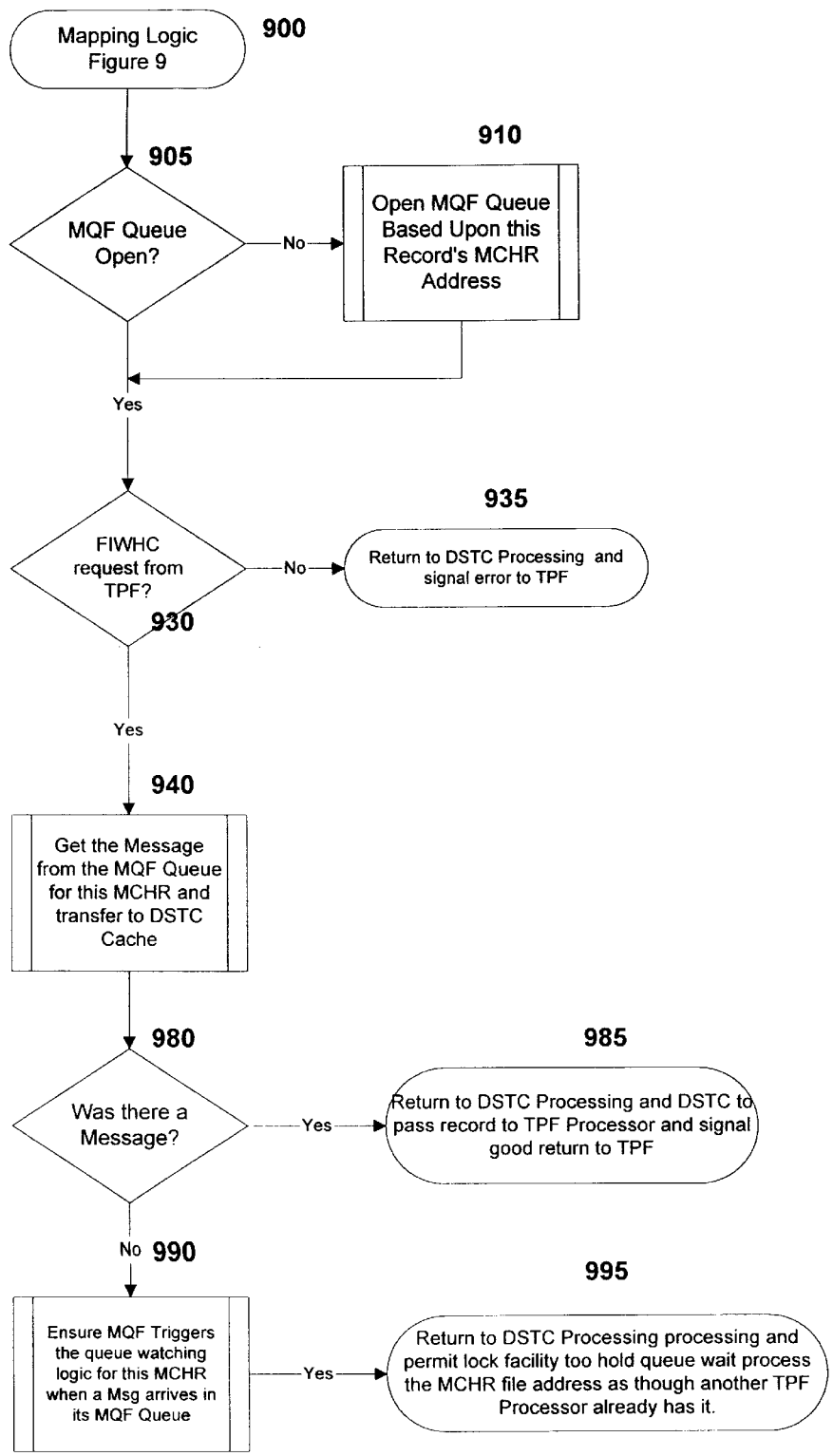
FIG. 9 is a flowchart illustrating preferred logic for handling a "Get" to a shared queue.

FIG. 9 shows the logic for a single "Get" command in which the individual message is less than 4K bytes each. The logic is invoked when one of the buffered channel program commands of table 7 detected by mapping logic 112 in conjunction with an MCHR address associated with single Gets. The logic, as will be explained below, supports Gets to a shared MQF queue. The "shareability" of the queue is a consequence of the functionality extended by the mapping logic 112.

TABLE 7

| Description | MQSeries Verb | Buffered Channel Program Command |
|---|---|---|
| Sequence of Verbs to lock the queue and Get a single message from queue | | |
| Open Queue | MQOPEN | any activity against MCHR |
| Get a message from the Queue. | MQGET | FIWHC |
| Unlock the Queue | N/A | UNFRC |

The logic begins in step 900 and proceeds to step 905. In step 905, the logic determines whether the named queue is open.

If the named queue is not open, the logic proceeds to step 910 in which the named queue is opened with known API calls to the MQF 114. The mapping logic 112 cooperatively maintains both the address watching logic status table 110a and the queue watching logic status table 118a respectively with the address watching logic 110 and the queue watching logic 118 to modify the queue status. Logic proceeds to step 930.

In step 930, the logic analyzes the buffered channel program command to determine whether it is FIWHC, that is, a lock and blocked read. This command is used in instances where the named queue is shareable among multiple mainframes connected to the I/O device 100. Since the intended operation to the named queue is a Get with the intent of transferring the message from the queue to the mainframe as soon as a message appears on the queue, the lock facility 108c is used to protect sequentiality of access. This use of blocked reads prevents the mainframe from continually having to browse the queue for new messages. The preferred embodiment uses the FIWHC because it will naturally trigger a lock on the MCHR address record through the ordinary processing of the lock facility 108c.

If the command analyzed in step 930 is not a FIWHC, the logic proceeds to step 935 in which the flow of control is caused to return to the DASD engine 108 and in which an error condition is signaled. In this scenario, a channel program command has been received which is not recognized.

If the command in step 930 is a FIWHC, the logic proceeds to step 940. In step 940, the logic issues a Get command to the named queue corresponding to the MCHR address. When MQF 114 returns from processing the Get the logic continues with step 980.

In step 980, the logic determines whether it received a result from the MQF by using the return code from the MQF. If a message was received, the logic proceeds to step 985 in which flow of control is returned to engine 108 and in which processing logic 108b returns the record at the relevant MCHR to the mainframe. If a message was not received, the logic proceeds to step 990.

More specifically, in step 985 the mapping logic 112 places the returned message payload into the DSTC's RAM cache buffer 120 entry that corresponds to the FIWHC's MCHR address. Then flow of control is caused to return to the DASD engine 108 and eventually the processing logic 108b which will cause the record to be transferred from the RAM cache buffer 120, across the channel interface 104 into the mainframe. It is then up to the mainframe to execute an UNFRC command to release the lock on the MCHR.

If the Get to the MQF finds nothing in the named queue (e.g., empty queue), the logic in step 990 sets up a "trigger activation" process with queue watching logic 118. The logic of step 990 takes advantage of the FIWHC's lock and read request. Specifically, the logic of step 995 directly calls the DASD engine's lock facility 108c to set conditions to indicate that "another" (phantom) mainframe in the cluster sharing the MCHR already has the record with lock. In this fashion, the results returned to the mainframe will cause the relevant mainframe software to enter a wait state for the record. Thus, the mainframe executing the FIWHC must wait for the "other" to unlock it. The "other" phantom mainframe in reality is the queue watching logic 118, as will be explained below. The logic then proceeds to step 995 in which control flow is returned to DASD engine 108. (Later when the "other", that is the queue watching logic 118, detects a newly-received message in the message queue, the queue watching logic 118 will cause the DASD engine 108 to routinely both unlock the record and attention interrupt the waiting mainframe; in turn the waiting mainframe will re-request the find on the record, and this time it will successfully find it. This process is detailed later in FIG. 19.)

In step 995 the logic causes flow of control to return to the DASD engine 108 and eventually the lock facility 108c. The lock facility 108c will signal the requesting mainframe that another mainframe has a lock on the record and that lock facility 108c will signal all waiting mainframe's when the lock on the desired MCHR corresponding to the queue is released. This lock facility logic is conventional.)

FIG. 10A–B shows the logic for a single "Get" command in which the individual message is greater than 4K bytes each. The logic is invoked when one of the buffered channel program commands of table 8 is detected by mapping logic 112 in conjunction with an MCHR address associated with single large Gets. The logic, as will be explained below, supports Gets to a shared MQF queue. The "shareability" of the queue is a consequence of the functionality extended by the mapping logic 112.

TABLE 8

| Description | MQSeries Verb | Buffered Channel Program Command |
|---|---|---|
| Sequence of Verbs to lock the queue and Get a single long message from queue | | |
| Open Queue | MQOPEN | any activity against MCHR |
| Get the first in chain of a segmented long message from the Queue. | MQGET | FIWHC |
| Get subsequent records in the chain of a segmented long message | | FINWC |
| Unlock the Queue | N/A | UNFRC/FILUC |

The logic begins in step 1000 and proceeds to step 1005. In step 1005, the logic determines whether the named queue is open.

If the named queue is not open, the logic proceeds to step 1010 in which the named queue is opened with known API calls to the MQF 114. The mapping logic 112 cooperatively maintains both the address watching logic status table 110a and the queue watching logic status table 118a respectively with the address watching logic 110 and the queue watching logic 118 to modify the queue status. Logic proceeds to step 1015.

In step 1015, the logic analyzes the buffered channel program command to determine whether it is FIWHC, that is, a lock and blocked read.

If the command analyzed in step 1015 is not a FIWHC, the logic proceeds to step 1072.

If the command in step 1015 is a FIWHC, the logic proceeds to step 1030. In step 1030, the logic issues a Get command to the named queue corresponding to the MCHR address. A Get call is made to the MQF 114 using the known API and causes the long message to be copied from the queue into the mapping logic's 112 internal long message staging cache 112a. When MQF 114 returns from processing the Get the logic continues with step 1035.

In step 1035, the logic determines whether it received a result from the MQF 114 by using the return code from the MQF 114. If a long message was received, the logic proceeds to step 1040. If a message was not received, the logic proceeds to step 1055.

In step 1040, the logic constructs a TPF record chain by segmenting the long message into 4K TPF records in the internal long message staging cache 112a. Each message segment in the record chain is given a standard TPF record header. By placing a sequence number in both the forward and backward chaining fields of each record, the chain of records can be traversed logically both forward and backwards. This action insures that the physical sequence of the segmented chain as it physically lies in the internal long message staging cache 112*a* properly matches its logical sequence. The last record in the chain's forward chaining field is set to null indicating end of chain.

In step 1045 the mapping logic 112 places the first TPF record in the chain that corresponds to the segmented long message into the DASD engine's RAM cache buffer 120 entry that corresponds to the FIWHC's MCHR address. The address watching logic status table 110*a* is updated with a long message cursor indicating the first record of the chain is ready for staging into the DASD engine's RAM cache buffer 120. Processing continues with step 1078.

In step 1035, if the Get to the MQF finds nothing in the named queue (e.g., empty queue), the logic proceeds to step 1055 in which the logic sets up a trigger activation process with queue watching logic 118 similarly to that described above. (As before when the "other", that is the queue watching logic 118 is triggered active by a newly received message in the message queue, the queue watching logic 118 will cause the DASD engine 108 to routinely both unlock the record and attention interrupt the waiting mainframe; in turn the waiting mainframe will re-request the find on the record, and this time it will successfully find it. This process is detailed later in FIG. 19.) The logic proceeds to step 1059 in which the logic causes flow of control to return to the DASD engine 108 and eventually the lock facility 108*c*. The lock facility 108*c* will signal the requesting mainframe that another mainframe has a lock on the record and that lock facility 108*c* will signal all waiting mainframe's when the lock on the desired MCHR corresponding to the queue is released. This lock facility logic is conventional.)

If in step 1015, the logic determined that the command is not a FIWHC, the logic proceeds to step 1072.

In step 1072, the logic analyzes the buffered channel program command to determine whether it is FINWC, that is, blocked read. If it is, processing continues with step 1074. The FINWCs are used to read all subsequent 4K segment of the long Get. If the command analyzed in step 1072 is not a FINWC, the logic proceeds to step 1092 in which the flow of control is caused to return to the DASD engine 108 and in which an error condition is signaled. In this scenario, a channel program command has been received which is not recognized.

In step 1074, the logic checks the address watching logic status table 110*a*'s long message cursor to determine if all of the long message's chained records segments have been transferred to the mainframe. If they have not, then processing continues with step 1078. If the entire long message has been transferred to the mainframe processing continues with step 1076.

In step 1076 the logic places a null record (indicating that all of the long message segments have been transferred to the mainframe) into the DASD engine's RAM cache buffer 120 entry that corresponds to the FINWC's MCHR address. Processing continues with step 1090.

In step 1078, the mapping logic 112 places the next TPF record in the chain indicated by the long message cursor into the DASD engine's RAM cache buffer 120 entry that corresponds to the FIWHC's MCHR address. In step 1080 the logic checks the standard TPF forward chain field of the record just transferred to the DASD engine's RAM cache buffer 120 to determine if this is the last record in the chain. If it is the not the last record in chain processing proceeds to step 1085. If it is the last record in chain processing proceeds to step 1090.

In step 1090, the logic flushes the long message staging cache 112*a* for this entry and clears the address watching logic status table 110*a*'s long message cursor. Processing proceeds to step 1095.

In step 1085, the logic updates the address watching logic status table 110*a*'s long message cursor to point to the next record in the chain. Processing continues with step 1095.

In step 1095, the logic causes the flow of control to return to the DASD engine and eventually the processing logic 108*b* which will cause the record to be transferred from the RAM cache buffer 120, across the channel interface 104 into the mainframe.

When the last record of the chain is transferred to the mainframe it is then up to the mainframe application to execute an UNFRC command to release the lock on the MCHR.

FIGS. 11A–B show the logic for multiple "Get" commands in which the individual messages make up a transactional unit of work. The messages are less than 4K bytes each. The logic is invoked when one of the buffered channel commands of table 9 is detected in conjunction with an MCHR address associated with multiple Gets. The logic, as will be explained below, supports Gets to a shared MQF queue. The "shareability" of the queue is a consequence of the functionality extended by the mapping logic 112.

TABLE 9

| Description | MQSeries Verb | Buffered Channel Program Command |
| --- | --- | --- |
| Sequence of Verbs to Lock and Get messages from a queue as unit of work that are less than 4K | | This logic assumes the inbound messages will fit into a TPF 4K block size or less |
| Open Queue | MQOPEN | Any Activity |
| Lock the Queue against shared Update Activity and indicate a Get unit of work - Indicate Sync-point. | MQGET (first with sync-point) | HOLDC |
| Get subsequent messages in the unit of work. | MQGET | FINDC |
| TPF application requests the commit of the read unit of work and the unlocking of the queue to other shared queue activity | MQCMIT | UNFRC |
| Abort the read unit of work and leave it in the queue. Also unlocks the queue for shared activity | MQBACK | FILUC |

The logic begins in step 1100 and proceeds to step 1105. In step 1105, the logic determines whether the named queue is open.

If the named queue is not open, the logic proceeds to step 1110 in which the named queue is opened with known API calls to the MQF 114. The mapping logic 112 cooperatively maintains both the address watching logic status table 110*a* and the queue watching logic status table 118*a* respectively with the address watching logic 110 and the queue watching logic 118 to modify the queue status. Processing continues with step 1125.

In step 1125, the logic analyzes the buffered channel program command to determine whether it is HOLDC, that is, a lock. If the command is a HOLDC, the processing continues with step 1130 in which flow of control is returned to the engine 108 and lock facility 108c, which will lock the MCHR. The table 110a is updated to set the syncpoint indication.

If the command analyzed in step 1125 is not a HOLDC, the logic proceeds to step 1135. In step 1135, the logic analyzes the buffered channel program command to determine whether it is FINWC, that is, a blocked read. If it is, the logic continues with step 1137; otherwise processing continues with step 1180.

In step 1137, the logic issues a Get command with sync-point, indicating a unit of work, to the named queue corresponding to the MCHR if the syncpoint indication is set in table 110a. When the MQF 114 returns a result, processing continues with step 1155.

In step 1155, the logic uses the return code from the MQF 114 to determine if the MQF 114 returned a message. If it didn't find a message, the logic proceeds to step 1160. If logic received a message, the logic continues with step 1159.

In step 1159, the logic places the returned message payload into the DSTC's RAM cache buffer 120 entry that corresponds to the FINWC's MCHR address. The logic also updates the address watching logic table 110a entry for this MCHR to indicate data transfer for this Get unit of work has begun and to clear the syncpoint. The logic proceeds to step 1169 in which flow of control is caused to return to the DASD engine 108 and eventually the processing logic 108c which will cause the record to be transferred from the RAM cache buffer 120, across the channel interface 104 into the mainframe.

In step 1160, the logic checks the address watching logic table 110a entry for this MCHR to see if data transfer from queue to mainframe for this Get unit of work has actually begun. If it has not begun, then processing must set up a wait for an incoming unit of work to be received in the queue. This trigger wait processing setup occurs in step 1170. If in step 1160, data transfer of the unit of work has begun from queue to mainframe, then the absence of any message on the MQF's 114 receive queue indicates the entire unit of work has been transferred to the mainframe. Processing continues with step 1165.

In step 1170, the mapping logic 112 sets up a trigger activation process with queue watching logic 118 similarly to that described above in FIGS. 9 and 10. The logic then proceeds to step 1175.

In step 1175, the logic returns flow of control lock facility to the DASD engine 108 and eventually the lock facility 108c. The lock facility will signal the requesting mainframe that another mainframe has a lock on the record and that lock facility 108c will signal all waiting mainframe's when the lock on the desired MCHR corresponding to the queue is released.

In step 1165, the logic places a null record (indicating the end of unit of work has been reached) into the DSTC's RAM cache buffer 120 entry that corresponds to the FINWC's MCHR address. The logic proceeds to step 1169, in which the flow of control is caused to return to the DASD engine 108 and eventually the processing logic 108b which will cause the null record to be transferred from the RAM cache buffer 120, across the channel interface 104 into the mainframe.

In step 1180, the logic determines if the buffered command is an UNFRC. If it is an UNFRC, processing continues with Step 1185. If the command is not an UNFRC, processing continues with step 1190 to determine if the command a FILUC. If it is a FILUC, processing continues with step 1192. Otherwise, the command is not recognized and the logic proceeds to step 1199 in which the flow of control is caused to return to the DASD engine 108 and in which an error condition is signaled. In this scenario, a channel program command has been received which is not recognized.

In step 1185 the logic issues a Commit to the MQF 114 the unit of work since it has been successfully and completely transferred from queue to mainframe. Processing continues with step 1195 in which the flow of control is caused to return to the DASD engine 108 and eventually the lock facility 108c which will unlock the record associated with the MCHR of the UNFRC and thus allow other entities to access the MCHR address corresponding to the queue.

If the command analyzed in step 1190 is a FILUC the logic proceeds to step 1192. In step 1192, the logic issues a Rollback to the MQF 114 to abort the unit of work. Processing continues with step 1195 in which the flow of control is caused to return to the DASD engine 108 and eventually the lock facility 108c which will unlock the record and thus allow other entities to access the MCHR address corresponding to the queue.

FIGS. 12A–B shows the logic for multiple "Get" commands in which the individual messages make up a transactional unit of work. Any given message in the unit of work may be greater 4K bytes each. The logic is invoked when one of the buffered channel commands of table 10 is detected in conjunction with an MCHR address associated with multiple Gets. The logic, as will be explained below, supports Gets to a shared MQF queue. The "shareability" of the queue is a consequence of the functionality extended by the mapping logic 112.

TABLE 10

| Description | MQSeries Verb | Buffered Channel Program Command |
| --- | --- | --- |
| Sequence of Verbs to Lock and Get messages from a queue as unit of work that may be greater than 4K | | This logic assumes the inbound messages may be greater than a TPF 4K block size |
| Open Queue | MQOPEN | Any Activity |
| Lock the Queue against shared Update Activity and indicate a Get unit of work - Indicate Sync-point. | MQGET (first with sync-point) | HOLDC |
| Get subsequent messages in the unit of work. | MQGET | FINWC |
| TPF application requests the commit of the read unit of work and the unlocking of the queue to other shared queue activity | MQCMIT | UNFRC |
| Abort the read unit of work and leave it in the queue. Also unlocks the queue for shared activity | MQBACK | FILUC |

The logic begins in step 1200 and proceeds to step 1205. In step 1205, the logic determines whether the named queue is open.

If the named queue is not open, the logic proceeds to step 1210 in which the name queue is opened with known API calls to the MQF 114. The mapping logic 112 cooperatively maintains both the address watching logic status table 110a and the queue watching logic status table 118a respectively with the address watching logic 110 and the queue watching logic 118 to modify the queue status. Processing continues with step 1225.

In step 1225, the logic analyzes the buffered channel program command to determine whether it is HOLDC, that is, a lock. If the command is a HOLDC, the processing continues with step 1230 in which flow of control is returned to the engine 108 and lock facility 108c, which will lock the MCHR. The table 110a is updated to set the syncpoint indication.

If the command analyzed in step 1225 is not a HOLDC, the logic proceeds to step 1235. In step 1235, the logic analyzes the buffered channel program command to determine whether it is FINWC, that is, a blocked read. If it is, the logic continues with step 1237; otherwise processing continues with step 1280. Steps 1237 and 1240 are processing pass connectors to step 1242.

Step 1242 checks the address watching logic table 110a to determine if any messages have been transferred for this unit of work. If a unit of work is being transferred then processing proceeds to step 1250. Otherwise in step 1244, the logic issues a Get command with sync-point to get the first long message in a unit of work from the named queue corresponding to the MCHR address. The Get call is made to the MQF 114 using the known API causes the long message to be copied from the queue into the mapping logic's 112 internal long message staging cache 112a. When MQF 114 returns from processing the Get the logic continues with step 1260.

In step 1260, the logic determines whether it received a result from the MQF 114 by using the return code from the MQF 114. If a long message was received, the logic proceeds to step 1265. If a message was not received, the logic proceeds to step 1261.

In step 1265, the logic constructs a TPF record chain by segmenting the first long message into 4K TPF records in the internal long message staging cache 112a. Each message segment in the record chain is given a standard TPF record header. By placing a sequence number in both the forward and backward chaining fields of each record, the chain of records can be traversed logically both forward and backwards. This action insures that the physical sequence of the segmented chain as it physically lies in the internal long message staging cache 112a properly matches its logical sequence. The last record in the chain's forward chaining field is set to null indicating end of chain.

In step 1267 the mapping logic 112 places the first TPF record in the chain that corresponds to the segmented long message into the DSTC engine's (108) RAM cache buffer 120 entry that corresponds to the FIWHC's MCHR address. The address watching logic status table 110a is updated with a long message cursor indicating the first record of the chain is ready for transfer from the DSTC engine's RAM cache buffer 120 into the mainframe. Processing continues with step 1279.

In step 1261, the mapping logic 112 sets up a trigger activation process with queue watching logic 118 similarly to that described above in FIGS. 9 and 10 to wait for a unit of work to be received in the queue. The logic then proceeds to step 1262. In step 1262, the logic returns flow of control lock facility to the DSTC engine 108 and eventually the lock facility 108c. The lock facility will signal the requesting mainframe that another mainframe has a lock on the record and that lock facility 108c will signal all waiting mainframe's when the lock on the desired MCHR corresponding to the queue is released.

In step 1250 (from step 1242), the logic checks the address watching logic status table 110a's long message cursor to determine if all of the long message's chained records segments have been transferred to the mainframe. If they have not, then processing continues with step 1251. If the entire long message has been transferred to the mainframe processing continues with step 1252.

In step 1251, the mapping logic 112 places the next TPF record in the chain indicated by the long message cursor into the DSTC engine's RAM cache buffer 120 entry that corresponds to the FIWHC's MCHR address. Processing continues with step 1279 after incrementing the long message cursor.

In step 1279 the flow of control is caused to return to the DSTC engine 108 and eventually to the processing logic 108c which will cause the record to be transferred from the RAM cache buffer 120, across the channel interface 104 into the mainframe.

In step 1252, the logic issues another Get command to get the next message in the sync-pointed unit of work from the named queue corresponding to the MCHR address. A Get call is made to the MQF 114 using the known API causes the long message to be copied from the queue into the mapping logic's 112 internal long message staging cache 112a. When MQF 114 returns from processing the Get the logic continues with step 1254.

In step 1254, the logic determines whether it received a result from the MQF 114 by using the return code from the MQF 114. If a long message was received, the logic proceeds to step 1256. If a message was not received, the logic proceeds to step 1258.

In step 1256, the logic again constructs a TPF record chain by segmenting the long message into 4K TPF records in the internal long message staging cache 112a. Each message segment in the record chain is given a standard TPF record header. By placing a sequence number in both the forward and backward chaining fields of each record, the chain of records can be traversed logically both forward and backwards. This action insures that the physical sequence of the segmented chain as it physically lies in the internal long message staging cache 112a properly matches its logical sequence. The last record in the chain's forward chaining field is set to null indicating end of chain. In step 1257, the logic prepares a X'FF'ed record indicating that both the end of a long message has been reached, but not the end of unit of work. The address watching logic status table 110a's long message cursor is cleared for the next long message. The X'FF'ed record is placed into the DSTC's RAM cache buffer 120 entry that corresponds to the FINWC's MCHR address. The logic proceeds to step 1279, in which the flow of control is caused to return to the DSTC engine 108 and eventually the processing logic 108b which will cause the X'FF'ed record to be transferred from the RAM cache buffer 120, across the channel interface 104 into the mainframe.

In step 1258, the logic prepares a null record indicating both the end of a long message and the end of unit of work has been reached. This null record is placed into the DSTC's RAM cache buffer 120 entry that corresponds to the FINWC's MCHR address. In step 1259 the internal long message staging cache 112a entry for this long message is cleared as well as the address watching logic status table 110a's long message cursor is cleared. The logic proceeds to step 1279, in which the flow of control is caused to return to the DSTC engine 108 and eventually the processing logic 108b which will cause the null record to be transferred from the RAM cache buffer 120, across the channel interface 104 into the mainframe.

In step 1280, the logic determines if the buffered command is an UNFRC.

If it is an UNFRC, processing continues with Step 1285. If the command is not an UNFRC, processing continues with step 1290 to determine if the command a FILUC. If it is a FILUC, processing continues with step 1292. Otherwise, the command is not recognized and the logic proceeds to step 1299 in which the flow of control is caused to return to the DSTC engine 108 and in which an error condition is signaled. In this scenario, a channel program command has been received which is not recognized.

In step 1285 the logic issues a Comment to the MQF 114 the unit of work since it has been successfully and completely transferred from queue to mainframe. Processing continues with step 1295 in which the flow of control is caused to return to the DSTC engine 108 and eventually the lock facility 108c which will unlock the record associated with the MCHR of the UNFRC and thus allow other entities to access the MCHR address corresponding to the queue.

If the command analyzed in step 1290 is a FILUC the logic proceeds to step 1292. In step 1292, the logic issues a Rollback to the MQF 114 to abort the unit of work. Processing continues with step 1295 in which the flow of control is caused to return to the DSTC engine 108 and eventually the lock facility 108c which will unlock the record and thus allow other entities to access the MCHR address corresponding to the queue.

Figure 13:
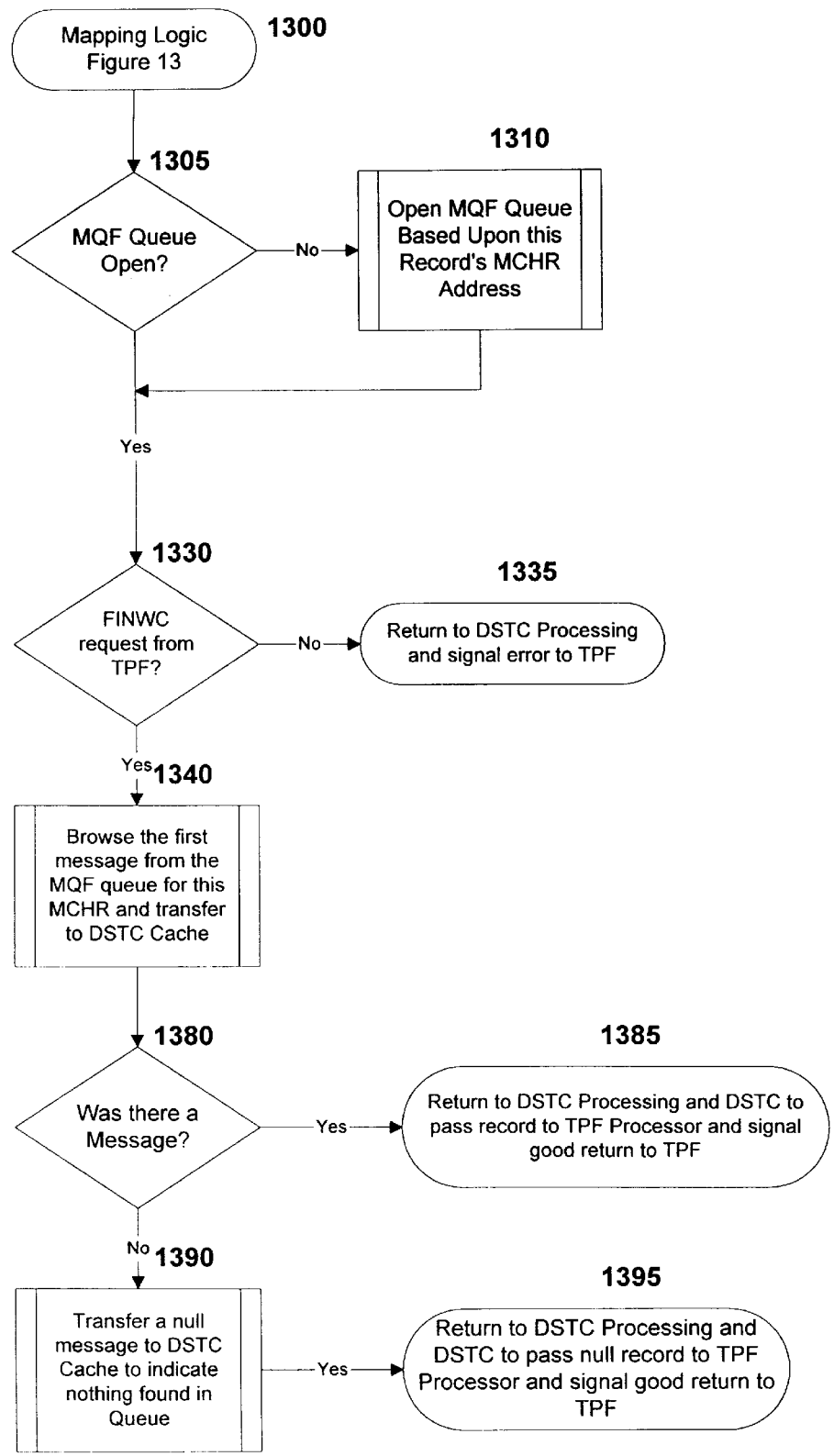
FIG. 13 is a flowchart illustrating preferred logic for handling a browse to a first message to a queue.

FIG. 13 shows the logic for a "Browse First" command in which the individual message is less than 4K bytes each. The logic is invoked when one of the buffered channel program commands of table 11 is detected by mapping logic 112 in conjunction with an MCHR address associated with Browse First.

TABLE 11

| Description | MQSeries Verb | Buffered Channel Program Command |
|---|---|---|
| Sequence of Verbs to Browse a queue for the first message in the queue | | |
| Open Queue | MQOPEN | any activity against MCHR |
| Browse the first message in the queue. | MQGET | FINWC |

The logic begins in step 1300 and proceeds to step 1305. In step 1305, the logic determines whether the named queue is open.

If the named queue is not open, the logic proceeds to step 1310 in which the named queue is opened with known API calls to the MQF 114. The mapping logic 112 cooperatively maintains both the address watching logic status table 110a and the queue watching logic status table 118a respectively with the address watching logic 110 and the queue watching logic 118 to modify the queue status.

If the named queue is open, the logic proceeds to step 1330. In step 1330, the logic analyzes the buffered channel program command to determine whether it is FINWC, that is, a read of a given MCHR. This command is used to map to Browse First verbs. A Browse to an MQF 114 named queue is a nondestructive access or read in which the message is read but the message remains in the queue. If a FINWC is detected, the logic proceeds to step 1340.

If the command analyzed in step 1330 is not a FINWC, the logic proceeds to step 1335 in which the flow of control is caused to return to the DASD engine 108 and in which an error condition is signaled. In this scenario, a channel program command has been received which is not recognized.

In step 1340, the logic issues a Get with Browse_First option to the MQF 114. The mapping logic 112 places the returned message payload into the DSTC's RAM cache buffer 120 entry that corresponds to the FINWC's MCHR address. The logic then proceeds to step 1380.

In step 1380 when the mapping logic 112 detects a return code from the MQF that a message was returned, processing proceeds to step 1385. In step 1385 the logic causes the flow of control to return to the DASD engine 108 and eventually the channel program processing logic 108a which will cause the browse record to be transferred from the RAM cache buffer 120, across the channel interface 104 into the mainframe.

If there is no message in step 1380, the logic proceeds to step 1390 in which a null record in the cache buffer 120. The logic proceeds to step 1395 in which the null record is returned to the mainframe.

Figure 14:
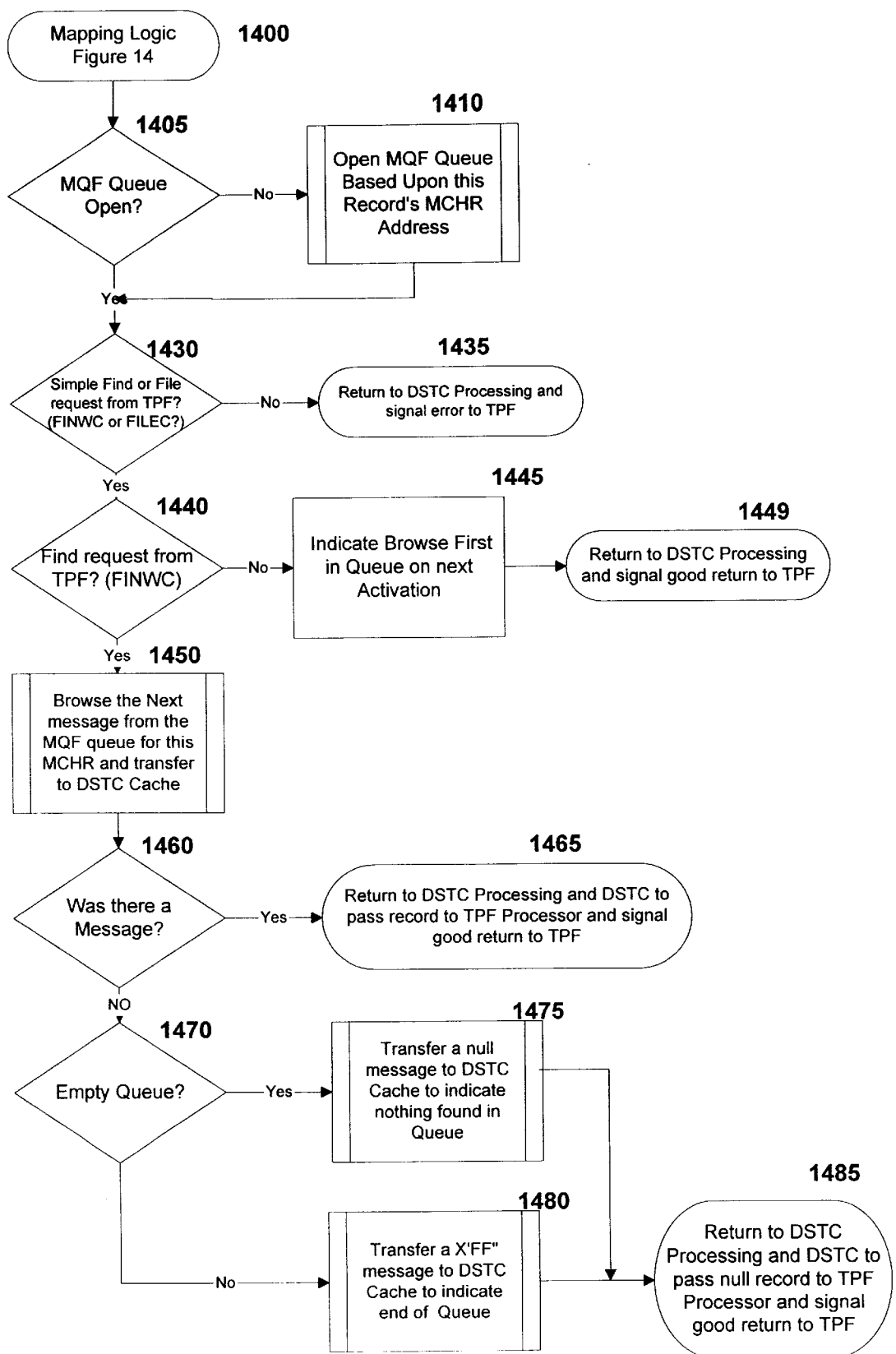
FIG. 14 is a flowchart illustrating preferred logic for handling a browse to the next message of a queue.

FIG. 14 shows the logic for a "Browse Next" command in which the individual message is less than 4K bytes each. The logic is invoked when one of the buffered channel program commands of table 12 detected by mapping logic 110 in conjunction with an MCHR address associated with Browse Next.

TABLE 12

| Description | MQSeries Verb | Buffered Channel Program Command |
|---|---|---|
| Sequence of Verbs to Browse the next message in the queue | | |
| Open Queue | MQOPEN | any activity against MCHR |
| Force Browse Next to beginning of Queue | N/A | FILEC |
| Browse the next message in the queue. | MQGET | FINWC |

The logic begins in step 1400 and proceeds to step 1405. In step 1405, the logic determines whether the named queue is open.

If the named queue is not open, the logic proceeds to step 1410 in which the named queue is opened with known API calls to the MQF 114 The mapping logic 112 cooperatively maintains both the address watching logic status table 110a and the queue watching logic status table 118a respectively with the address watching logic 110 and the queue watching logic 118 to modify the queue status.

If the named queue is open, the logic proceeds to step 1430. In step 1430, the logic analyzes the buffered channel program command to determine whether it is FINWC, that is, a blocked read of a given MCHR or a FILEC, that is, a simple file write without lock. These commands are used respectively to map to the Browse Next verb and force the Browse Next to the beginning of the queue. A Browse to an MQF 114 named queue is a nondestructive access or read in which the message is read but the message remains in the queue. If a FINWC or FILEC are detected, the logic proceeds to step 1440.

If the command analyzed in step 1430 is not a FINWC or FILEC, the logic proceeds to step 1435 in which the flow of control is caused to return to the DASD engine 108 and in which an error condition is signaled. In this scenario, a channel program command has been received which is not recognized.

In step 1430, if the command is a FILEC, the logic proceeds to step 1445, in which the logic sets the Browse Next indicator in the address watching logic status table 110, for this MCHR entry to force the Browse_Next to the beginning of the queue. The logic proceeds to step 1449 in which the flow of control is caused to return to the DASD engine 108 and in which a good return condition is signaled. If the command wasn't a FILEC it is a FINWC, which is processed in 1450.

In step 1450, the logic issues a Get with Browse_Next option to the MQF 114. If the force to beginning of queue indicator is set in the address watching logic status table 110a entry for this MCHR, the Get with Browse_Next is forced to the beginning of the queue. The mapping logic 112 places the returned message payload into the DSTC's 102 RAM cache buffer 120 entry that corresponds to the FINWC's MCHR address. The logic then proceeds to step 1460.

In step 1460, when the logic detects a return code from the MQF that a message was returned processing proceeds to step 1465. In step 1465, the logic causes the flow of control to return to the DASD engine 108 and eventually the channel program processing logic 108a which will cause the browse record to be transferred from the RAM cache buffer 120, across the channel interface 104 into the mainframe.

If there is no message returned, the logic proceeds to step 1470. In step 1470 if the return code indicated that the queue was empty, step 1475 causes the logic to place a null record (indicating an empty queue) into the DSTC's RAM cache buffer 120 entry that corresponds to the FINWC's MCHR address. In step 1485, the logic causes flow of control to return to the DASD engine 108 and eventually the processing logic 108b which will cause the null record to be transferred from the RAM cache buffer 120, across the channel interface 104 into the mainframe.

In step 1470 if the return code indicated that all records currently in the queue have been browsed, step 1480 causes the logic to place a record filled with X'FF's (indicating end of queue) into the DSTC's RAM cache buffer 120 entry that corresponds to the FINWC's MCHR address. In step 1485 flow of control is caused to return to the DASD engine and eventually the processing logic 108b which will cause the X'FF' null record to be transferred from the RAM cache buffer 120, across the channel interface 104 into the mainframe.

Figure 15:
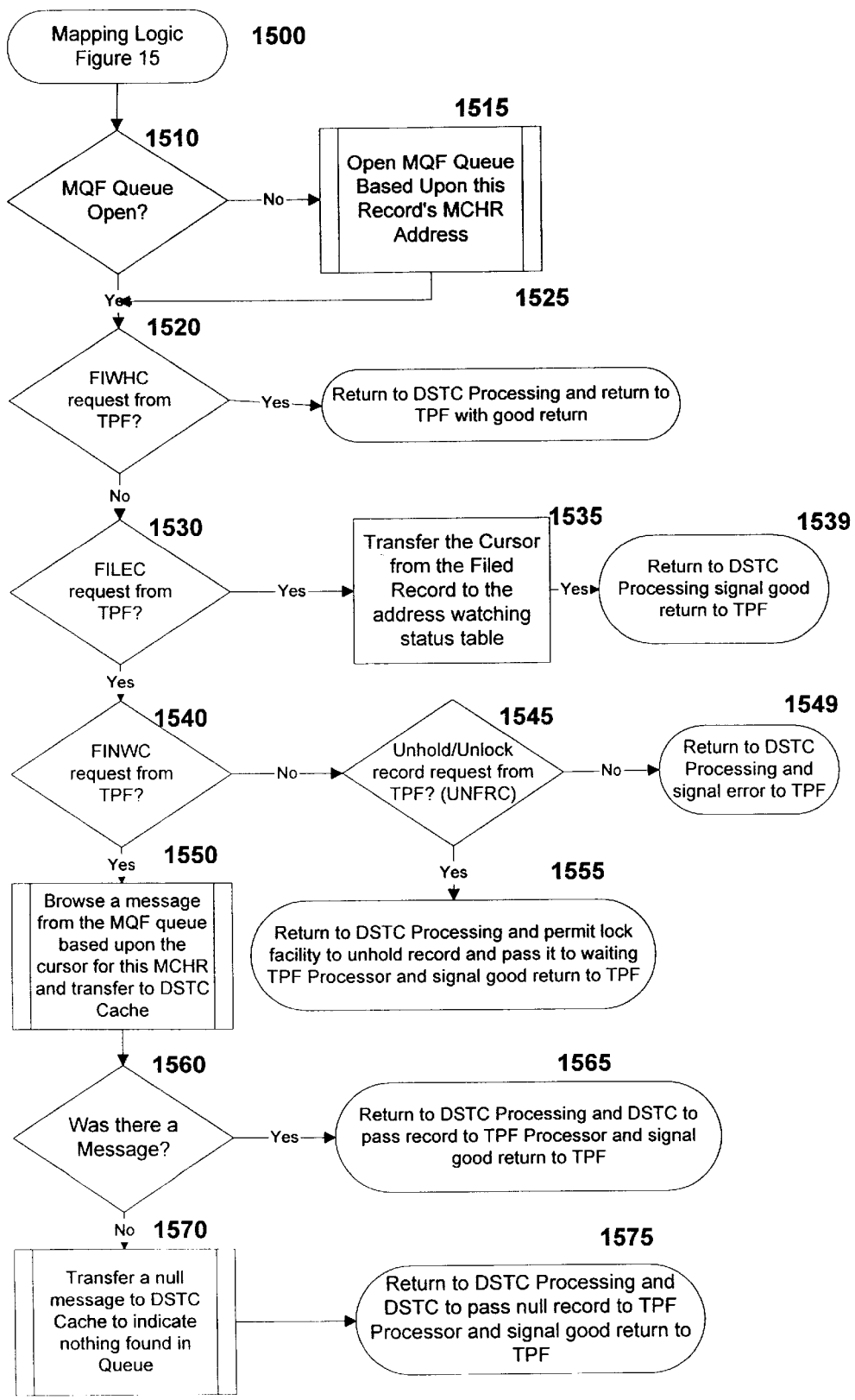
FIG. 15 is a flowchart illustrating preferred logic for handling a browse with a cursor identifying the message to be browsed from a queue.

FIG. 15 shows the logic for a "Browse_with_Cursor" command in which the individual message is less than 4K bytes each. The logic is invoked when one of the buffered channel program commands of table 13 detected by mapping logic 110 in conjunction with an MCHR address associated with Browse_with_Cursor.

TABLE 13

| Description | MQSeries Verb | Buffered Channel Program Command |
|---|---|---|
| Sequence of Verbs to Browse_with_Cursor message in the queue | | |
| Open Queue | MQOPEN | any activity against MCHR |
| Lock the Queue from sharing | N/A | FIWHC |
| Force Browse_with_Cursor to beginning of Queue | N/A | FILEC |
| Browse_with_Cursor message in the queue. | MQGET | FINWC |
| Unlock the queue | N/A | UNFRC |

The logic begins in step 1500 and proceeds to step 1510. In step 1510, the logic determines whether the named queue is open.

If the named queue is not open, the logic proceeds to step 1515 in which the named queue is opened with known API calls to the MQF 114 The mapping logic 112 cooperatively maintains both the address watching logic status table 110a and the queue watching logic status table 118a respectively with the address watching logic 110 and the queue watching logic 118 to modify the queue status.

If the named queue is open, the logic proceeds to step 1520. In step 1520, the logic analyzes the buffered channel program command to determine whether it is FIWHC, that is, a blocked read and lock.

If the command analyzed in step 1540 is a FIWHC command, the logic proceeds to step 1525, in which the flow of control is caused to return to the DASD engine 108 and eventually the lock facility 108c which will lock the record and thus prevent other entities from accessing the MCHR address corresponding to the queue.

If the command is not a FIWHC, the logic proceeds to step 1530.In step 1530, if the command analyzed in step 1530 is a FILEC, the logic proceeds to step 1535 in which the data payload is the numeric cursor for a Browse_with_Cursor call to the MQF 114. The numeric cursor is transferred to the address watching logic status table 110a entry's cursor field for this MCHR. The logic proceeds to step 1539 in which the flow of control is caused to return to the DASD engine 108 and in which a good return condition is signaled. If the command wasn't a FILEC processing proceeds to step 1540.

In step 1540 if the command analyzed is a FINWC, that is, a blocked read, the command is mapped to a Browse_with_Cursor to the queue that corresponds to this MCHR in step 1550. The Browse_with_Cursor call is made to the MQF 114 named queue using the numeric cursor saved in the address watching logic status table 110a for this MCHR. The browse with cursor is a nondestructive access or read to a specific message that is read but the message remains in the queue. The logic places the returned message payload into the DSTC's RAM cache buffer 120 entry that corresponds to the FINWC's MCHR address. The logic then proceeds to step 1560. If the command analyzed in step 1540 is not a FINWC, the logic proceeds to step 1545.

In step 1545 if the command analyzed is not an UNFRC, the logic proceeds to step 1549 in which the flow of control is caused to return to the DASD engine 108 and in which an error condition is signaled. In this scenario, a channel program command has been received which is not recognized.

If the command analyzed in step 1545 is an UNFRC, the logic proceeds to step 1555 in which the flow of control is caused to return to the DASD engine 108 and eventually the lock facility 108c which will unlock the record and thus allow other entities to access the MCHR address corresponding to the queue.

In step 1560, when the mapping logic 112 detects a return code from the MQF 114 that a message was returned, processing proceeds to step 1565. In step 1565 the logic causes the flow of control to return to the DASD engine 108 and eventually the channel program processing logic 108a which will cause the browse record to be transferred from the RAM cache buffer 120, across the channel interface 104 into the mainframe.

In step 1560, if the return code indicated that the queue was empty, the logic proceed to step 1570 in which the logic causes a null record (indicating an empty queue) to be placed into the DSTC's RAM cache buffer 120 entry that corresponds to the FINWC's MCHR address. In step 1575 flow of control is caused to return to the DASD engine and eventually the processing logic 108*b* which will cause the null record to be transferred from the RAM cache buffer 120, across the channel interface 104 into the mainframe.

Figure 16:
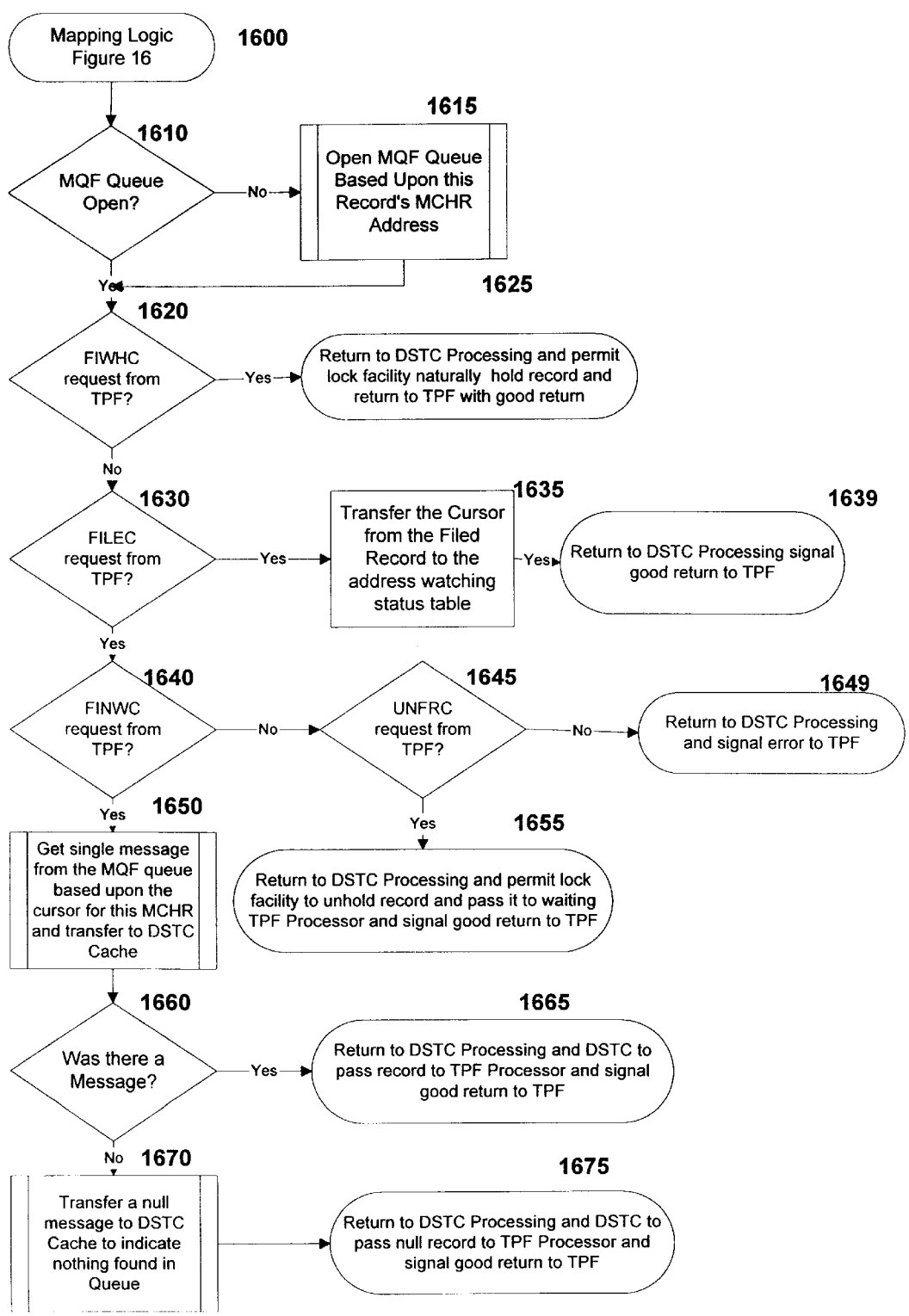
FIG. 16 is a flowchart illustrating preferred logic using a cursor to handle identifying and selecting for a "Get" of specific message from a queue.

FIG. 16 shows the logic for a "Get_with_Cursor" command in which the individual message is less than 4K bytes each. The logic is invoked when one of the buffered channel program commands of table 14 detected by mapping logic 110 in conjunction with an MCHR address associated with Get_with_Cursor. The logic, as will be explained below, supports Gets to a shared MQF queue. The "shareability" of the queue is a consequence of the functionality extended by the mapping logic 112.

TABLE 14

| Description | MQSeries Verb | Buffered Channel Program Command |
|---|---|---|
| Sequence of Verbs to Get_with_Cursor message in the queue | | |
| Open Queue | MQOPEN | any activity against MCHR |
| Lock the Queue from sharing | N/A | FIWHC |
| Force Get_with_Cursor to beginning of Queue | N/A | FILEC |
| Get_with_Cursor message in the queue. | MQGET | FINWC |
| Unlock the queue | N/A | UNFRC |

The logic begins in step 1600 and proceeds to step 1610. In step 1610, the logic determines whether the named queue is open.

If the named queue is not open, the logic proceeds to step 1615 in which the named queue is opened with known API calls to the MQF 114 The mapping logic 112 cooperatively maintains both the address watching logic status table 110*a* and the queue watching logic status table 118*a* respectively with the address watching logic 110 and the queue watching logic 118 to modify the queue status.

If the named queue is open, the logic proceeds to step 1620. In step 1620, the logic analyzes the buffered channel program command to determine whether it is FIWHC, that is, a blocked read and lock. This command is used in instances where the queue is shareable among multiple mainframes connected to the I/O device. The preferred embodiment uses the FIWHC because it will naturally trigger a lock on the MCHR address record through the ordinary processing of the lock facility 108*c*. The lock precludes other mainframes from accessing the corresponding MCHR record until the lock is released (Unhold).

If the command analyzed in step 1620 is a FIWHC command, the logic proceeds to step 1625, in which the flow of control is caused to return to the DASD engine 108 and eventually the lock facility 108*c* which will lock the record and thus prevent other entities from accessing the MCHR address corresponding to the queue.

If the command in step 1620 is not a FIWHC, the logic proceeds to step 1630. In step 1630, if the command analyzed in step 1630 is a FILEC, the logic proceeds to step 1615 in which the data payload is the numeric cursor for a Get_with_Cursor call to the MQF 114. The numeric cursor is transferred to the address watching logic status table 110*a* entry's cursor field for this MCHR. The logic proceeds to step 1639 in which the flow of control is caused to return to the DASD engine 108 and in which a good return condition is signaled. If the command wasn't a FILEC processing proceeds to step 1640.

In step 1640, if the command analyzed is a FINWC, that is, a blocked read, the command is mapped to a Get_with_Cursor to the queue that corresponds to this MCHR in step 1650. The Get_with_Cursor call is made to the MQF 114 named queue using the numeric cursor saved in the address watching logic status table 110*a* for this MCHR. The Get with cursor Gets a specific message that from the queue. The logic places the returned message payload into the DSTC's RAM cache buffer 120 entry that corresponds to the FINWC's MCHR address. The logic then proceeds to step 1660. If the command is not a FINWC, the logic proceeds to step 1645.

In step 1645 if the command analyzed is not an UNFRC, the logic proceeds to step 1649 in which the flow of control is caused to return to the DASD engine 108 and in which an error condition is signaled. In this scenario, a channel program command has been received which is not recognized.

If the command analyzed in step 1645 is an UNFRC, the logic proceeds to step 1655 in which the flow of control is caused to return to the DASD engine 108 and eventually the lock facility 108*c* which will unlock the record and thus allow other entities to access the MCHR address corresponding to the queue.

In step 1660, when the mapping logic 112 detects a return code from the MQF 114 that a message was returned, processing proceeds to step 1665. In step 1665 the flow of control is caused to return to the DASD engine and eventually the channel program processing logic 108*a* which will cause the Get record to be transferred from the RAM cache buffer 120, across the channel interface 104 into the mainframe.

In step 1660 if the return code indicated that the queue was empty, the logic proceeds to step 1670 and places a null record (indicating an empty queue) into the DSTC's RAM cache buffer 120 entry that corresponds to the FINWC's MCHR address in step 1670. In step 1675 flow of control is caused to return to the DASD engine and eventually the processing logic 108*b* which will cause the null record to be transferred from the RAM cache buffer 120, across the channel interface 104 into the mainframe.

Figure 17:
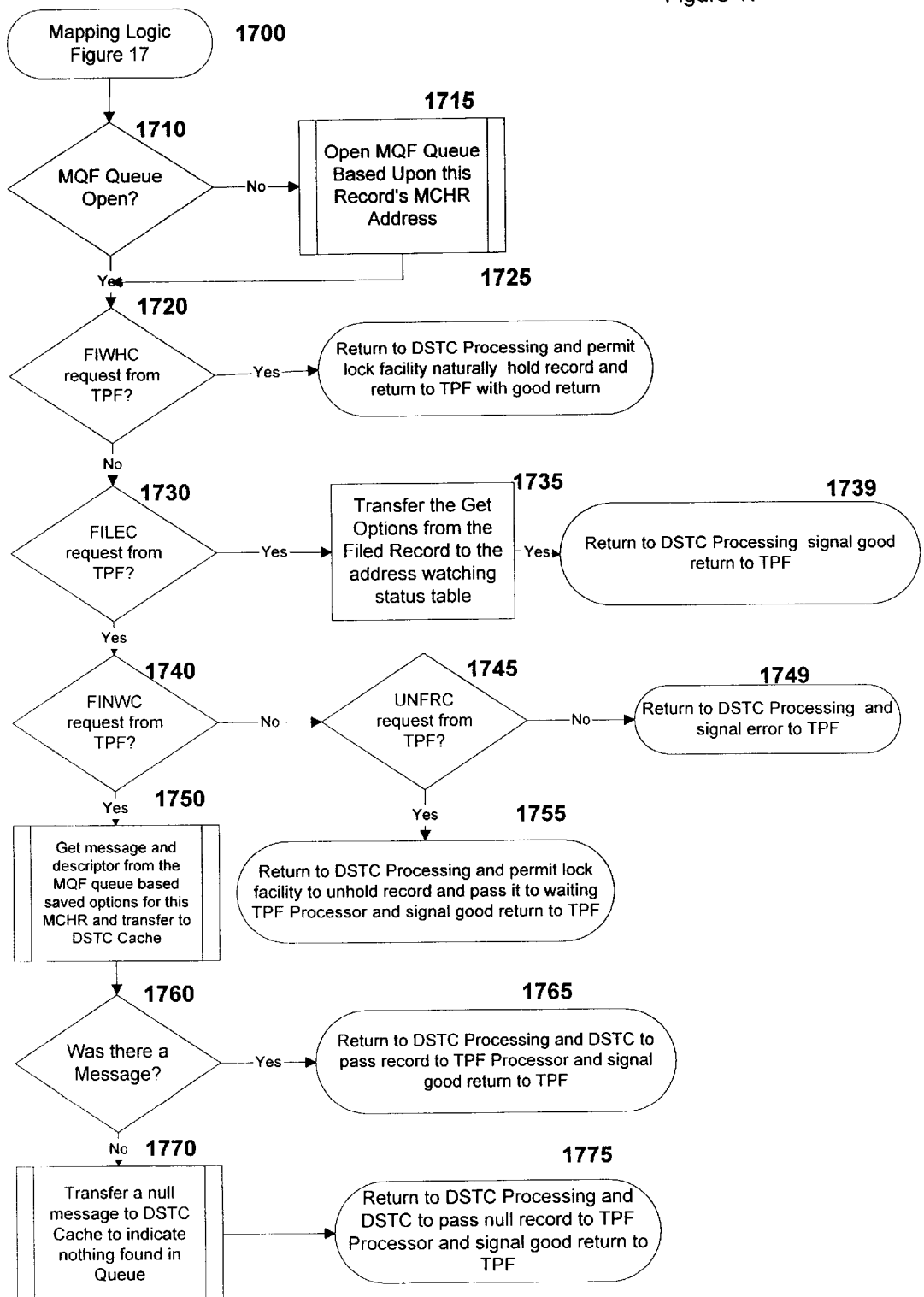
FIG. 17 is a flowchart illustrating preferred logic for handling a "Get" using options of a message and its descriptor from to a shared queue.

FIG. 17 shows the logic for a "Get with options and description" command in which the individual message is less than 4K bytes each. The logic is invoked when one of the buffered channel program commands of table 15 detected by mapping logic 110 in conjunction with an MCHR address associated with Get with options and description. The logic, as will be explained below, supports Gets to a shared MQF queue. The "shareability" of the queue is a consequence of the functionality extended by the mapping logic 112.

TABLE 15

| Description | MQSeries Verb | Buffered Channel Program Command |
|---|---|---|
| Sequence of Verbs to Get with options and description message in the queue | | |
| Open Queue | MQOPEN | any activity against MCHR |
| Lock the Queue from sharing | N/A | FIWHC |
| Transfer Get options from the mainframe | N/A | FILEC |
| Get message and | MQGET | FINWC |

TABLE 15-continued

| Description | MQSeries Verb | Buffered Channel Program Command |
|---|---|---|
| description from the queue. | | |
| Unlock the queue | N/A | UNFRC |

The logic begins in step 1700 and proceeds to step 1710. In step 1710, the logic determines whether the named queue is open.

If the named queue is not open, the logic proceeds to step 1715 in which the name queue is opened with known API calls to the MQF 114 The mapping logic 112 cooperatively maintains both the address watching logic status table 110*a* and the queue watching logic status table 118*a* respectively with the address watching logic 110 and the queue watching logic 118 to modify the queue status.

If the named queue is open, the logic proceeds to step 1720. In step 1720, the logic analyzes the buffered channel program command to determine whether it is FIWHC, that is, a blocked read and lock. This command is used in instances where the queue is shareable among multiple mainframes connected to the I/O device. The preferred embodiment uses the FIWHC because it will naturally trigger a lock on the MCHR address record through the ordinary processing of the lock facility 108*c*. The lock precludes other mainframes from accessing the corresponding MCHR record until the lock is released (Unhold).

If the command analyzed in step 1720 is a FIWHC command, the logic proceeds to step 1725, in which the flow of control is caused to return to the DASD engine 108 and eventually the lock facility 108*c* which will lock the record and thus prevent other entities from accessing the MCHR address corresponding to the queue.

In step 1730, if the command analyzed in step 1730 is a FILEC, the logic proceeds to step 1735 in which the data payload are the options for the Get with options call to the MQF 114 known API. The options are transferred to the address watching logic status table 110*a* entry's options fields for this MCHR. The logic proceeds to step 1739 in which the flow of control is caused to return to the DASD engine 108 and in which a good return condition is signaled. If the command wasn't a FILEC processing proceeds to step 1740.

In step 1740 if the command analyzed is a FINWC, that is a blocked read, the command is mapped to a Get with options and description to the queue that corresponds to this MCHR. A Get with options and description call is made to the MQF 114 named queue using the numeric cursor saved in the address watching logic status table 110*a* for this MCHR. The Get options Gets a specific message and its description from the queue. The mapping logic 112 places the returned message and message description payload into the DSTC's 102 RAM cache buffer 120 entry that corresponds to the FINWC's MCHR address. The logic then proceeds to step 1760. If the command is not a FINWC, the logic proceeds to step 1745.

In step 1745 if the command analyzed not an UNFRC, the logic proceeds to step 1749 in which the flow of control is caused to return to the DASD engine 108 and in which an error condition is signaled. In this scenario, a channel program command has been received which is not recognized.

If the command analyzed in step 1745 is an UNFRC, the logic proceeds to step 1755 in which the flow of control is caused to return to the DASD engine 108 and eventually the lock facility 108*c* which will unlock the record and thus allow other entities to access the MCHR address corresponding to the queue.

In step 1760 when the mapping logic 112 detects a return code from the MQF 114 that a message was returned processing proceeds to step 1765. In step 1765, the logic causes the flow of control to return to the DASD engine and eventually the channel program processing logic 108*a* which will cause the Get record to be transferred from the RAM cache buffer 120, across the channel interface 104 into the mainframe.

In step 1760 if the return code indicated that the queue was empty, step 1770 causes the mapping logic 112 to place a null record (indicating an empty queue) into the DSTC's 108 RAM cache buffer 120 entry that corresponds to the FINWC's MCHR address. In step 1775 flow of control is caused to return to the DASD engine and eventually the processing logic 108*b* which will cause the null record to be transferred from the RAM cache buffer 120, across the channel interface 104 into the mainframe.

Figure 18:
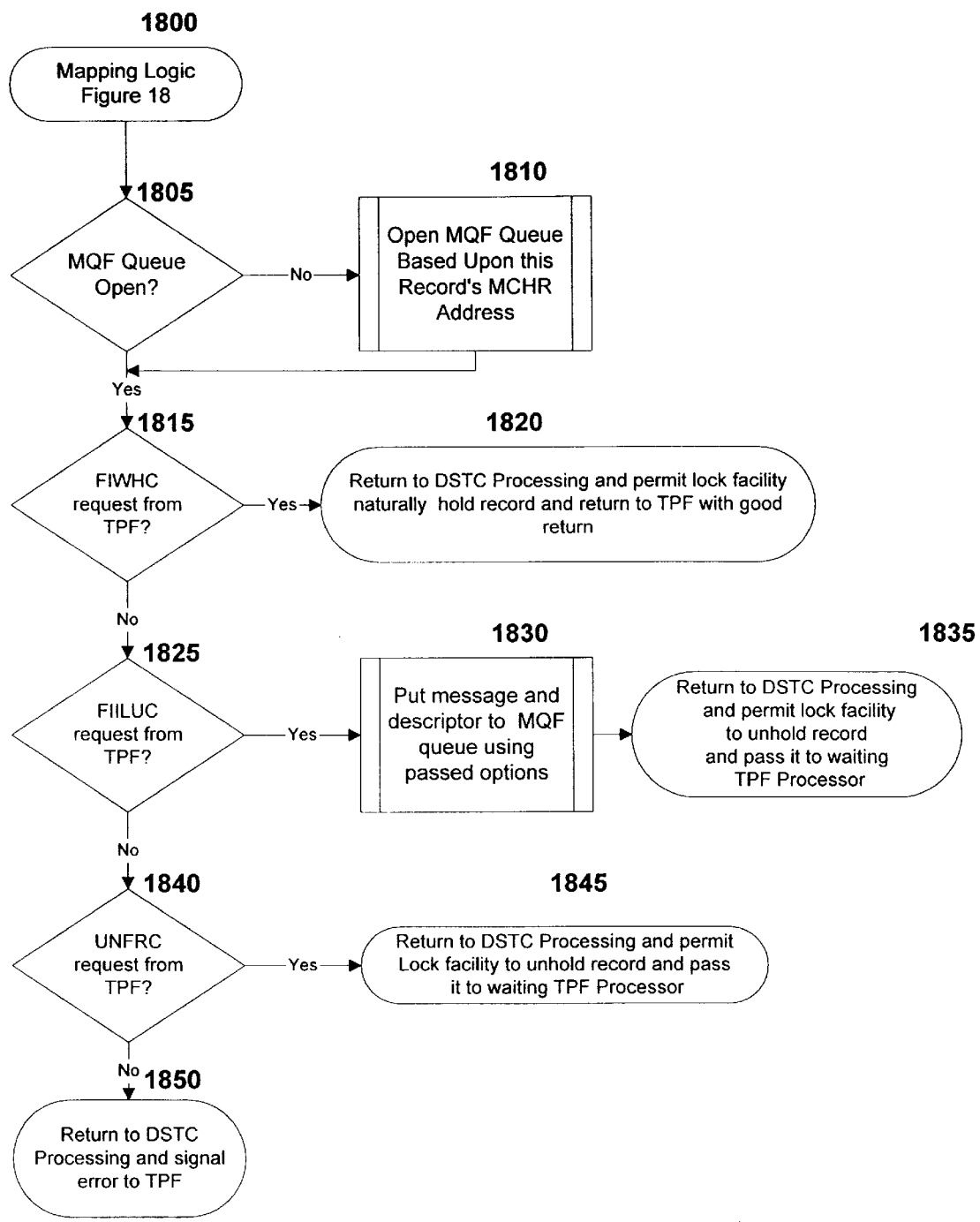
FIG. 18 is a flowchart illustrating preferred logic for handling a "Put" using options of a message and its descriptor from to a shared queue.

FIG. 18 shows the logic for handing single Put commands in which the message and Put options combined are less than 4K bytes. This logic is invoked when one of the buffered channel program commands of Table 16 is detected by the mapping logic 112 in conjunction with an MCHR address associated with single Puts, as identified in table 110*a*. The logic, as will be explained below, supports single Puts and also Puts to a shared MQF queue. The "shareability" of the queue is a consequence of the functionality extended by the mapping logic 112 shown in FIG. 18, and not inherent in MQF 114.

TABLE 16

| Description | MQSeries Verb | Buffered Channel Program Command |
|---|---|---|
| Sequence of Verbs to lock and Put messages to a Put queue | | |
| | MQOPEN | Any Activity |
| Lock the queue against shared update activity | N/A | FIWHC |
| Put a message and its descriptor to the queue | MQPUT | FILUC |
| Unlock queue for shared update activity if Put is aborted | N/A | UNFRC |

The logic begins in step 1800 and proceeds to step 1805. In step 1805, the logic determines whether the named queue is open.

If the named queue is not open, the logic proceeds to step 1810 in which the named queue is opened with known API calls to the MQF 114. The mapping logic 112 cooperatively maintains both the address watching logic status table 110*a* and the queue watching logic status table 118*a* respectively with the address watching logic 110 and the queue watching logic 118. Thus, at this point, the mapping logic 112 will cause tables 110*a* and 118*a* to be modified for all relevant entries. The logic then proceeds to step 1815.

If the named queue is open, the logic proceeds to step 1815. In step 1815, w the logic analyzes the buffered channel program command to determine whether it is FIWHC, that is, a blocked read and lock. This command is used in instances where the queue is shareable among multiple mainframes connected to the I/O device. The preferred embodiment uses the FIWHC because it will naturally trigger a lock on the MCHR address record through the ordinary processing of the lock facility 108c. The lock precludes other mainframes from accessing the corresponding MCHR record until the lock is released (unheld).

If the command analyzed in step 1815 is a FIWHC command, the logic proceeds to step 1820, in which the flow of control is caused to return to the DASD engine 108 and eventually the lock facility 108c which will lock the record and thus prevent other entities from accessing the MCHR address corresponding to the queue.

If the command analyzed in step 1815 is not a FIWHC, the logic proceeds to step 1825 in which the logic determines whether the channel program command is a FILUC, that is, a write with unlock command. The FILUC command is used for Puts to shared queues, and it is used as the second command in a series of commands issued for Puts to shared queues. Thus, if a Put to unshared queue was desired, the mainframe would not need to first send the FIWHC of step 1815.

If the command analyzed in step 1825 is a FILUC, the logic proceeds to step 1830 in which the data payload is the message and its Put options in the form of a linked list. The message is Put with the options to the corresponding named queue, using the known API of the MQF. The queue name is provided from table 110a unless the data payload of the message explicitly provides a queue name. The logic then proceeds to step 1835 in which the flow of control is caused to return to the DASD engine 108 and eventually the lock facility 108c which will unlock the record and thus allow other entities to access the MCHR address corresponding to the queue.

If the command in step 1825 is not a FILUC, the logic proceeds to step 1840 in which the logic determines whether the channel program command is an UNFRC, that is, an unlock command. This command would be used by the mainframe if it needed to abort a Put to a shared queue, in which case it is sent instead of the FILUC of step 1825.

If the command analyzed in step 1840 is an UNFRC, the logic proceeds to step 1845 in which the flow of control is caused to return to the DASD engine 108 and eventually the lock facility 108c which will unlock the record and thus allow other entities to access the MCHR address corresponding to the queue.

If the command analyzed in step 1840 is not UNFRC the logic proceeds to step 1850 in which the flow of control is caused to return to the DASD engine 108 and in which an error condition is signaled. In this scenario, a channel program command has been received which is not recognized.

Figure 19:
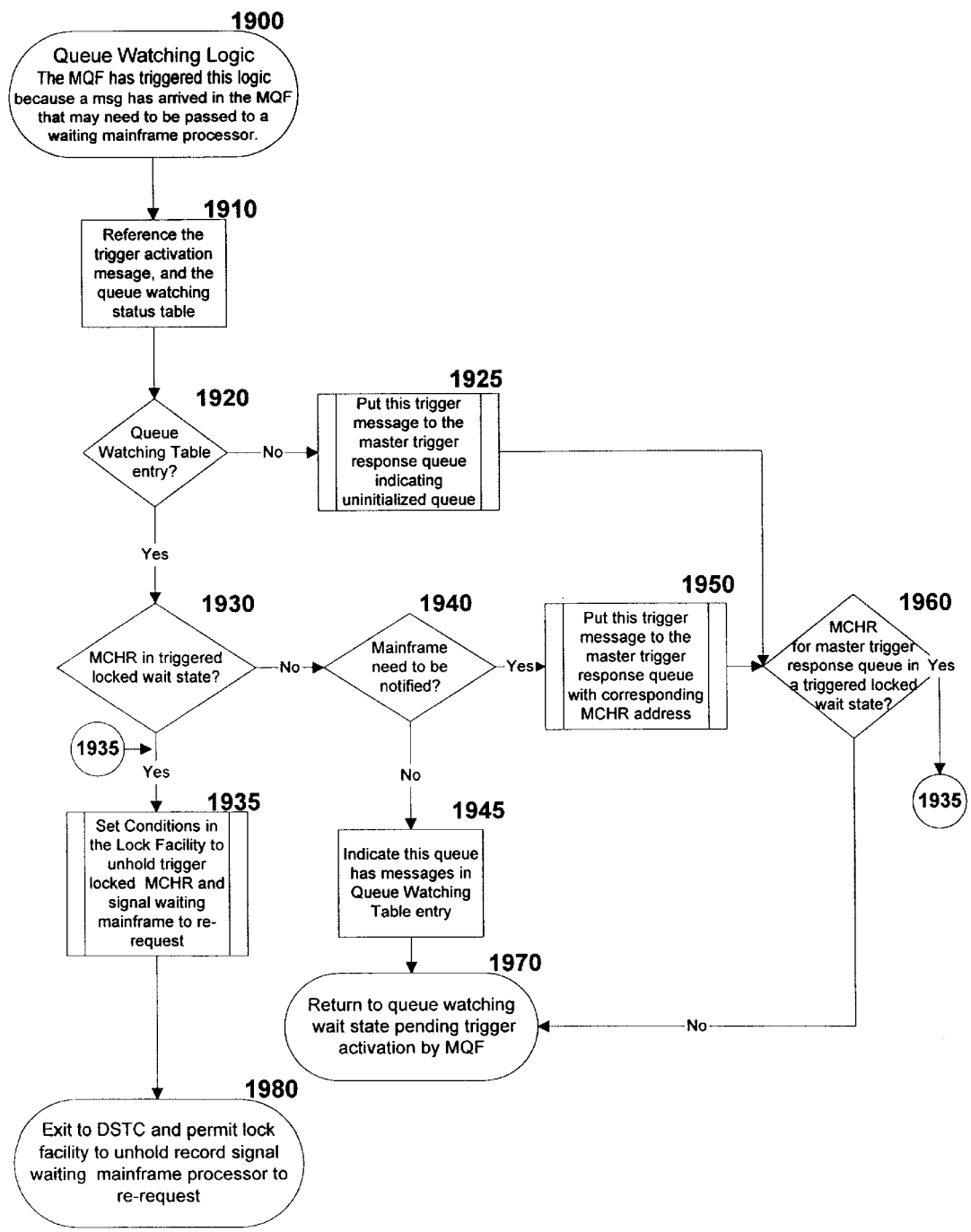
FIG. 19 is a flowchart illustrating the queue-watching logic of the preferred embodiment.

FIG. 19 shows the logic for the queue watching logic 118. The queue watching logic 118 watches all queues in the MQF 114 whether or not they have been actually opened by the mapping logic 112. When a message arrives on a named queue in MQF 114, the queue watching logic 118 is activated by a known MQF 114 trigger activation message. In step 1910 it checks the queue watching logic status table 118a to determine in step 1920 if the named queue has an entry. If there is an entry, processing proceeds to step 1930.

If there isn't an entry, the logic in step 1925 Puts to a master trigger response queue a message combining both the trigger activation message and an indication that the queue watching status table 118a entry for the message's queue has not been initialized. The master trigger response queue is one of several control queues for the embodiment that will be detailed below. Its purpose is to provide a consolidated queue where the mainframe can be signaled that the MQF 114 has messages that the mainframe might need to process. This is used because as discussed earlier not all Get queues are configured with a trigger locked wait state, yet the mainframe still needs to immediately know when messages arrive. Processing proceeds to step 1960.

In step 1930 the address watching logic status table's 110a corresponding entry is checked to determine if the MCHR address is in triggered locked wait state. If it determines that there is an outstanding FIWHC waiting for a message to arrive in its corresponding queue, the queue watching logic 118 proceeds to step 1935. Otherwise processing proceeds to step 1940.

In step 1935, the logic sets conditions to trigger a locked wait state queue. It does this by setting conditions for the lock facility 108c that makes the mapping and queue watching logic look like it is the "other," phantom processor that was holding the MCHR with lock. Conditions are further set in the lock facility 108c that make it look to the DASD engine 108 like the "other" processor is completing a FILUC command. These conditions are acted upon by the DASD engine 108 when processing passes to step 1980 where normal DSTC 108 processing continues.

At a high level step 1935's simulated FILUC looks to the DASD engine 108 and lock facility 108c like the "other" mainframe is finally completing its update of the record and relinquishing its hold of the MCHR. Thus, DASD engine 108 and lock facility 108c logic can now routinely signal attention interrupts to the hold waiting mainframes to re-read the updated record. This reread is a natural consequence of TPF mainframe unlock processing. When the reread occurs it will look like a new Get from the mainframe, only this time there is a message in the queue that can be transferred. The blocked application in the mainframe that had originally executed the FIWHC command on the MCHR corresponding to its queue immediately is awakened with its message with read lock. command to release the lock on the MCHR.

In step 1940 since the mainframe isn't in a triggered locked wait state on the MCHR it determines if the mainframe needs to be notified that there is a message on the queue. If the queue watching status table 118a entry indicates that it doesn't need to be notified, step 1945 then updates the queue watching status table 118a to indicate there is at least one message on queue and then proceeds to step 1970. (Each entry includes an indication whether an attention interrupt should be sent to the client, if there's a trigger locked wait state on the MCHR address, whether a wake-up message should be placed in the master trigger response queue (more below), or whether the client should not be triggered.) If step 1940 determined that the mainframe needed to be notified, then step 1950 combines the trigger activation message, with the corresponding MCHR address, and the name of the program to be activated in the mainframe into one message and Puts it to the master trigger response queue with the known MQF 114 API. Processing continues with step 1960. In step 1960, the logic determines if the master trigger response queue is in triggered locked wait state, for example, by querying the lock facility 108c or address status table 110a. Typically the master trigger response queue will be the one queue that is continually in triggered wait state as it is the principle way the mainframe is notified of message activity. If it is in triggered lock wait state, then processing proceeds to step 1935, only this time step 1935 is activated for the master trigger response queue not the queue that the actual application message is in. If it is not, then processing proceeds to step 1970.

Step 1970 places the queue watching logic 118 back in an event wait state where it will be re-activated by MQF 114 when it receives further messages.

It should be noted an MCHR address in the "triggered locked wait state" cannot be released by the mainframe application because it is in blocked read mode. It will be released by the mainframe's known lost interrupt handler when it reaches a pre-determined time-out value. In the preferred embodiment it is expected that the time out value will be set to a value greater than for a conventional DSTC. However, a different mainframe application can manually release the "triggered locked wait state" MCHR address by the "Put" of a null message to the queue that the MCHR is mapped to.

Queue Based Control Interface

Figure 20:
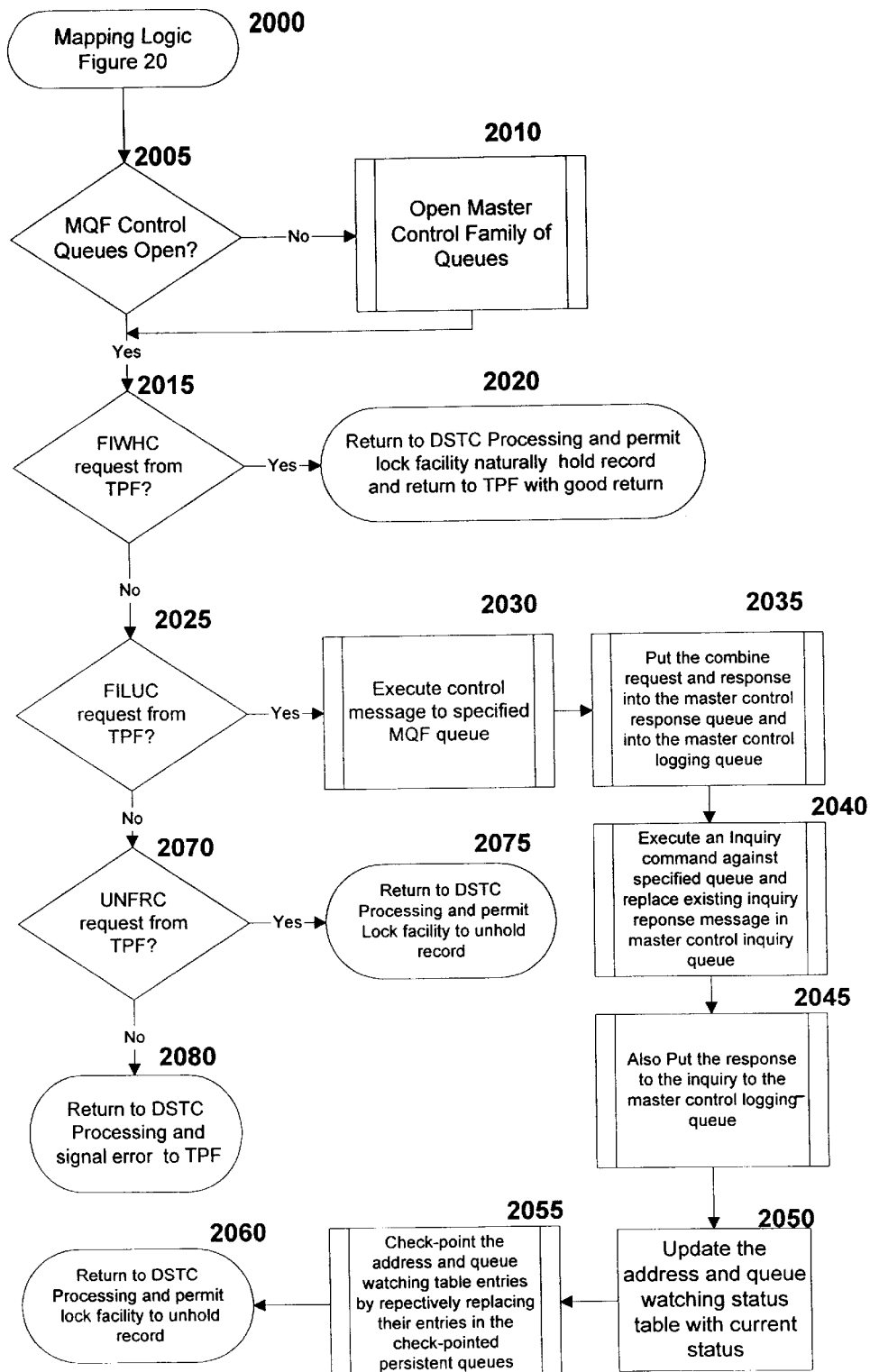
FIG. 20 is a flowchart illustrating the queue-based control interface of the preferred embodiment.
Figure 21:
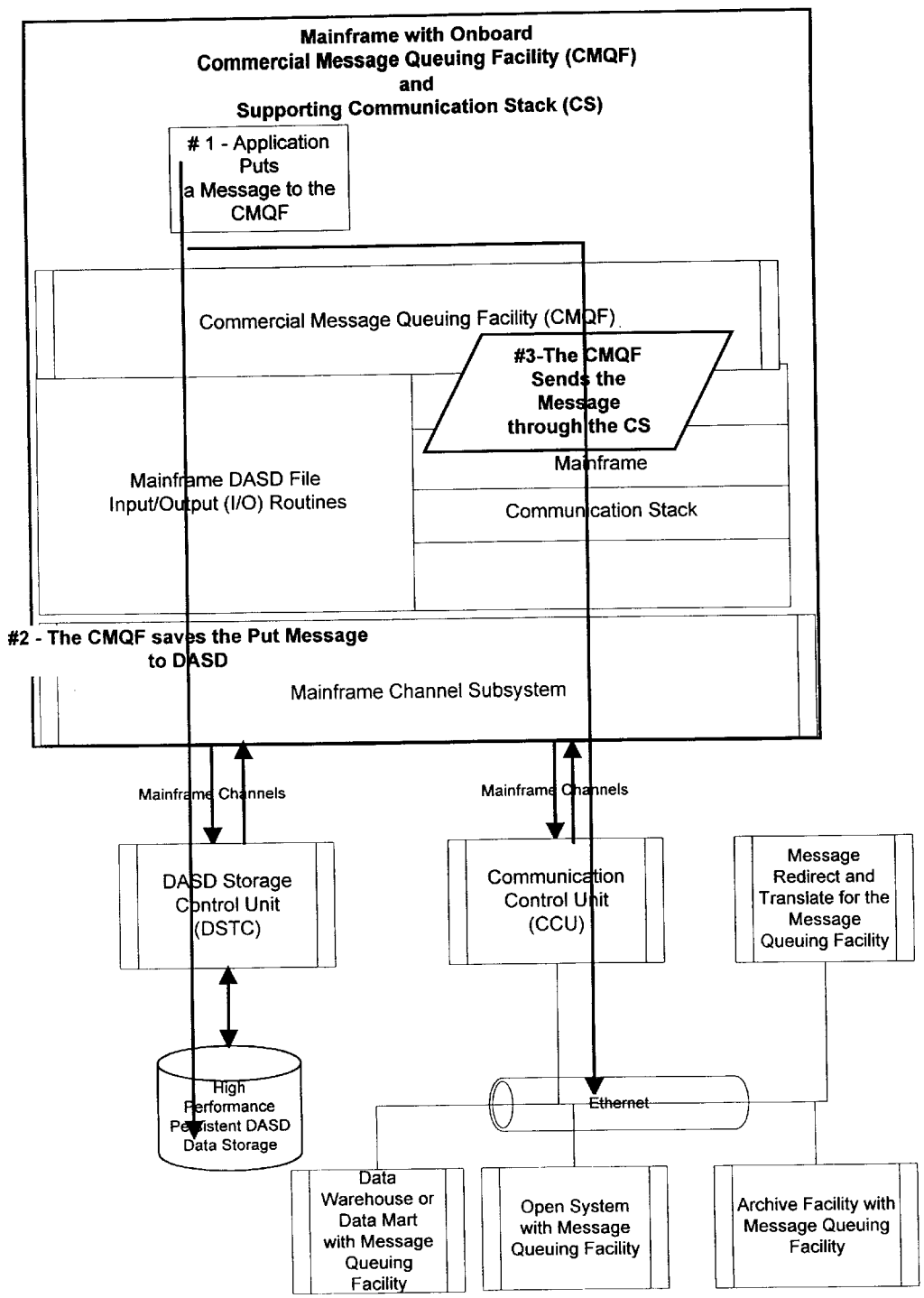
FIG. 21 is a diagram illustrating the MQF message flow of the prior art.
Figure 22:
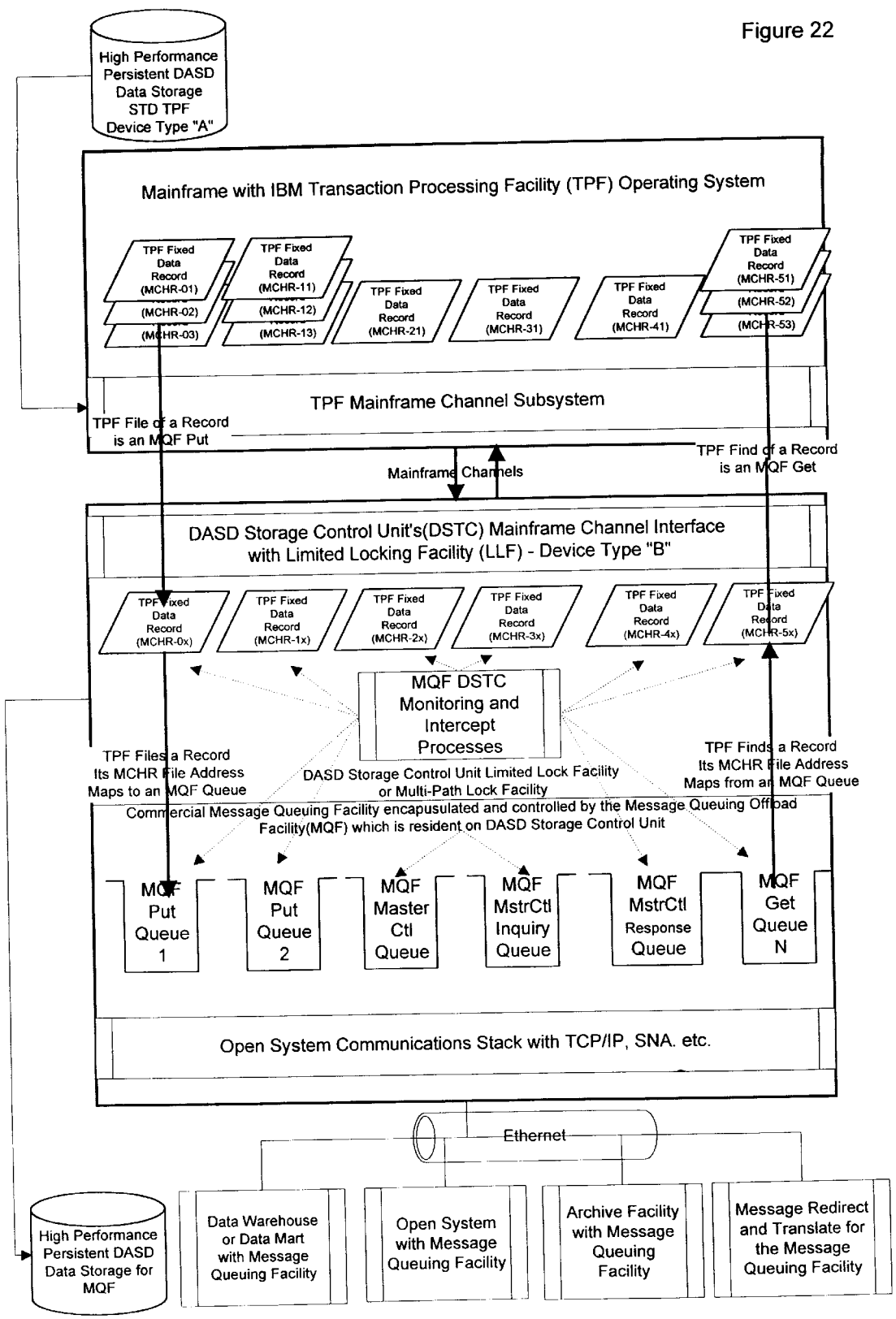
FIG. 22 is a diagram illustrating the MQF message flow of a preferred embodiment.

FIG. 20, Table 17, and Table 18 respectively show the logic, the family of master control queues, and the commaster queue watching status table, and a master MCHR queue. These queues allow the mainframe application to monitor and/or modify queue state, as explained below.

The queue-based control interface uses a fixed set of master control queues that can are mapped to a static set of MCHRs that are known to the mainframe system. This static mapping is part of the mainframe's operating system configuration. In this fashion when the mainframe queuing application starts it can communicate to the preferred embodiment through the statically mapped control queues to access the configuration and state of the entire preferred embodiment and MQF.

TABLE 17

| Mater Queue Name | Queue Type from Mainframe Perspective | Queue Type from Embodiment Perspective | Description |
| --- | --- | --- | --- |
| Master Control | Put with special verb options | Get | Mainframe system control requests of the preferred embodiment and MQF are placed in this queue |
| Master Control Response | Get | Put | Responses to mainframe system control requests are placed here by preferred embodiment and MQF |
| Master Control Inquiry | Browse | Put | Any time an MQF queue changes state a fresh MQF inquiry response message from the MQF is replaces the existing |
| Master Trigger Response Queue | Get | Put | Queue trigger activation messages destined for the mainframe are placed here |
| Master Control Logging Queue | Browse | Put | A copy of all state change requests and responses for the preferred embodiment, MQF, and mainframe, are logged here |
| Master Address Watching Status Table (check pointed file copy) | Browse | Get, Put, Browse | A check-pointed state current copy of the address watching logic table 110a is copied here. This copy is used for general or selective restart of the preferred embodiment |
| Master Queue Watching Status Table (check-pointed file copy) | Browse | Get, Put, Browse | A check-pointed state current copy of the queue watching status table 118a is copied here. This copy is used for general or selective restart of the preferred embodiment |
| Master MCHR Queue | Put/Get | Browse | A list of MCHR addresses that the mainframe has made available to the preferred embodiment for queue mapping | mands that make up the queue-based control interface. The preferred embodiment defines a queue-based control interface to the new logic on the improved I/O device 100 and to the MQF, residing on the device 100. The queue-based control interface facilitates control, administration, and management between the mainframe, the preferred embodiment, and the MQF and its network.

Specifically, the interface includes a master control queue, a master control response queue, a master control inquiry queue, a master control logging queue, master trigger response queue, master address watching logic table queue, The master control queue is used to place all explicit state change requests to the MQF. Specifically, the queue may receive requests such as open, close, connect, disconnect, or set a specific queue. The explicit commands to the MQF and explicitly selected queue are passed from the mainframe in a data payload section of a Put Single MQF Control Message to Master Control Queue to the mapping logic 112. The processing logic is detailed below in the FIG. 20 explanation.

The master control response queue is used to place all responses from the MQF that are a response to a given master control queue request.

The master control inquiry queue contains the response to the known MQF inquiry message. The MQF inquiry response message describes the current state of the specified MQF queue. There is one inquiry message response in the master control inquiry queue for every queue in the MQF describing its properties and state in known MQF format. If any change is made to the properties or state of any MQF queue by any of the MQF API verbs such as MQCLOSE, MQCONN, MQDISC, MQOPEN, MQSET, etc., or where appropriate MQF control commands for the queue manager impacting the queue, a new inquiry response message replaces the old. The queue manager is a component of MQF 114 and responds to control commands.)

The master control logging queue is used to place a copy of every control type message request and response (described above in the master control inquiry queue) made to the master control queue. The master control logging queue will track history. Once initialized it will never be reset. Items in it will be transferred to a historical database.

The master trigger response queue provides a consolidated queue where the mainframe can be signaled that an MQF queue has messages that it might need to process. This is used for queues that are configured accordingly in the status tables 110a and 118a, which the queue watching logic 118 queries when determining whether to place a wake-up message in this queue. The master trigger response queue is usually configured with a "triggered locked wait state" address that means that a mainframe FIWHC is hold-waiting on that address, i.e., there is a "blocked Get."

The master address watching logic table queue and the master queue watching status table queue are respectively used to check-point (or "key-point") to persistent storage the in DSTC 102 memory working copies of the address watching logic table 110a and the queue watching status table 118a. During DSTC 102 restart processing the persistent copies of the tables are read back into memory to restore the preferred embodiment to its last known check-point state. New MCHR or queue entries can be added to the respective persistent copies of these tables by an external source. The new entries can be selectively read into memory by selective restart logic not shown.

The master MCHR queue is used by the mainframe to obtain and dynamically allocate MCHR addresses to the queues, i.e., to bind MCHR addresses to queue name-verb combinations. In the preferred embodiment this table permits a more dynamic binding of MCHRs to queues rather than the static binding used for the master control family of queues as describes above. It also permits for the real-time addition of MCHR address mappings to queues as queues are dynamically added.

FIG. 20 shows the logic for handing the single Put of control commands to the master control queue in which the message, MQF verb, options and descriptor information are less than 4K bytes. In particular this special Put command is to execute selected MQF control verbs against specific named queues for the purpose of executing control, management and administration over the MQF from the mainframe application. All responses from the MQF or the mapping logic 112 are placed in the master control response queue.

This logic is invoked when one of the buffered channel program commands of Table 18 is detected by the mapping logic 112 in conjunction with the static MCHR address associated with single Puts with control messages, as identified in table 110a. The logic, as will be explained below, supports single Puts and also Puts to a shared MQF queue. The "shareability" of the queue is a consequence of the functionality extended by the mapping logic 112 shown in FIG. 20, and not inherent in MQF 114.

TABLE 18

| Description | MQSeries Verb | Buffered Channel Program Command |
|---|---|---|
| Sequence of Verbs to lock and Put messages to a the master control queue | | |
| | MQOPEN | Any Activity |
| Lock the master control queue against shared update activity | N/A | FIWHC |
| Put a message and its descriptor to the master control queue | MQPUT, MQCLOSE, MQCONN, MQDISC, MQGET, MQINQ, MQOPEN, MQSET, etc | FILUC |
| Unlock master queue for shared update activity if Put is aborted | N/A | UNFRC |

The logic begins in step 2000 and proceeds to step 2005. In step 2005, the logic determines whether the master control queue is open. The master control queue name is retrieved from the entry in address table 110a having the MCHR address in the buffered channel program.

If the master control queue is not open, the logic proceeds to step 2010 in which the master control queue as well as all queues in the master control family of queues are opened with known API calls to the MQF 114. The mapping logic 112 cooperatively maintains both the address watching logic status table 110a and the queue watching logic status table 118a respectively with the address watching logic 110 and the queue watching logic 118. Thus, at this point, the mapping logic 112 will cause tables 110a and 118a to be modified for all relevant entries. The logic then proceeds to step 2015.

If the master control family of queues are open, the logic proceeds to step 2015. In step 2015, the logic analyzes the buffered channel program command to determine whether it is FIWHC, that is, a blocked read and lock.

If the command analyzed in step 2015 is a FIWHC command, the logic proceeds to step 2020, in which the flow of control is caused to return to the DASD engine 108 and eventually the lock facility 108c which will lock the record and thus prevent other entities from accessing the MCHR address corresponding to the queue.

If the command analyzed in step 2015 is not a FIWHC, the logic proceeds to step 2025 in which the logic determines whether the channel program command is a FILUC, that is, a write with unlock command.

If the command analyzed in step 2025 is a FILUC, the logic proceeds to step 2030 in which the data payload is the message, the MQF API verb such as MQPUT, MQCLOSE, MQCONN, MQDISC, MQGET, MQINQ, MQOPEN, MQSET; the specified queue's name, MQF verb options, etc. in the form of a linked list are reformatted as a known MQF API call and executed against the specified queue's name. The queue's name is explicitly provided in the message's data payload.

The logic proceeds to step 2035 in which both the request message just executed by the MQF API and its response and return codes back from the MQF API call are combined and Put to the master control response queue as well as to the master control logging queue. The mainframe can Get the response to its request in the master control response queue. Processing proceeds to step 2040.

In step 2040, the logic executes a known "Inquiry" call to the MQF API to obtain the status and properties of the queue. The known response back from the MQF API Inquiry call is Put to the master control inquiry queue as replacement to any inquiry message entry already in the master control inquiry queue for the specified queue named in the initial request made to the master control queue.

The logic proceeds to step 2045 in which the inquiry response is also Put to the master control logging queue.

The logic proceeds to step 2050 in which any updates from the control message are applied respectively to the appropriate address watching logic table 110a and queue watching status table 118a entries.

In step 2055 any updated entries to either of the two memory based status tables are check-pointed, that is, Put to persistent queue copies. The respective older corresponding entries in the persistent storage based queue are deleted so the most current copy of the entry is the only one present.

The logic then proceeds to step 2060 in which the flow of control is caused to return to the DASD engine 108 and eventually the lock facility 108c which will unlock the record and thus allow other entities to access the MCHR address corresponding to the queue.

If the command in step 2025 is not a FILUC, the logic proceeds to step 2070 in which the logic determines whether the channel program command is an UNFRC, that is, an unlock command. This command would be used by the mainframe if it needed to abort a Put to the master control queue, in which case it is sent instead of the FILUC of step 2025.

If the command analyzed in step 2070 is an UNFRC, the logic proceeds to step 2075 in which the flow of control is caused to return to the DASD engine 108 and eventually the lock facility 108c which will unlock the record and thus allow other entities to access the MCHR address corresponding to the queue.

If the command analyzed in step 2070 is not UNFRC the logic proceeds to step 2080 in which the flow of control is caused to return to the DASD engine 108 and in which an error condition is signaled. In this scenario, a channel program command has been received which is not recognized.

Other Aspects

MQFs such as IBM's MQSeries typically take advantage of multi-threading operating systems to gain performance. In a multi-threaded environment multiple applications or multiple threads of a single application can write to the same queue independent of each other. That is, each can be working with a unit of work to the same queue and the MQF will keep them separate from one another.

A benefit of the multi-threading in the preferred embodiment is that the DASD logic 108, the address watching logic 110, the queue watching logic 118, and the mapping logic 112 all can run in different threads where appropriate. Yet, there are mechanisms within the multi-threaded environment that permit them to interact also when appropriate. This permits the address watching logic 110 to be up and running separate from the queue watching logic 118.

Another benefit and as outlined above, a given named queue may have multiple corresponding MCHR addresses in which each MCHR address corresponds to a given action. Thus, MCHR address A may correspond to a small Put and MCHR address B may correspond to a large Put. In the preferred embodiment of the improved DSTC 108's uses a multi-threaded operating system. The multi-threading ensures queue coherency when multiple unit of works from multiple MCHR addresses are being put to the same queue through different MCHRs.

The preferred embodiment supports several forms of Gets, including Gets of small and large messages. In this fashion, applications that know that they will have small messages may exploit this knowledge and use small Get requests which should improve operational efficiency due to the less complicated logic.

MQFs principle use is to link disparate heterogeneous computing environments together with robust functionality and absolute integrity that a message will be delivered once and only once. A significant benefit of an MQF is in linking open systems to open systems, but the greatest benefit is linking open systems to mainframe systems without necessarily having to tightly couple the open systems application to the mainframe application. The invention especially facilitates the exchange of meaningful application information between open systems applications and legacy mainframe applications by permitting the mainframe applications to continue use the processing paradigms they are most adept at; database, file and record processing in a clustered processing environment. The paradigm shift from mainframe application file and record processing to open systems messaging can be abstracted and done on behalf of the mainframe in the improved I/O device. This can limit the need to significantly rework mainframe applications to communicate using an MQF API with open systems when they can use their existing file processing. This will be further described in the Other Embodiments section. In TPF there are a number of file based interface utilities that can readily be interfaces to the embodiment opening up larger numbers of applications to external systems such as open systems.

System Initialization using the Queue Based Control Interface

The set up of any MQF environment requires planning. As with any MQF environment the Queue managers, queues and communications must be planned, designed, and configured. The configuration and the set up of the MQF on the improved I/O device must be in the context of the overall MQF environment. In the preferred embodiment the queue watching status table will be set up based upon the queues explicitly configured for the queue manager(s) resident on the improved I/O device. There will be an entry in the queue watching status table 118a for every queue configured to the MQF. As discussed above these entries will be check-pointed ("Put") into the "master queue watching status table" queue. As queues are "selectively opened" for the first time by the mainframe application using an explicit "open" to the master control queue, MCHR addresses will be removed from the master MCHR queue and used to populate entries in the address watching logic table 110a (awst).

Each MCHR address entry in the address watching logic table 110a will be cross referenced to its corresponding named queue in the queue watching status table 118a. There will be a unique MCHR address (awst) entry mapped for every type of processing that the named queue is configured to process. At least one MCHR address (awst entry) is used for each unique operation configured for a queue. Each MCHR awst entry has a branch vector code from Table A assigned to it. It is used to activate the mapping logic 112 that corresponds to the unique operation. (i.e. put single long to a shared queue=5, put single unshared=3, etc.) Usually there will be multiple address watching logic table 110a entries for each (one-to-many mapping) named queue with each mapped to a different process. As address watching logic table 110a entries are created, changed, or deleted they are check-pointed into the master address watching status table queue for fast general restart. Address watching logic table entries are deleted only when the mainframe application explicitly closes the corresponding named queue with a with a "close" message to the master control queue.

Other Embodiments

The above embodiments are particularly relevant to the TPF environment. The same techniques may be applied to other systems, including the known MVS/OS390 environment. In some regards, the MVS/OS390 environment is simpler. For example, the MVS/OS390 environment is not limited to 4K records and thus does not require the segmentation and reassembly logic, described above. On the other hand, the MVS/OS390 environment does present its own issues. For example, its native DASD locking system is centered in the mainframe itself with little functionality resident on the DSTC 102. MVS/OS390's native DSTCs have very little functionality to make them cluster aware and asynchronously signal waiting processors that a resource has been unlocked. In this respect, native MVS/OS390 without the assistance of commercially available resource locking or serialization software is very analogous to the Open Systems and Microsoft NT architectures. However, as will be discussed below it is readily possible to overcome the WVS/OS390 and Open Systems locking, signalling, and cluster awareness limitations in an embodiment of the invention.

Given the description above and below, a person skilled in the art can readily modify the above embodiment to the MVS/OS390, Open Systems, Microsoft NT or other similar environments. An embodiment for any of the environments mentioned above can be leveraged into embodiments for the others.

The above embodiment extended MQF functionality in many ways, including the use of shared queues. These extensions in functionality may be removed easily to create less sophisticated embodiments, if so desired. This is especially relevant in the MVS/OS390 environment because many legacy applications natively read and write to sequential data sets. If the data set were resident on an embodiment improved DSTC then legacy sequential data set writes could be redirected to an MQF message queue. Sequential data set writes or individual writes could be mirror written to both the data set and to an MQF queue. The same is true of legacy applications reading from a sequential data set that is resident on the improved I/O device as it could really be reading from an MQF queue. In this embodiment legacy applications would not need to be rewritten to interface with new systems using the MQF API. At the application level they continue to process unaltered but at the systems level they are opened to the open systems world.

The above embodiment was particularly directed to an improved I/O device that was a DASD. Given the above description, a person skilled in the art can readily modify the embodiment to operate on other I/O devices such as tape devices. In this regard, some of the extended functionality can be sacrificed but doesn't necessarily have to as will be discussed below. In particular, Gets with a cursor may be sacrificed and some tape-oriented embodiments.

The above embodiments implemented Gets in which the mainframe would hold wait for response. This embodiment may easily change to cover situations where the mainframe would poll for a result.

However, because of the nature of the improved I/O device 100 and current computing art in MVS/OS390, Open Systems, Microsoft NT and other similar environments, it is possible to embody the locking, asynchronous signaling, and cluster aware features into each of the environments. In all of the mentioned environments some indication that volume, data set, file or record lock serialization is occurring at the DASD level, although it may be primitive and only cover the highest level in the hierarchy such as the volume. Whether it be an MVS/OS390 volume lock or an open system's file mode indicator, some form of lock serialization can be detected by the DSTC or DSTC equivalent.

The TPF embodiment demonstrates that a given series of DASD I/O commands targeted to a given set of MCHR addresses can be mapped to invoke a series of MQF verbs on messages in a mapped MQF queue. Further the embodiment demonstrates that the named queues can be controlled and managed from the mainframe application through other queues, namely the master control queue family. The embodiment demonstrates a tight integration between DSTC, Interface Logic, MQF and Communication Stack. In other embodiments there is no limitation on placing and mixing other I/O device type processing on the improved I/O device to accomplish the same end when a given I/O device type component is alone insufficient. An example is the MVS/OS390 DSTC falls short in the area of locking. An example improvision is discussed below where another I/O device type, the channel to channel adapter, is interfaced to the improved I/O device through the same channel interface that the DASD uses. The improved I/O device type can concurrently support and coordinate multiple hardware device types to accomplish the end goal of controlling an offloaded MQF queue. This by using existing mainframe or open systems I/O interfaces (or protocols).

Few environments have the cluster awareness and asynchronous signaling capabilities that the TPF DSTC offers, however current computing art does permit its expansion using the improved I/O device of this invention. An embodiment of the improved DSTC for MVS/OS390 environment could asynchronously signal the MVS/OS390 waiting application through the known EXCP (MVS/OS390 Execute Channel Program) interface. In such an embodiment some of the MVS/OS390 channel/subchannels connected to the improved DSTC device would be designated as channel to channel devices rather than DASD devices. All asynchronous signaling for triggered wait state processing could be done through the channel to channel interface using additional logic that cooperates with the interface logic 105 on the improved I/O device and additional logic in the MVS/OS390 application that handles the processing of signaling through the known Channel to Channel/EXCP interface. Improved MVS/OS390 locking could also be embodied using the same Channel to Channel/EXCP interface. For instance, the HOLDC macro (representing sync-point unit of work) may be replaced with a Channel to Channel message from the mainframe application to the mapping logic 112 indicating that the FILEC writes that will be transferred through the MCHR address "A" are a unit of work. In this case, a hardware path, in coordination with the DASD MCHR path, is used to advise the mapping logic 112 that the DASD file writes are part of a unit of work. Alternately the HOLDC-unit of work message could have been passed through the DASD MCHR path but to a different MCHR address "B" that the mapping logic 112 is configured to associate with read/write activity on MCHR address "A". This technique permits the weaknesses of one hardware device type to be complemented by another.

Another example embodiment would be an open systems embodiment of improved asynchronous signaling when the opens systems application is waiting on a message. The embodiment would use the known SCSI (Small Computer Systems Interface) interface and corresponding improved open systems device drivers that would directly interface to open systems application. As with MVS/OS390 the application may be a user application or a systems application that consolidates traffic through an intermediate application programming interface.

Direct asynchronous signaling of non-TPF computing environments using either of the embodiments just discussed, eliminates the need to "trick" the waiting processor while the "phantom" processor (queue watching logic 118) hold/locks the MCHR address until a message is received in the MCHRs corresponding queue. The mainframe or open systems application can explicitly be signaled that a message has arrived in its queue.

The novelty of the improved I/O device is, that it is an integration of heretofore separate I/O devices consolidated into one that permits new processing facilities such as the MQF to work transparently with both legacy application processing paradigms as well as new applications processing paradigms that process using new interfaces such as the MQF API.

Having described an exemplary embodiment, it should be apparent to persons of ordinary skill in the art that changes may be made to the embodiment described without departing from the spirit and scope of the invention.

I claim:

1. In a storage controller having a processor and a memory, in which the controller receives I/O commands having corresponding addresses, a set of processor-executable instructions residing in the memory, comprising:

a communication stack for receiving and transmitting information on a network;

message queue facilities (MQF), cooperating with the communication stack and responsive to a message queue verb, for causing the communication stack to provide information to a queue in the MQF or causing a queue in the MQF to provide information to the communication stack;

interface logic, responsive to the I/O commands, to determine whether an I/O command is within a first set of predetermined I/O commands and, if so, to map the I/O command to a corresponding message queue verb and queue to invoke the MQF such that the MQF may cooperate with the communication stack to send and receive information corresponding to the verb.

2. The set of processor-executable instructions of claim 1, wherein the MQF has non-shared queues and wherein the interface logic includes a lock facility having logic to lock a data structure in the memory and corresponding to a queue in response to a first I/O command and to unlock the data structure corresponding to the queue in response to a second I/O command such that the queue may be shared among multiple client computers interacting with the storage controller.

3. The set of processor-executable instructions of claim 2, wherein the storage controller includes a lock facility and wherein the interface logic cooperates with the lock facility to lock and unlock the data structure.

4. The set of processor-executable instructions of claim 2, wherein the first and the second I/O command are processed by the lock facility to cause the locking and unlocking of the data structure.

5. The set of processor-executable instructions of claim 1, wherein a subset of the I/O commands have a limited-size payload, wherein the limited-size payload is smaller than a message size supported by the MQF, and wherein the interface logic includes reassembly logic to form a message queue verb having a payload larger than the limited-size from a plurality of I/O command pay loads.

6. The set of processor-executable instructions of claim 5 wherein the controller includes a record-pooling facility for receiving and associating a plurality of I/O commands payloads, wherein the reassembly logic cooperates with the record-pooling facility to gather a plurality of I/O command payloads to form a physically sequential payload therefrom in the memory to be used as a payload of a message queue verb.

7. The set of processor-executable instructions of claim 1 wherein the interface logic includes logic to support Put message queue verbs to a queue in the MQF; and logic to support Get message queue verbs to a queue in the MQF.

8. The set of processor-executable instructions of claim 7 wherein the logic to support Put message queue verbs includes logic to support Put verbs having a payload smaller than a limited-size;

logic to support Put verbs having a payload larger than the limited-size; and logic to support multiple Put verbs as a transactional unit of work.

9. The set of processor-executable instructions of claim 7 wherein the logic to support Get message queue verbs includes logic to support Get verbs having a payload less than a limited-size;

logic to support Get verbs having a payload larger than the limited-size; and logic to support multiple Get verbs as a transactional unit of work.

10. The set of processor-executable instructions of claim 5 wherein the interface logic includes logic to support Browse message queue verbs to a queue in the MQF.

11. The set of processor-executable instructions of claim 7 wherein the logic to support Get message queue verbs includes logic to detect when the MQF responds with a null message, and logic to signal a client computer that caused the Get message queue verb when the queue has received a message, so that software executing on the computer may block wait for a response.

12. The set of processor-executable instructions of claim 7 wherein the logic to support Put message queue verbs to a queue in the MQF includes logic, responsive to a first subset of the first set of I/O commands, to retrieve a payload of the I/O command, to map the address associated with the I/O command to a named queue, and to form and issue the Put verb with the retrieved payload to the named queue.

13. The set of processor-executable instructions of claim 7 wherein the logic to support Put message queue verbs to a queue in the MQF includes logic, responsive to a second subset of the first set of I/O commands, to lock a data structure corresponding to the address associated with the I/O command so as to prevent other clients of the I/O controller from performing actions to this address until the data structure is unlocked;

logic, responsive to a third subset of the first set of I/O commands, to retrieve the payload of the I/O command, to map the address associated with the I/O command to a named queue, and to form and issue a Put verb with the retrieved payload to the named queue;

logic, responsive to a fourth subset of the first set of I/O commands, to unlock a data structure corresponding to the address associated with the I/O command so as to allow other actions to this address, such that a Put to a shared queue may be accomplished by having a client computer issue an I/O command from the second subset to an address corresponding to a named queue, followed by an I/O command from the third subset to the address, followed by an I/O command from the fourth subset to the address.

14. The set of processor-executable instructions of claim 7 wherein the logic to support Put message queue verbs to a queue in the MQF includes logic, responsive to a fifth subset of the first set of I/O commands, to retrieve a payload of the I/O command, to map the address associated with the I/O command to a named queue, and to form and issue a Put verb with Sync-point with the retrieved payload to the named queue to start framing a unit of work;

logic, responsive to a sixth subset of the first set of I/O commands, to retrieve a payload of the I/O command, to map the address associated with the I/O command to a named queue, and to form and issue an intermediate Put verb with the retrieved payload to the named queue;

logic, responsive to a seventh subset of the first set of I/O commands, to retrieve a payload of the I/O command, to map the address associated with the I/O command to a named queue, to issue a last Put verb with the retrieved payload to the named queue, and to issue a Commit verb to the named queue to finish framing the unit of work;

logic, responsive to an eighth subset of the first set of I/O commands, to map the address associated with the I/O command to a named queue, and to issue a Rollback verb to the named queue to finish framing the unit of work and to abort the unit of work.

15. The set of processor-executable instructions of claim 7 wherein the logic to support Get message queue verbs to a queue in the MQF includes logic, responsive to a ninth subset of the first set of I/O commands, to map the address associated with the I/O command to a named queue, and to form and issue a Get verb to the named queue and to return the retrieved payload from the named queue to a client computer causing the Get message.

16. The set of processor-executable instructions of claim 7 wherein the logic to support Get message queue verbs to a queue in the MQF includes logic, responsive to a tenth subset of the first set of I/O commands, to lock a data structure corresponding to the address associated with the I/O command so as to prevent other clients from performing actions to this address until the data structure is unlocked;

logic, responsive to an eleventh subset of the first set of I/O commands, to map the address associated with the I/O command to a named queue, and to form and issue a Get verb to the named queue and to return the retrieved payload from the named queue to a client computer causing the Get message; and logic, responsive to a twelfth subset of the first set of I/O commands, to unlock a data structure corresponding to the address associated with the I/O command so as to allow other actions to this address, such that a Get to a shared queue may be accomplished by having a client computer issue an I/O command from the tenth subset to an address corresponding to a named queue, followed by an I/O command from the eleventh subset to the address, followed by an I/O command from the twelfth subset to the address.

17. The set of processor-executable instructions of claim 7 wherein the logic to support Get message queue verbs to a queue in the MQF includes logic, responsive to a thirteenth subset of the first set of I/O commands, to map the address associated with the I/O command to a named queue, and to form and issue a Get verb to the named queue to start framing a unit of work;

logic, responsive to a fourteenth subset of the first set of I/O commands, to map the address associated with the I/O command to a named queue, and to form and issue an intermediate Get verb to the named queue;

logic, responsive to a fifteenth subset of the first set of I/O commands, to map the address associated with the I/O command to a named queue, and to form and issue a last Get verb to the named queue and to issue a Commit verb to the named queue to finish framing the unit of work;

logic, responsive to a sixteenth subset of the first set of I/O commands, to map the address associated with the I/O command to a named queue, and to issue a Rollback verb to the named queue to finish framing the unit of work and to abort the unit of work.

18. The set of processor-executable instructions of claim 1 wherein the interface logic includes address watching logic to determine whether the address of the I/O command is of interest;

mapping logic, cooperating with the address watching logic, to map I/O commands of interest into intermediate actions to the MQF; and queue watching logic, cooperating with the MQF and the mapping logic, to determine when a message has arrived at a queue in the MQF for a pending Get verb.

19. The set of processor-executable instructions of claim 1 wherein the interface logic includes means for watching the address of an I/O command to determine whether it is of interest;

means for mapping I/O commands of interest to intermediate actions to the MQF; and means for watching queues in the MQF to determine when a message has arrived at a queue in the MQF for a pending Get verb.

20. A method of sending and receiving messages according to a MQF protocol, the method comprising the steps of:

sending an I/O command having an address to an I/O controller having residing thereon
a communication stack,
a MQF, cooperating with the communication stack, and
interface logic, cooperating with the MQF;

the interface logic mapping the I/O command to an MQF verb and issuing the verb to the I/O controller-resident MQF;

the I/O controller-resident MQF causing the communication stack to send a message, according to the MQF protocol and corresponding to the MQF verb.

21. The method of claim 20 further comprising sending an I/O command to the I/O controller to cause a data structure corresponding to the address to be locked so as to prevent other clients of the I/O controller from performing actions to the address until the structure is unlocked;

sending an I/O command to the I/O controller to cause a data structure corresponding to the address to be unlocked.

22. The method of claim 20 further comprising the steps of the I/O controller indicating to a client that the MQF does not contain data to respond to a MQF verb so that the client may block wait;

the interface logic detecting when the MQF has data to respond to a MQF verb for which there previously was no data to respond;

the interface logic causing the I/O controller to signal the client that the MQF now has data for the MQF verb for which there previously was no data to respond.

* * * * *